United States Patent
Kay et al.

(10) Patent No.: US 10,588,029 B1
(45) Date of Patent: Mar. 10, 2020

(54) SYSTEM AND METHOD FOR POINTING ERROR RESISTANT REUSE

(71) Applicant: Hughes Network Systems, LLC, Germantown, MD (US)

(72) Inventors: Stanley Edward Kay, Rockville, MD (US); Liping Chen, Bethesda, MD (US); Uday Ramachandra Rao Bhaskar, North Potomac, MD (US)

(73) Assignee: Hughes Networks Systems, LLC., Germantown, MD (US)

( * ) Notice: Subject to any disclaimer, the term of this patent is extended or adjusted under 35 U.S.C. 154(b) by 0 days.

(21) Appl. No.: 16/194,338

(22) Filed: Nov. 17, 2018

(51) Int. Cl.
*H04W 16/28* (2009.01)
*H04W 16/30* (2009.01)
*H04W 84/06* (2009.01)

(52) U.S. Cl.
CPC ............ *H04W 16/28* (2013.01); *H04W 16/30* (2013.01); *H04W 84/06* (2013.01)

(58) Field of Classification Search
CPC ......... H04W 4/029; H04W 4/33; H04W 4/80; H04W 4/024; H04W 4/70; H04W 4/021; H04W 4/023; H04W 4/30; H04W 24/10; H04W 4/90; H04W 64/00; H04W 12/06; H04W 4/025; H04W 4/027; H04W 4/38; H04W 4/50; H04W 76/25; H04W 84/12

USPC ........................................................ 455/101
See application file for complete search history.

(56) References Cited

U.S. PATENT DOCUMENTS

| | | | | | |
|---|---|---|---|---|---|
| 5,564,121 | A | * | 10/1996 | Chow | H04B 7/0408 455/129 |
| 5,603,083 | A | * | 2/1997 | Lee | H01Q 1/246 455/561 |
| 2003/0196953 | A1 | * | 10/2003 | Haley, III | C02F 3/043 210/615 |
| 2005/0057961 | A1 | * | 3/2005 | Ahmad | G11C 29/804 365/154 |
| 2005/0272429 | A1 | * | 12/2005 | Walsh | H04H 20/26 455/443 |

* cited by examiner

*Primary Examiner* — Ajibola A Akinyemi
(74) *Attorney, Agent, or Firm* — NovoTechIP International PLLC

(57) ABSTRACT

Systems and methods are disclosed, and one includes receiving a configuration specification data, including a cell floor-plan data identifying a plurality of rectangular cells, and indicating a cell width and a cell length of each, in combination with determining, based at least in part on the configuration specification data, a spot beam pattern that provides a plurality of rectangular cell coverage regions, having the cell length and width.

20 Claims, 28 Drawing Sheets

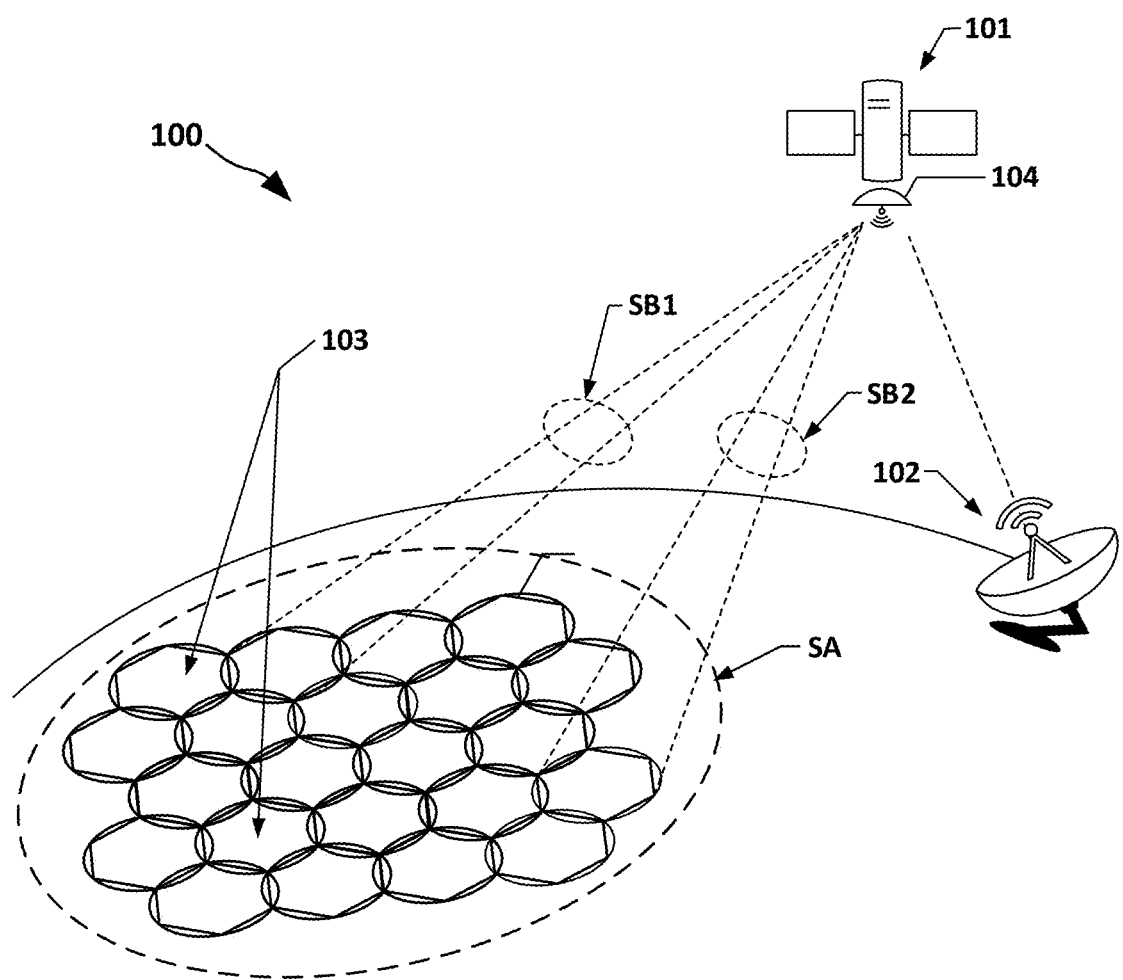
FIG. 1
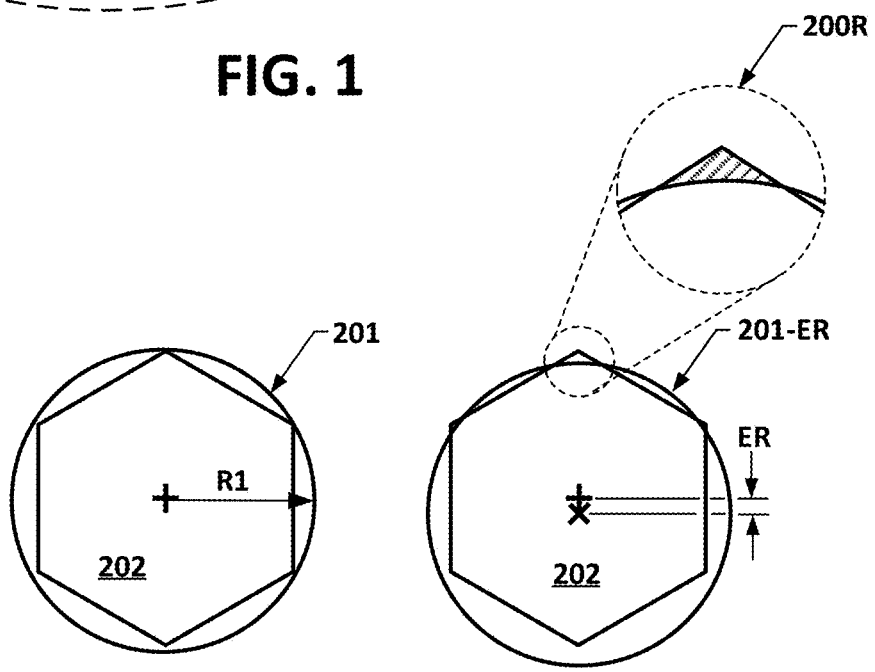
FIG. 2A  FIG. 2B

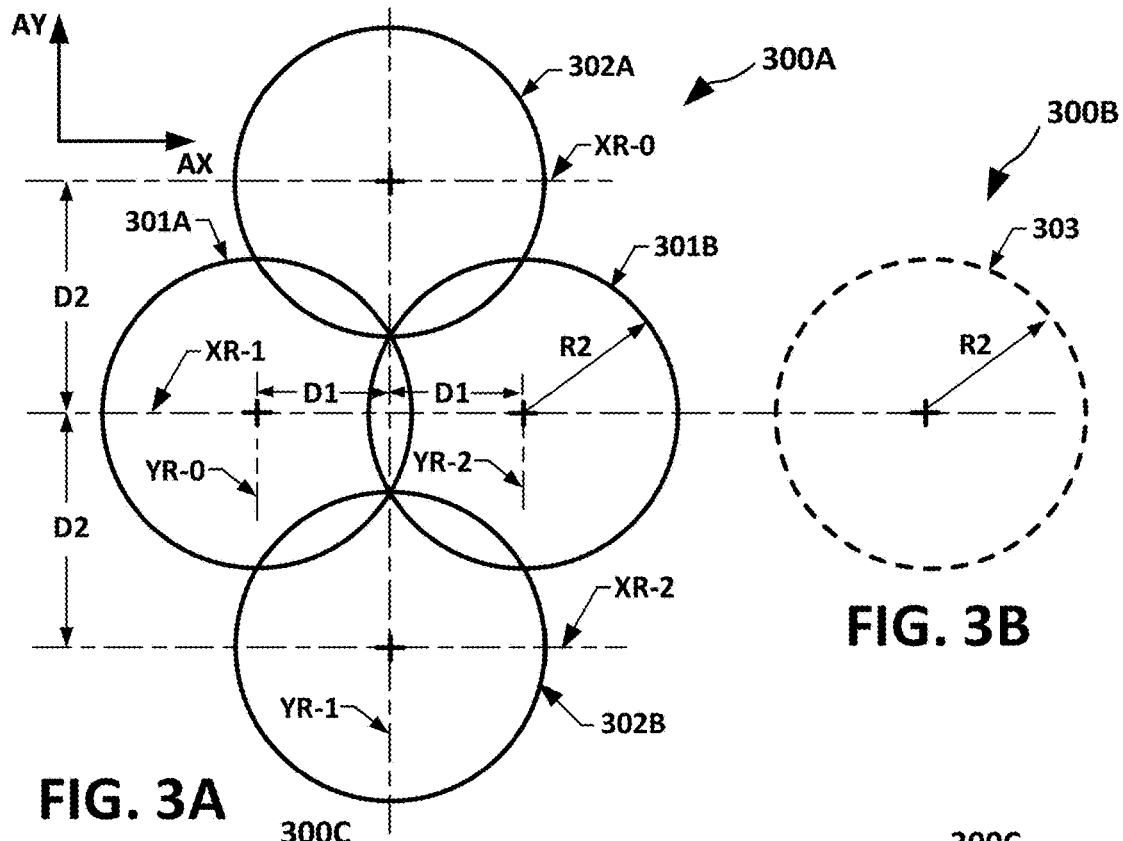
FIG. 3A
FIG. 3B
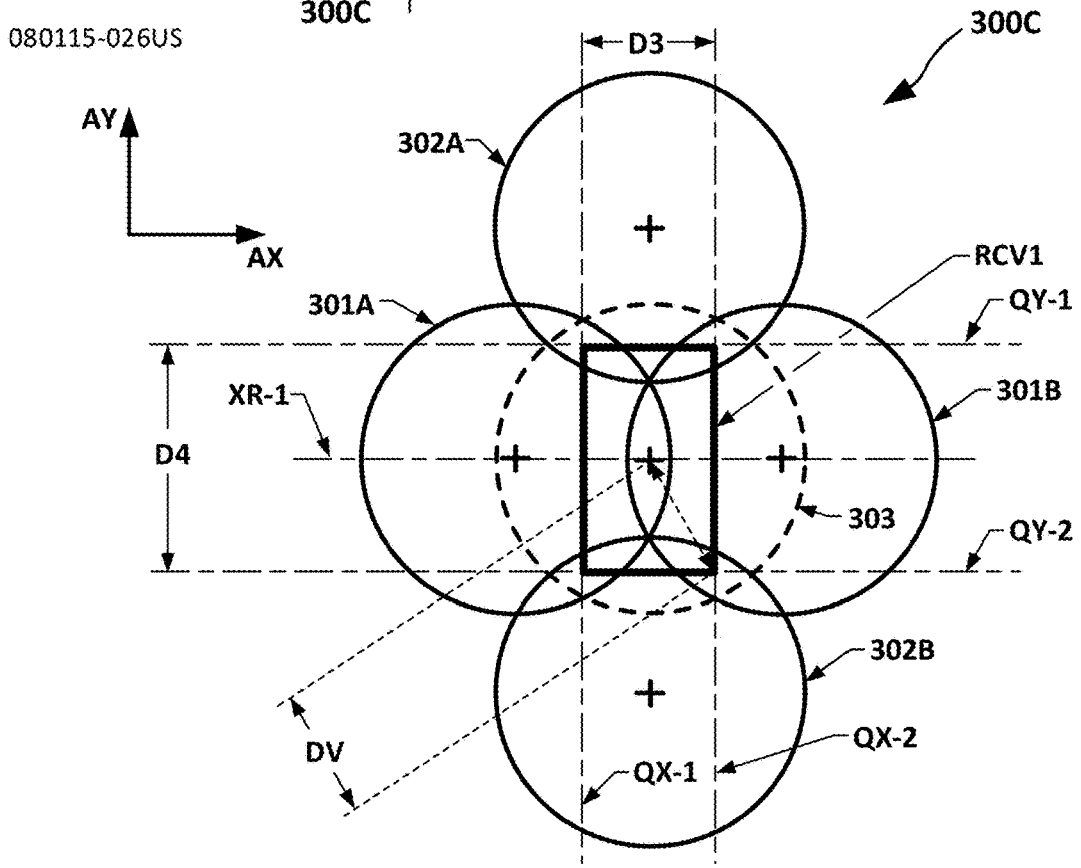
FIG. 3C

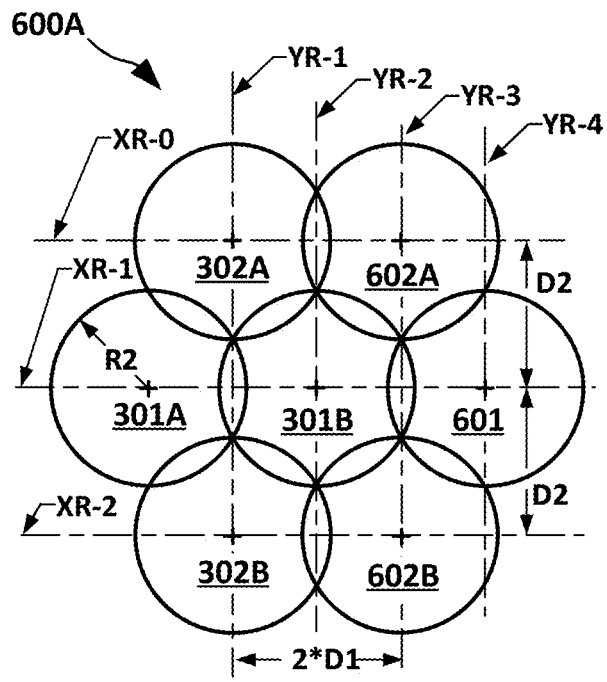
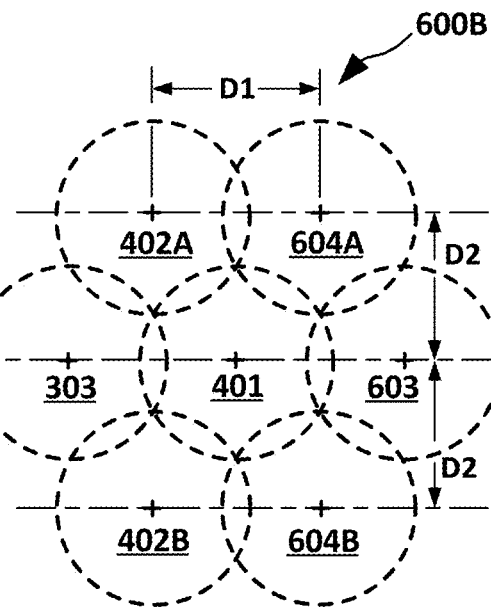
FIG. 6A
FIG. 6B
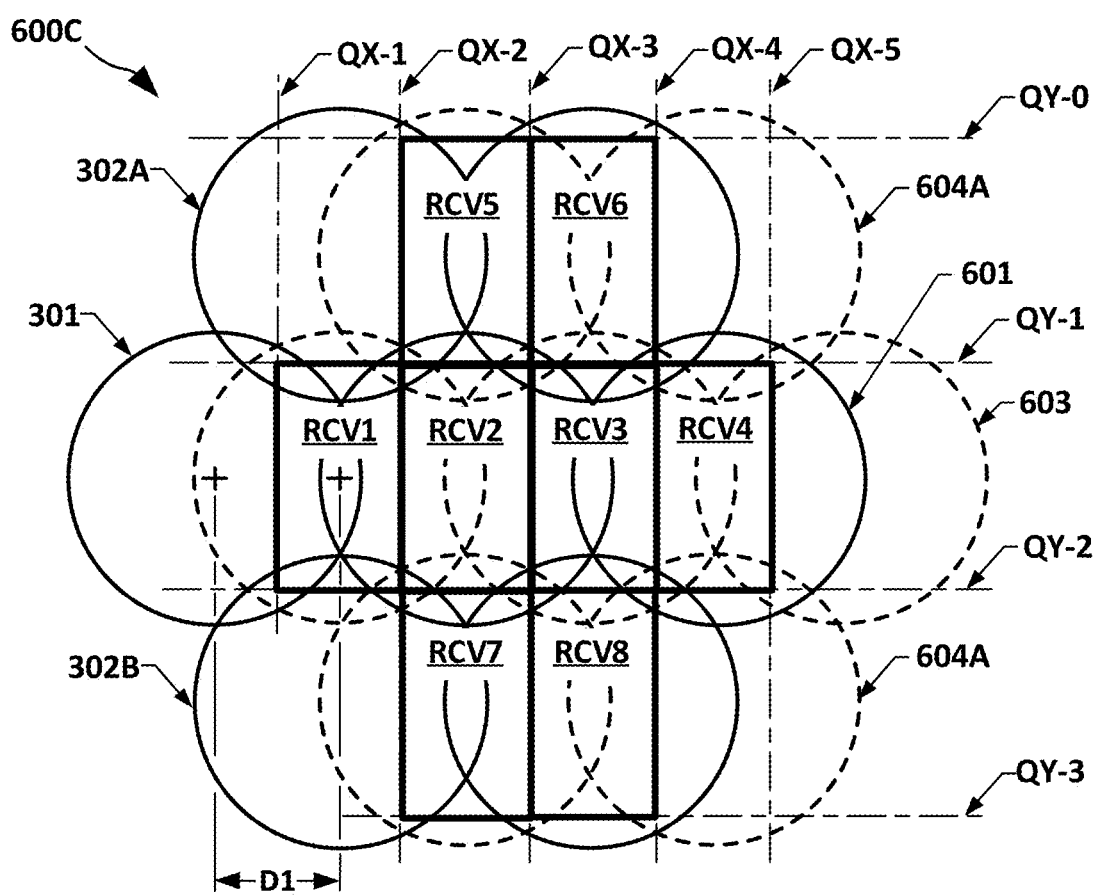
FIG. 6C

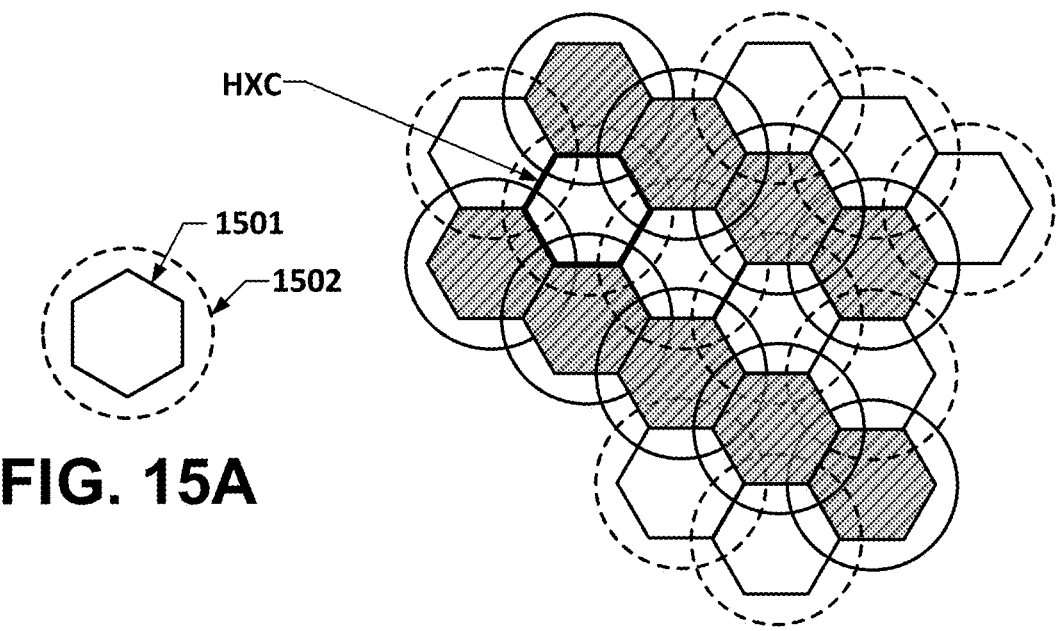
FIG. 15A
FIG. 15B
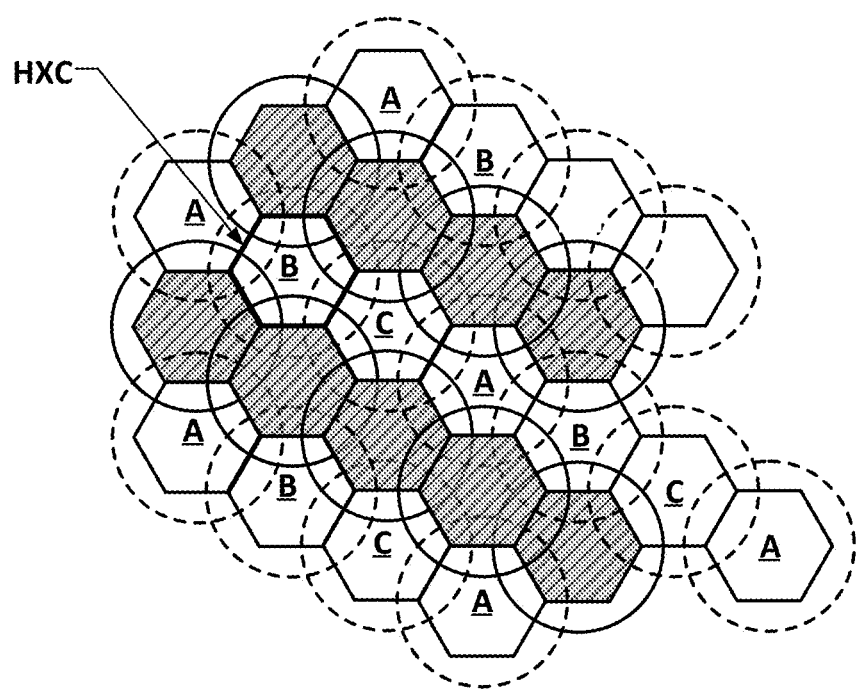
FIG. 15C

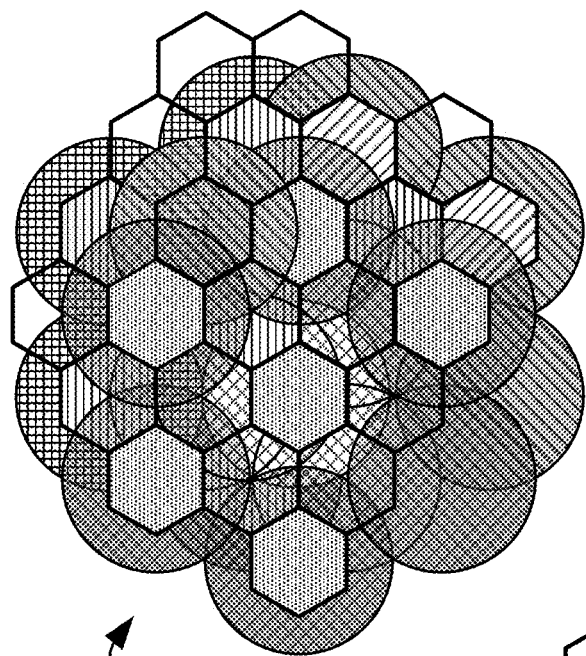
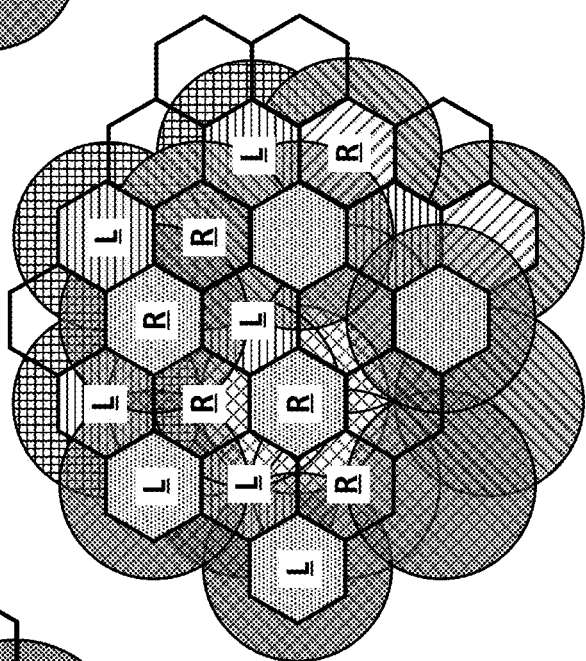
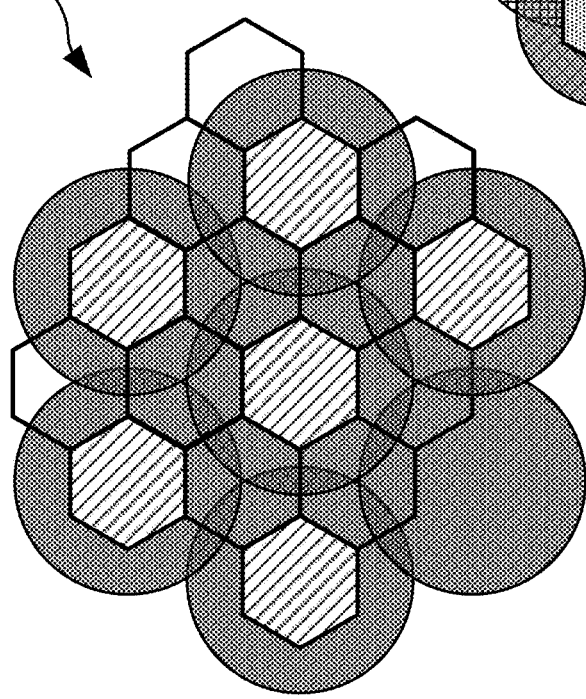
FIG. 17B
FIG. 17C
FIG. 17A

SYSTEM AND METHOD FOR POINTING ERROR RESISTANT REUSE

BACKGROUND

A satellite communication system can divide a service area into multiple cells, and configure a satellite to direct a spot beam towards the center of each cell. The directivity of the spot beam will be highest at the center of the cell and roll-off towards the distal regions of the cell. The satellite communication system can apply "frequency reuse" in which two or more cells use the same frequency band, provided such cells are adequately distant from one another. An increase in the number of cells can enable increase in reuse of frequency bands, which can increase total capacity to the service area.

However, increasing the number of cells over a fixed service area reduces their size and, therefore, can require a corresponding increase in antenna directivity, i.e., a narrowing of spot beam width to match the smaller cell area, with acceptably uniform coverage, and without spanning into adjacent cells. The latter can waste power, degrade received signal quality and, with respect to frequency reuse, can require an increase in the minimum separation of reuse cells. In typical satellite systems the directivity at the edge of the cell is 3-6 dB lower than the directivity at the center of the cell.

Increasing the satellite antenna transmit/receive directivity can carry a range of technical problems. One problem is that increasing antenna directivity necessarily decreases tolerance for absolute pointing error. As the beamwidth decreases, a fixed absolute pointing error becomes a larger fraction of the beamwidth. This means that users closer to the cell boundary are necessarily close to a steep fall-off of the antenna directivity and, hence, susceptibility to pointing error increases.

When adjacent spot beams are created by different antennas (as for example in the case of high throughput satellites) it is possible for the different antennas to mispoint in such a way that some portions of the coverage area fall outside an acceptable directivity level of any of the spot beams. Such portions may have a significantly degraded performance.

One potential solution is to apply structural modifications to the satellite, or more robust control of platform attitude and orientation, or both, so as to attain a desired pointing accuracy and stability. However, for some applications the level of such techniques needed to achieve the desired directivity may be unacceptable.

Another potential solution can be dynamic reassignment of cell boundaries to match current spot beam pointing. This may be referred to as "moving cells." However, although this solution may be feasible for some applications, there can be technical issues, such as complexity in handover between the "moving cells," that can render this solution not feasible. Moreover, in the case of multiple antenna platforms, some areas may not be covered by any beam and hence handover is not an option.

Accordingly, for reasons such the examples addressed above, there exists a technical need in satellite and other wireless communication for low complexity, high directivity multi-beam communication, with high spectral reuse and strong tolerance to pointing error.

SUMMARY

This Summary identifies example features and aspects and is not an exclusive or exhaustive description of the disclosed subject matter. Whether features or aspects are included in, or omitted from this Summary is not intended as indicative of relative importance of such features. Additional features and aspects are described, and others will become apparent to persons skilled in the art upon reading the following detailed description and viewing the drawings that form a part thereof.

One exemplary system in accordance with this disclosure can include a controller, which can be configured to store a cell boundary data associated with cell boundaries, and to generate a spot beam pattern data based at least in part on the cell boundary data, and can further include a multiple beam transceiver, coupled to the controller. The multiple beam transceiver can include an antenna, and an antenna feed array, coupled to the antenna, and configured to receive the spot beam pattern data and to receive a plurality of downlink feed signals and, in response, to feed the antenna a beamformed downlink antenna feed signal, the beamformed downlink antenna feed signal being configured to radiate from the antenna as a plurality of spot beams in accordance with a spot beam pattern that corresponds to the spot beam pattern data. The spot beam pattern can include a cell spot beam centered on a cell center, and a plurality of adjacent spot beams, each partially overlapping the cell spot beam, and the cell spot beam and adjacent spot beams can each include a corresponding portion of the downlink feed signals. A first pair of the adjacent spot beams can be aligned along a first axis that passes through the cell center, and are oppositely spaced from the cell center, symmetrically, by a first distance, wherein first pair overlap one another within the cell spot beam. A second pair of the adjacent spot beams can be aligned along a second axis that passes through the cell center, perpendicular to the first axis, and can be oppositely spaced from the cell center, symmetrically, by a second distance, wherein the second pair are separated by a region within the cell spot beam.

One exemplary method in accordance with this disclosure can include receiving a configuration specification data, including a cell floorplan data, the cell floorplan data identifying a plurality of rectangular cells and indicating a cell width and a cell length of the rectangular cells; and can include determining, based at least in part on the configuration specification data, a spot beam pattern, the spot beam pattern including a spot beam first axis spacing and a spot beam second axis spacing, the second axis being perpendicular to the first axis and, in an aspect, the spot beam pattern provides a plurality of rectangular cell coverage regions, having a length and a width corresponding to the cell length and cell width.

One exemplary method in accordance with this disclosure can include feeding a beamformed antenna feed signal to an antenna, the beamformed antenna feed signal including a cell signal and a plurality of adjacent cell signals, the beamformed antenna feed signal being configured such that the antenna transmits, in response, a pattern of spot beams that includes a cell spot beam centered on a cell center and carrying the cell signal, and a plurality of adjacent cell spot beams carrying the plurality of adjacent cell signals, each adjacent cell spot beam partially overlapping the cell spot beam; receiving uplink signals from the antenna, each of the uplink signals being transmitted from within a cell boundary among the plurality of cell boundaries; and applying a beamforming to the received uplink signals corresponding to the pattern of spot beams. The first pair of the adjacent cell spot beams can be aligned along a first axis that passes through the cell center, and can be oppositely spaced from the cell center, symmetrically, by a distance wherein the first pair of adjacent cell spot have a mutual overlap within the cell spot beam, and the second pair of the adjacent cell spot beams can be aligned along a second axis that passes through the cell center and is perpendicular to the first axis, and can be oppositely spaced from the cell center, symmetrically, by a distance wherein the second pair of the adjacent cell spot beams are separated.

One exemplary system in accordance with this disclosure can include a controller, configured to store a cell boundary data associated with cell boundaries, and to generate a spot beam pattern data based at least in part on the cell boundary data, and a multiple beam transceiver, coupled to the controller. The multiple beam transceiver can include an antenna feed array, coupled to the antenna, and configured to receive the spot beam pattern data and to receive a plurality of downlink feed signals and, in response, to feed the antenna a beamformed downlink antenna feed signal, the beamformed downlink antenna feed signal being configured to radiate from the antenna as a spot beam pattern, of spot beams with radius R, that corresponds to the spot beam pattern data. In one or more aspects, the spot beam pattern can include a cell spot beam centered on a cell center, and a corresponding six adjacent spot beams, each partially overlapping the cell spot beam, each aligned on a respective center, and the six adjacent spot beams can include a first pair of adjacent spot beams, a second pair of adjacent spot beams, and a third pair of adjacent spot beams. Relative positions of the cell spot beam and the corresponding six adjacent spot beams define a hexagonal cell coverage region that has an area approximately one-half an area of the cell spot beam. Relative positions are such that a first equidistance reference line, tracing points equidistant between the cell center and a center of one spot beam of the first pair of adjacent cell spot beams, is an alignment for a first side of the hexagonal cell coverage region, a second equidistance line, parallel the first equidistance reference line, traces points equidistant between the cell center and a center of the other spot beam of the first pair of adjacent cell spot beams, and is an alignment for a second side of the hexagonal cell coverage region, the second side being opposite from and parallel to the first side, a third equidistance reference line, tracing points equidistant between the cell center and a center of one spot beam of the second pair of adjacent cell spot beams, is an alignment for a third side of the hexagonal cell coverage region, a fourth equidistance line, parallel the third equidistance reference line, traces points equidistant between the cell center and a center of the other spot beam of the second pair of adjacent cell spot beams, and is an alignment for a fourth side of the hexagonal cell coverage region, the fourth side being opposite from and parallel to the third side, a fifth equidistance reference line, tracing points equidistant between the cell center and a center of one spot beam of the third pair of adjacent cell spot beams, is an alignment for a fifth side of the hexagonal cell coverage region, and a sixth equidistance line, parallel the fifth equidistance reference line, traces points equidistant between the cell center and a center of the other spot beam of the third pair of adjacent cell spot beams, and is an alignment for a sixth side of the hexagonal cell coverage region, the sixth side being opposite from and parallel to the fifth side.

BRIEF DESCRIPTION OF THE DRAWINGS

The drawings and figures depict various implementations in accordance with the present teachings, by way of example only, not by way of limitation. In the figures, like reference numerals refer to the same or similar elements. For purposes of convenience the drawings are not necessarily made to scale.

FIG. 1 is a simplified schematic of an elevated platform signal distribution system.

FIG. 2A is a graphical illustration of a FIG. 1 spot beam, aligned with its assigned hexagonal cell.

FIG. 2B is a graphical illustration of a FIG. 1 spot beam offset relative to its assigned hexagonal cell, due to a satellite antenna pointing error.

FIG. 3A is diagram of a first pattern contribution to an exemplary offset composite, rectangular cell coverage (RCC) spot beam pattern in accordance with aspects of this disclosure.

FIG. 3B is a diagram of a cluster of spot beams according to an implementation of a second pattern contribution to an exemplary offset composite, RCC spot beam pattern in accordance with aspects of this disclosure.

FIG. 3C is a diagram of an exemplary offset composite RCC spot beam pattern, based on an overlay or combination of the FIG. 3A first pattern contribution and the FIG. 3B second pattern contribution, and a rectangular coverage area provided thereby, in one or more implementations of systems and methods for multiple beam signal distribution via pointing error (PE) tolerant reuse, according to various aspects of this disclosure.

FIG. 6A is a diagram of exemplary spot beams according to another first pattern contribution, in an implementation of another offset composite, RCC spot beam pattern in accordance with aspects of this disclosure.

FIG. 6B is a diagram of exemplary spot beams according to another second pattern contribution, based on an offset of the FIG. 6A pattern contribution, in an implementation of another exemplary offset composite, RCC spot beam pattern in accordance with aspects of this disclosure.

FIG. 6C is a diagram of an exemplary spot beams according to another offset composite RCC spot beam pattern, having a combination of the FIG. 6A first pattern contribution and the FIG. 6B second pattern contribution, and associated configuration of produced rectangular coverage areas, in one or more implementations for multiple beam PE tolerant reuse, according to various aspects of this disclosure.

FIG. 15A is a diagram of a spot beam overlaying a hexagonal cell cross-over boundary that is one-half the area of the spot beam.

FIG. 15B is a diagram of a tessellation of the FIG. 15A hexagonal cell cross-over boundaries, and a corresponding multi-beam pattern, and a graphically marked LHCP and RHCP aspect of a reuse scheme.

FIG. 15C is an additionally marked FIG. 15B diagram, with a graphically marked example 3-color reuse scheme to the LHCP aspect.

FIG. 17A is a diagram of a tessellation of hexagonal cell cross-over boundaries, overlaid with a pattern of spot beams, with the boundary the cell cross-over level forming each hexagonal cell boundary to have one-third of the area of its spot beam.

FIG. 17B is diagram of an extension of the FIG. 17A tessellation of one-third area hexagonal cell cross-over boundaries, and graphically marked aspects of a reuse scheme.

FIG. 17C is an additionally marked FIG. 17B diagram, with graphical marking of additional aspects of the reuse scheme.

DETAILED DESCRIPTION

Figure 4:
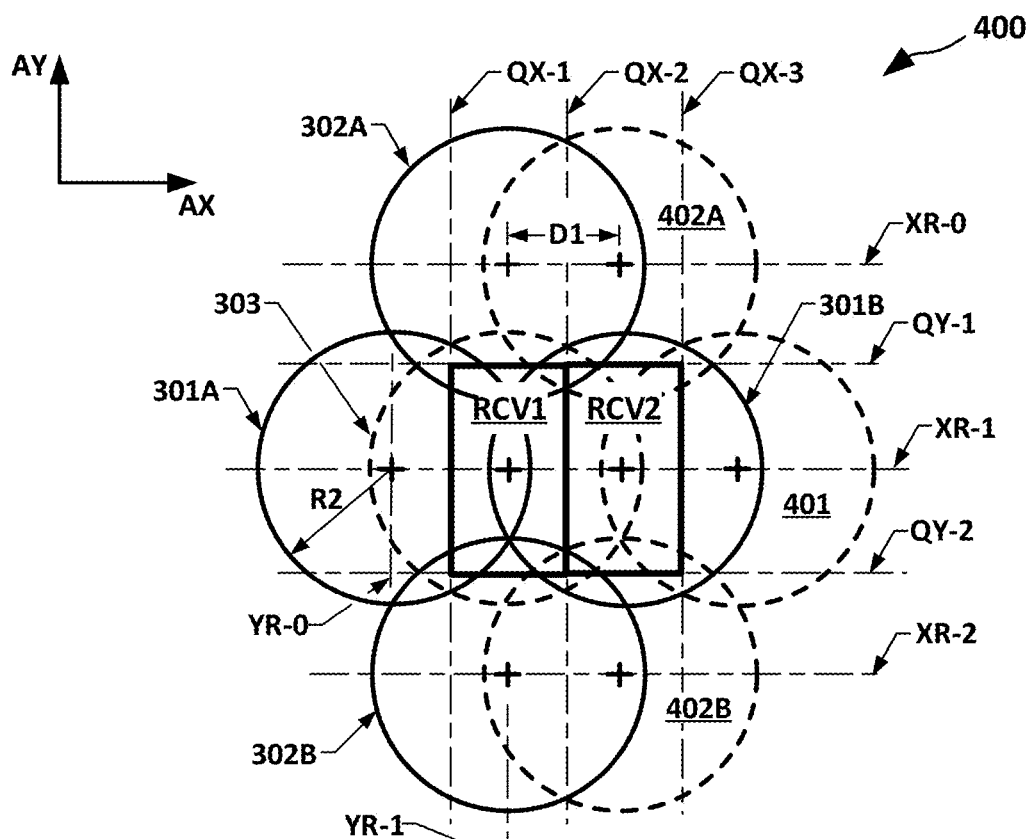
FIG. 4 is a diagram of another exemplary offset composite RCC spot beam pattern, and its corresponding contiguous two rectangular coverage areas the pattern provides, in one or more implementations of systems and methods for multiple beam signal distribution via PE tolerant reuse, according to various aspects of this disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, to avoid unnecessarily obscuring aspects of the present teachings.

FIG. 1 is a functional block diagram of a related art elevated platform signal distribution system 100 ("system 100"). The system 100 can include an elevated transceiver platform 101, for example, a high throughput geostationary satellite, configured to receive a multichannel uplink signal UL from a terrestrial satellite gateway antenna 102 and distribute the channel data to a service area SA. The service area SA can be divided into a tessellation of hexagonal cells, generically numbered 103 (collectively "hexagonal cells 103"). For purposes of this description, the cells 103 can be considered geographically fixed, i.e., not adjusted in a dynamic real-time manner.

The elevated transceiver platform 101 can provide service to the tessellation of hexagonal cells 103 through a plurality spot beams, such as the representative two labeled respectively as "SB1" and "SB2" (collectively "spot beams SB"). Each spot beam SB can correspond to the central portion of a transmit/receive beam main lobe of one beam of a platform based multibeam antenna 104. To avoid interference between adjacent cells 103, the platform 101 configures transmission in each beam with a frequency band and/or polarization different from what it uses within beams for adjacent cells.

Within each cell 103 can be a population of terminals (not explicitly visible in FIG. 1), for example, Very Small Aperture Terminals (VSAT), with downlink/uplink transceivers. One or more of the VSATs can serve a population of client communication devices, such as personal computers, multimedia entertainment devices, and smart phones.

As described above, spot beams SB may be transmitted by a satellite antenna 104. As also described, the hexagonal cells 103 are geographically fixed. Therefore, motion of the antenna 104 correspondingly moves spot beams SB relative to the cells 103.

FIG. 2A is a diagram of a spot beam 201 from among the FIG. 1 spot beams SB, in an alignment centered on its assigned hexagonal cell 103, which FIG. 2A numbers as 202, i.e., without PE. As visible in FIG. 2A, the distance from the center of hexagonal cell 202 to the hexagon's six outer points (visible in FIG. 2A, but not separately numbered) is R1, the radius of spot beam 201. The radius R1 defines a reference circle within which power is no less than the notional cross-over, e.g., −3 dB of the power received at the cell center. The distance between hexagon or circle centers is defined as the square root of 3 times R1, i.e., 1.732*R1. This can be true whether the cross-over value is −3 dB or −5 dB or any other value.

Provided the spot beam 201 is correctly aligned as shown in FIG. 2A, the entire area of the hexagonal cell 202 receives power that is no less than the notional cross-over, e.g., −3 dB of the power received at the cell center. Due to being farther from the beam center, signal quality in distal regions can be statistically lower than in regions closer to its center. As can be seen in FIG. 2A, a pointing error along any of the hexagonal cell 202 diagonals (vertex to opposite vertex), of which a direction of any of six hexagonal cell 202 corners is a worst case direction for VSATs near that vertex.

FIG. 2B is a diagram of a misalignment due to a pointing error, by which the spot beam 201 moved "ER" in the downward direction (relative to the FIG. 2B view) along one of the worst case directions. The misaligned spot beam is labelled 201-ER. Such pointing error can have various causes, for example, time-varying solar heat distortion of platform structure or antenna, stepping of the solar panels to track the sun, or any one of or combination of satellite environmental torques. Technical natures of such environmental torques are known to persons of ordinary skill in the art and, therefore, further detailed description is omitted.

As can be seen in FIG. 2B, the distal region of the cell that is shaded in the enlarged region 200R can experience substantial loss in signal quality, due in significant part to the antenna beam steep slope being sharper at the cell edge. VSATs in such a region can, depending on the environment, maintain reduced service by using even more robust coding, and by applying other techniques and, in some instances, may lose service.

Systems and methods according to the disclosure can provide, among other technical solutions and benefits, substantive increase in PE tolerance. Technical features of disclosed solutions can include offset composite patterns of spot beams, configured to establish regions covered by geographical tessellation of rectangular cells. Technical features include high spectral reuse schemes that can provide improved edge-of-cell loss in comparison to conventional reuse schemes. Technical features can also include, but are not limited to, increased average directivity over the coverage area for a fixed antenna pattern. Technical features and benefits also include, but are not limited to, feasibility of using higher directivity antennas on satellites than was practical according to current techniques.

FIG. 3A is a diagram of an exemplary first contribution pattern 300A ("first pattern 300A"). First pattern 300A will be described in subsequent paragraphs as overlaid or otherwise combined with other patterns to form exemplary offset composite, multiple spot beam rectangular cell (RCC) patterns according to this disclosure. It will be understood that terms such as "overlaid," "combined," "superposed," "otherwise combined," and various similar terms, as used herein in the context of composite spot beam patterns, are not intended as a limitation on physical implementations of transmitting multiple spot beams according to the composite pattern. For example, physical implementations providing spot beams patterns according to an offset composite RCC spot beam pattern described herein as an overlay or other combination of constituent or contributing sub patterns can include, without limitation, generation of the entire composite pattern by a single phased array scan feed to a single multibeam antenna.

The visible AX-AY frame of reference is for describing items relative to the FIG. 3A viewing projection, and is not intended as any limitation on orientation with respect to any external reference. The first pattern 300A can include spot beams 301A and 301B that are aligned on AX-oriented axis XR-1, and spot beams 302A and 302B that are aligned on AY-oriented axis YR-1. Spot beams 301A and 301B can be symmetrically spaced on opposite sides of the AY-oriented axis YR-1, by a first distance D1, parallel the AX axis. Spot beams 302A and 302B can be symmetrically spaced by a second distance, labeled "D2" on FIG. 3A, on opposite sides of the AX-oriented axis XR-1 of spot beams 301A and 301B. Spot beams 301A, 301B, 302A, and 302B can have a common radius, such as the radius R2 marked on spot beam 301B. For purposes of later description, additional AY-oriented axes YR-0 and YR-2 are provided. YR-0 crosses XR-1 at the location of spot beam 301A and YR-2 crosses XR-1 at the location of spot beam 301B. For similar purposes, additional AX-oriented axes XR-0 and XR-2 are provided. XR-0 crosses YR-1 at the location of spot beam 302A, and XR-2 crosses YR-1 at the location of spot beam 302B.

FIG. 3B is a diagram of an exemplary second contribution pattern 300B, configured to be overlaid or otherwise combined with the above-described first contribution pattern 300A to form an exemplary offset composite, RCC spot beam pattern described in greater detail in reference to FIG. 3C. The FIG. 3B example pattern 300B can include a single spot beam 303, having the radius R2 of the first pattern 300A. The second contribution pattern 300B can be, but is not necessarily from a larger second pattern contribution (not fully visible in FIG. 3A).

FIG. 3C is a diagram of an offset composite RCC spot beam pattern 300C ("pattern 300C"). Pattern 300C that can be implemented as an overlay of the second contribution pattern 300B with the first contribution pattern 300A. As described above, "overlay" can be a logic construct, for convenience of describing the pattern, and is not necessarily descriptive of or a limitation on implementation of spot beams according to the pattern. Referring to the pattern 300C, the AY position of the FIG. 3B spot beam 303 can be the same as that of FIG. 3A beams 301A and 301B, and the AX position of 303 can be the same as that of spot beams 302A and 302B, and this can place spot beam 303 at the intersection of XR-1 and YR-1.

For purposes of describing pattern 300C and its features, an AX equidistance first reference line QX-1 and an AX equidistance second reference line QX-2 can be applied, both of these extending parallel to AY. Likewise, an AY equidistance first reference line QY-1 and AY equidistance second reference line QY-2 can be applied, both extending parallel to AY. The AX position of QX-1, i.e., the location of its intersection with AX, is such that QX-1 traces equidistance, in terms of AX, between the center of spot beam 301A and the center of spot beam 303. The reason for choosing the equidistant location is that it represents the point at which the directivity for spot beams 301A and 303 are equal and therefore is the logical place for a cell boundary.

Described in reference to AY alignment axes for the first pattern 300A, the AX equidistance first reference line QX-1 has AX equidistance between YR-0 and YR-1, and the AX equidistance second reference line QX-2 has AX equidistance between YR-1 and YR-2. The AX position of QX-2 is such that it traces equidistance, in terms of AX, between the center of spot beam 303 and the center of spot beam 301B. In a similar arrangement, AY equidistance first reference line QY-1 has an AY position, i.e., an intersection with XR-1, that traces equidistance, in terms of AY, between the center of spot beam 303 and the center of spot beam 302A. QY-2 has an AY position so as to trace AY equidistance between the center of spot beam 303 and the center of spot beam 302B. Described in terms of AX alignment axes for the first pattern 300A, the AY spacing first reference line QY-1 extends equidistant between XR-0 and XR-1, and the AY spacing second reference line QY-2 extends equidistant between XR-1 and XR-2.

Referring again to FIG. 3C, QX-1 crosses QY-1 and QY-2 at respective intersections (visible but not separately numbered) that for purposes of description will be referred to as intersections "QX-1/QY-1" and "QX-1/QY-2." QX-2 crosses QY-1 and QY-2 at respective intersections (visible but not separately numbered) that can be referred to as intersections "QX-2/QY-1" and "QX-2/QY-2." In an aspect, based on their respective AX-AY positions, intersections QX-1/QY-1, QX-2/QY-1 QX-1/QY-2, and QX-2/QY-2 establish four vertices that, in turn, can define a rectangular region that FIG. 3C labels "RCV1."

RCV1 has a "width" D3 and "length" D4, the term "width" referring to the smaller of the RCV1 AX-AY dimensions, and "length" referring to the larger, without implying any limitation as to their orientations within any external frame of reference. The magnitude of D3 is the spacing between QX-1 and QX-2, which is 0.866*R2, described above as the first distance D1. Regarding the magnitude of D4, it is the spacing between QY-1 and QY-2, which is 1.5*R2 and, as described above, is the second distance D2.

In an aspect, first distance D1 and second distance D2 can be according to the following Equations (1) and (2), respectively:

$$D1=R2*\cos(300)\approx 0.866*R2 \qquad \text{Equation (1)}$$

$$D2=1.5*R2 \qquad \text{Equation (2)}$$

Accordingly, in an implementation, the D1 width D3 of RCV1 is 0.866*R2, and the second distance D2 (=D4) length of RCV1 is 0.75*R2. The distance from the center of spot beam 303 to the corners of RCV1 is a third distance, labeled "DV" on FIG. 3C, which is 0.866*R2 and therefore inside of the R2 radius of the beam. The spacing of R2 minus DV can provide a corresponding PE tolerance, for example, of approximately 0.134*R2. The tolerance clearly contrasts with the FIG. 1 hexagonal cells 103, which have extreme points or vertices on the cross-over boundary of the spot beam SB, as shown in greater detail in FIG. 2A. And, as visible in FIG. 2B, such hexagonal cell configuration can provide little, if any, tolerance for PE.

It will be understood that the above-described configuration and arrangement of the pattern 300C can be extended or repeated. For example, the spot beam 303 of the described second contribution pattern 300B can be supplemented to form a duplicate, or offset duplicate, of the described first pattern 300A. Such an implementation is described in greater detail, for example, in reference to FIG. 4.

FIG. 4 is a diagram of another exemplary offset composite RCC spot beam pattern 400 (hereinafter "pattern 400"). In an implementation, pattern 400 can be formed by particular extension of the FIG. 3C pattern 300C. To avoid obfuscation by introduction of new details not necessarily particular to comparative aspects of FIG. 3C and FIG. 4, the FIG. 4 example will be described as extending from FIG. 3C. One exemplary implementation according to pattern 400 can be a supplementation of the FIG. 3B second pattern contribution 300B to 300C, e.g., spot beam 303, to form a replica of the FIG. 3A first pattern contribution 300A, offset in a direction parallel AX by the first distance D1. Referring to FIG. 4, one exemplary specific implementation can include spot beams 401, 402A, and 402B, respectively positioned on XR-1, XR-0, and XR-2 such that spot beam 401 is D1 to the right of 303; 402A is D1 to the right of 302A; and spot beam 402B is D1 to the right of 302B. A resulting pattern formed by spot beams 303, 401, 402A, and 402B, as visible in FIG. 4, is a replica of the above-described FIG. 3A first pattern contribution 300A. Stated differently, the positions of 402A, 402B and 401 relative to spot beam 303 replicate the FIG. 3A positions of spot beams 302A, 302B, and 301B relative to spot beam 301 and, accordingly, define a second contribution pattern 303/401/402A/402B that is an offset replica of the first contribution pattern 300A.

For purposes of describing features, an additional AY-oriented axis is provided, crossing XR-1 at the location of spot beam 401. Also, the FIG. 3C AX spacing first and second reference lines QX-1 and QX-2, and the AY spacing first and second reference lines QY-1 and QY-2 are shown as carried over into FIG. 4. Corresponding to the second contribution pattern 303/401/402A/402B, an AX spacing third reference line QX-3 can be added, extending parallel AY, with AX position, i.e., an intersection point on AX, so as to trace AX equidistance between the center of spot beam 301B and the center of spot beam 401. In terms of AY alignment axes for the first pattern 300A, the AX spacing third reference line QX-3 extends parallel to, equidistant between YR-0 and YR-1. The AX spacing third reference line QX-3 crosses QY-1 and QY-2 at intersections (visible but not separately numbered) that can be referred to as intersections "QX-3/QY-1" and "QX-3/QY-2." In an aspect, based on their respective AX-AY positions, another rectangular region, RCV2, is defined by the previously described vertices at QX-2/QY-1 and QX-2/QY-2, together with added vertices at QX-3/QY-1 and QX-3/QY-2. Based on the above-described configuration of the second contribution pattern 303/401/402A/402B, RCV2 has the same width D3 and length D4 as RCV1.

Among technical features of the FIG. 4 pattern is that the second rectangular cell coverage region RCV2 and the first rectangular cell coverage region RCV1 form a grid tessellation of two rectangular cell coverage regions, RCV1 being aligned center-on-center with spot beam 303 and RCV2 is aligned center-on-center with spot beam 301B. Another technical feature is that the exemplary spot beam 303 serving RCV1 and spot beam 301B serving RCV2 each extend 0.134*R beyond the rectangular regions most distal corners—i.e., in the worst case direction of pointing error. This in turn can provide, among other features, a valuable increased tolerance to pointing error.

Figure 5:
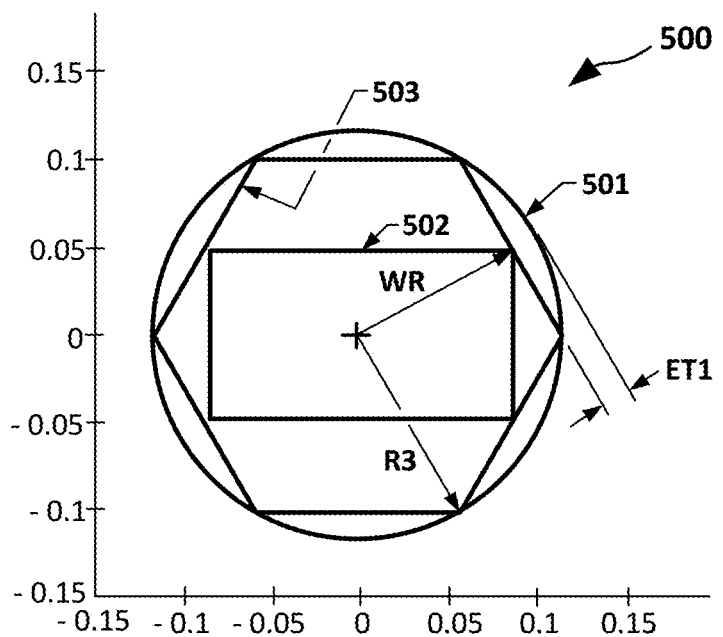
FIG. 5 is a diagram of an exemplary rectangular cell according to various aspects of this disclosure, and a fitting thereof within a hexagon cell and spot beam.

FIG. 5 is a comparison diagram 500 that includes spot beam 501, overlaid with an exemplary rectangular cell 502, for example, as described in reference to any of FIG. 3C, or 4, or implemented as described in greater detail later in this disclosure. The comparison diagram 500 also overlays a hexagonal cell 503. The spot beam 501 radius line R, in accordance with hexagonal cell techniques, extends to the corners of the hexagonal cell 503. Accordingly, pointing error in a direction of any of six hexagonal cell 503 corners is a worst case direction, as described above in reference to FIGS. 2A and 2B.

In comparison, the distance WR to the corners of the exemplary rectangular cell 502, which are the points furthest from the center of the spot beams 501 and, accordingly, the worst case direction for pointing error, are only 0.866*R. A beam pointing error can shift the spot beam as much as 0.134*R, i.e., has an error tolerance labeled "ET1" on FIG. 5, in the worst case direction before the cross-over boundary reaches the corners of the rectangular cell 502.

In arithmetical terms, since the area of the rectangular cell is one-half the area of the hexagonal form, a total number of the rectangular cells 502 can be twice the number required using a hexagonal cell for the given coverage area. However, as will be described in greater detail in later sections, in accordance with disclosed techniques, the increased arithmetical number of cells does not necessarily carry significant increase in implementation complexity relative to hexagonal cell techniques.

FIG. 6A is a diagram of spot beams according to another exemplary first pattern contribution 600A ("first pattern 600A"). The first pattern 600A can contribute to an implementation of another offset composite, RCC spot beam pattern in accordance with aspects of this disclosure. The exemplary first pattern 600A can include the FIG. 3A first pattern 300A, described above as carried into the FIG. 4 pattern 400, with added spot beams 601, 602A, and 602B, respectively positioned to extend the FIG. 3A first pattern 300A by one spot beam at its first or top row, second or middle row, and third or bottom row. More specifically, first pattern 600A spot beam 601 can be centered on AX axis XR-2, spaced twice the first distance D1 to the right of spot beam 301B, spot beam 602A can be centered on XR-0, spaced twice D1 to the right of spot beam 302A, and spot beam 602B can be centered on XR-2, spaced twice D1 to the right of spot beam 302B. As can be seen in FIG. 6A, the resulting first pattern 600A extends the FIG. 3A first pattern with an overlapping repeat of that pattern, formed by spot beams 301B, 601, 602A, and 602B. For purposes of describing features, additional AY-oriented axes YR-3, and YR-4 are provided, with YR-4 crossing XR-1 at the location of spot beam 601, and YR-3 crossing XR-0 and XR-2 at the respective locations of spot beams 602A and 602B.

FIG. 6B is a diagram of a spot beams according to another second pattern contribution 600B ("second pattern 600B"). The second pattern 600B can include the FIG. 4 second pattern, formed of spot beams 303, 401, 402A, and 402B, and to that can add spot beams 603, 604A, and 604B. Spot beam 603 can be spaced twice the first distance D1 to the right of 401. Spot beams 604A and 604B can be spaced twice D1 to the right of 402A and 402B, respectively. As visible in the FIG. 6B example, the resulting second pattern 600B extends the FIG. 4 second pattern with an overlapping repeat of same, provided by spot beams 401, 603, 604A, and 604B.

FIG. 6C is a diagram of an exemplary offset composite RCC spot beam pattern 600C, with the composite being the first pattern 600A overlaid with an offset of second pattern 600B, the offset being first distance D1 in a direction along AX that is rightward in the FIG. 6C viewing field.

For purposes of describing FIG. 6C features, the FIG. 4 AX equidistance first, second, and third reference lines QX-1, QX-2, and QX-3, and the AY equidistance first and second reference lines QY-1 and QY-2 are carried over. An AX equidistance fourth reference line QX-4, and AX fifth equidistance reference line QX-5 can be added. The AX equidistance fourth reference line QX-4 traces equidistance, in terms of AX, between the center of second pattern 600B spot beam 401 and the center of first pattern 600A spot beam 601. Because of the respective configurations and offset of 600A and 600B appearing in 600C, QX-4 also traces equidistance, in terms of AX, between the center of first pattern 600A spot beam 602A and second pattern 600B spot beam 604A, as well as AX equidistance between the center of first pattern 600A spot beam 602B and second pattern 600B spot beam 604B. The AX equidistance fifth reference line QX-5 traces equidistance, in terms of AX, between the center of first pattern 600A spot beam 601 and second pattern 600B spot beam 603.

Referring to FIG. 6C, an AY equidistance "zeroth" reference line QY-0, and AY equidistance third reference line QY-3 can be added to the FIG. 4 AY equidistance first and second reference lines QY-1 and QY-2. In the pattern 600C example, QY-0 and QY-3 may serve as estimated "equidistance" lines, because there are no visible spot beams above QY-0 or below QY-3. Accordingly, QY-0 and QY-1 may be respectively spaced above XR-0 and below XR-2 using, for example, the equidistance that aligns QY-1 between XR-0 and XR-1.

As visible in FIG. 6C, QX-4 crosses QY-1 and QY-2 at intersections (visible but not separately numbered) "QX-4/QY-1" and "QX-3/QY-2," and QX-5 crosses QY-1 and QY-2 at intersections (visible but not separately numbered) "QX-5/QY-1" and "QX-5/QY-2." Additional rectangular regions RCV3 and RCV4 are thus defined—RCV3 by the carried-over FIG. 4 vertices QX-3/QY-1 and QX-3/QY-2, together with added vertices QX-4/QY-1 and QX-4/QY-2; and RCV4 by added vertices QX-4/QY-1 and QX-4/QY-2 in combination with vertices QX-5/QY-1 and QX-5/QY-2. QY-0 similarly forms the following intersections with QX-2, QX-3, and QX-4 (all being visible but not separately numbered)—"QX-2/QY-0," "QX-3/QY-0," and "QX-4/QY-0." Additional rectangular regions RCV5 and RCV6 are thus defined—RCV5 by the carried-over FIG. 4 vertices QX-2/QY-1 and QX-3/QY-1, together with added vertices QX-2/QY-0 and QX-3/QY-0; and RCV6 by added vertex QX-5/QY-0, in combination with above-described vertices QX-4/QY-0, QX-4/QY-1, and QX-5/QY-1. Similar to the above-described formation of RCV5 and RCV6, additional rectangular regions RCV7 and RCV8 are defined—RCV6 by the carried-over FIG. 4 vertices QX-2/QY-2 and QX-3/QY-2, together with added vertices QX-2/QY-3 and QX-3/QY-0; and RCV7 by added vertex QX-5/QY-2, in combination with above-described vertices QX-4/QY-3, QX-4/QY-2, and QX-5/QY-1.

It will be understood that the above-described configurations and arrangements of the first pattern 600A and second pattern 600B can be extended or repeated. For example, a first pattern 600A fourth row of spot beams (not visible in FIG. 6A) can be positioned on an additional AX-parallel axis, extending under and spaced second distance D2 in a downward AY direction from XR2. In like manner a second pattern 600B fourth row of spot beams (not visible in FIG. 6B) can be positioned on an additional AX-parallel axis, extending under and spaced D2 in a downward AY direction from XR. The spot beams on such a first pattern 600A fourth row can be arranged, for example, relative to the centers of the first pattern 600A third row, in a manner identical to the above-described spatial relation of the FIG. 6A contribution 600A second row spot beams" to the contribution 600A first row spot beams. In a similar manner, each of the above-described contribution 600A first, second, and third row spot beams can be extended, for example, in a rightward direction (relative to the FIG. 6A borders) by successive spot beams spaced apart by twice D1. In addition, the above-described example extensions and repeated row configurations can be combined to form, for example, a first pattern similar to a concatenation in the AX direction of two or more duplicates of the FIG. 6A visible first pattern 600A, standing alone or combined with another concatenation, in the AY direction, of another two or more duplicates of the FIG. 6A visible first pattern 600A, or of the above example AX concatenation.

Figure 7A:
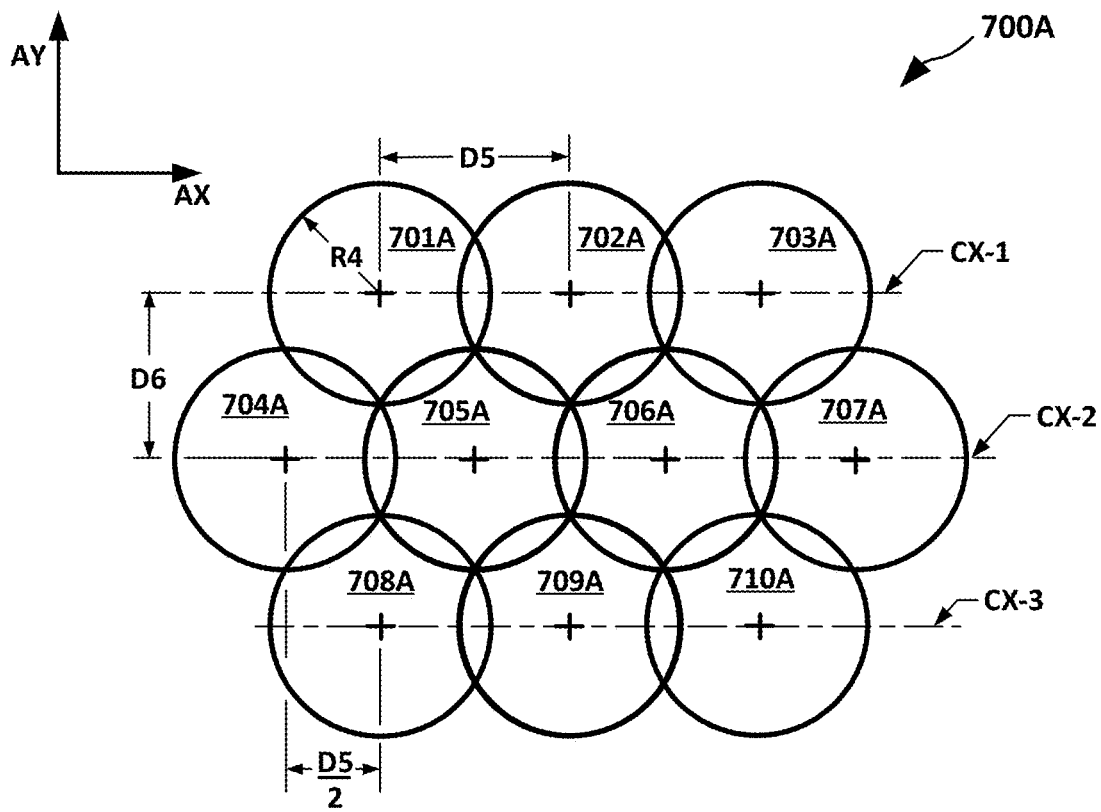
FIG. 7A is a diagram of a cluster of spot beams from another example first contribution pattern of spot beams, according to various aspects of this disclosure.

FIG. 7A is a diagram of another exemplary first contribution pattern 700A of spot beams ("first contribution pattern 700A" or "700A"), according to various aspects. The exemplary first contribution pattern 700A can be described in reference to three AX-parallel axes, CX-1, CX-2, and CX-3. Described according in top down order relative to the FIG. 7A view, CX-1 will be also be referred to as "700A first row axis CX-1," CX-2 as "700A second row axis CX-2," and CX-3 as "700A third row axis CX-3." The CX-2 axis and CX-3 axis are spaced along AY at intervals D6. Spot beams along the 700A first row axis CX-1 can include the above-mentioned 701A, as well as spot beams 702A and 703A, equally spaced by D5 center-to-center, and will be referred to collectively as "contribution 700A first row spot beams." Spot beams along the 700A second row axis CX-2 can include 704A, 705A, 706A, and 707A, equally spaced by D5, center-to-center, and will be referred to collectively as "contribution 700A second row spot beams." The D5 measurement is of a distance twice the distance measured by the above-described first distance D1. The contribution 700A second row spot beams can be offset by one-half D5 relative to the contribution 700A first row spot beams. The offset of one-half D5 is comparable to the first distance D1 described in reference to FIGS. 3A-6C. The offset is such that each pair of adjacent contribution 700A second row spot beams have their respective centers spaced symmetrically opposite from the projection onto CX-2 of a contribution 700A first row spot beam center. For example, referring to FIG. 7A, the respective centers of contribution 700A second row spot beams 704A and 705A are spaced, by one-half D5, symmetrically opposite from the projection onto CX-2 of the center of spot beam 701A. Spot beams along the 700A third row axis CX-3 can include 708A, 709A, and 710A, equally spaced by D5, center-to-center, and will be referred to collectively as "contribution 700A third row spot beams." The contribution 700A third row spot beams can be offset by one-half D5 relative to the contribution 700A second row spot beams, and therefore in AX alignment with the contribution 700A first row spot beams.

It will be understood that the above-described configuration and arrangement of the first pattern 700A can be extended or repeated. For example, a first pattern 700A fourth row of spot beams (not visible in FIG. 7A) can be positioned on an additional AX-parallel axis, extending under and spaced D6 in a downward AY direction from CX-3. The spot beams on such a contribution 700A fourth row can be arranged, for example, relative to the centers of the first pattern 700A third row, in a manner identical to the above-described spatial relation of the FIG. 7A contribution 700A second row spot beams" to the contribution 700A first row spot beams. In a similar manner, each of the above-described contribution 700A first, second, and third row spot beams can be extended, for example, in a rightward direction (relative to the FIG. 7A borders) by successive spot beams spaced apart by D5. In addition, the above-described example extensions and repeated row configurations can be combined to form, for example, a first pattern similar to a concatenation in the AX direction of two or more duplicates of the FIG. 7A visible first pattern 700A, standing alone or combined with another concatenation, in the AY direction, of another two or more duplicates of the FIG. 7A visible first pattern 700A, or of the above example AX concatenation.

Implementations can include combining another pattern contribution with the above-described FIG. 7A first pattern 700A in forming another exemplary offset composite RCC spot beam pattern, as will be described in greater detail in subsequent paragraphs. Features of such implementations can include configuring the FIG. 7A first pattern 700A and other contribution patterns such that reference lines can be applied, for example, similar to FIG. 4 QX-1, QX-2, QX-3, QY-1, and QY-2. Configuration can include setting spacings of the spot beams centers such that intersections of the reference lines are respectively positioned to be vertices defining a grid or tessellation of rectangular regions is provided, comparable in certain aspects to the FIG. 4 tessellation of RCVR1 and RCVR2, or the FIG. 6C RCV1, RCV2, . . . , RCV8.

It is also described above that in one or more implementations, it can be preferable to configure spacing between adjacent spot beam centers relative to a first axis, and spacing between adjacent spot beam centers relative to a second axis to have particular arithmetic relationships to the radius of the spot beams. For example, first distance D1 can be a multiplicative product of its corresponding spot beam radius, which is R2, and the cosine of 30 degrees, i.e., R2 multiplied by cos(30 degrees) or, rounded to three decimal places, 0.866*R2. In examples wherein the second distance D2 appears, such relationships can include configuring D2 as multiplicative product of the radius R2 and the numerical ratio of 3:2, i.e., 1.5*R2.

Accordingly, in an aspect, implementations using a first pattern contribution such as the FIG. 7A example 700A can include configuring D5 (which measures a distance twice the distance measured by D1) as 2*R3 multiplied by cos(30 degrees) or, rounded to three decimal places, 1.732*R3, and configuring D6 as 1.5*R3.

Figure 7B:
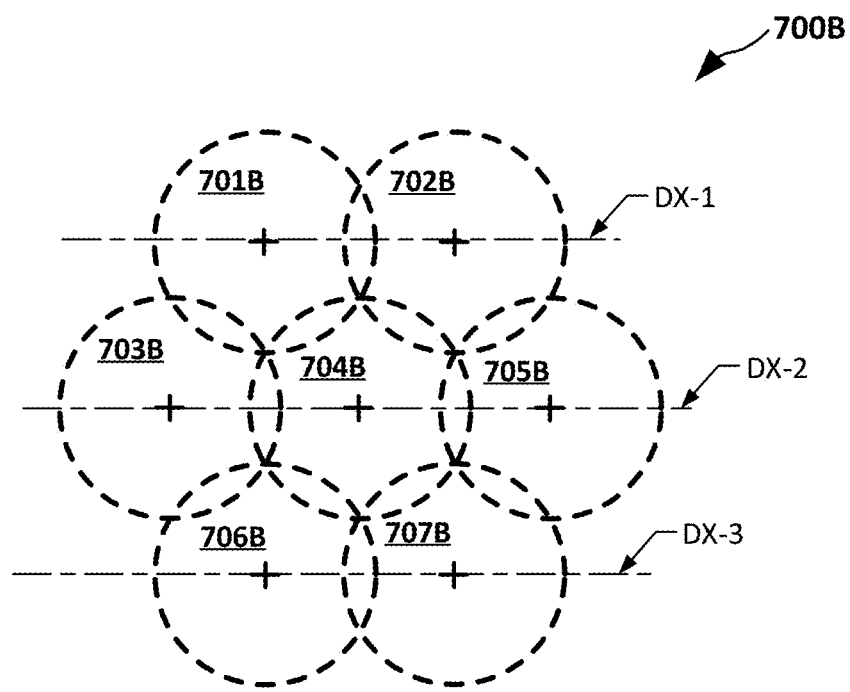
FIG. 7B is a diagram of a cluster of spot beams from another example second contribution pattern of spot beams, in an implementation as an offset replica of a region of the FIG. 7A first contribution pattern.

FIG. 7B is a diagram of a cluster of spot beams from another example second contribution pattern of spot beams ("second contribution pattern 700B" or "700B"). The exemplary second contribution pattern 700B can be described in reference to three AX-parallel axes, respectively labeled DX-1, DX-2, and DX-3. Such description is not intended to limit implementations of the second contribution pattern 700B to alignment on separately named axes; it is for convenience in various subsequent paragraph description of positions and offsets of second contribution pattern 700B spot beams relative to the first contribution pattern 700A. Referring to FIG. 7B, DX-2, and DX-3 can be spaced along AY at intervals D6. Spot beams along DX-1 can include 701B and 702B, spaced apart D5 center-to-center, which will be referenced collectively as "contribution 700B first row spot beams." Spot beams along DX-2 can include 703B, 704B, and 705B, equally spaced by D5, center-to-center, which will be referenced collectively as "contribution 700B second row spot beams." The contribution 700B second row spot beams can be offset by one-half D5 relative to the contribution 700B first row spot beams, such that each pair of adjacent contribution 700B second row spot beams have their respective centers spaced symmetrically opposite from the projection onto DX-2 of a contribution 700B first row spot beam center. For example, referring to FIG. 7B, the respective centers of contribution 700B second row spot beams 703B and 704B are spaced, by one-half D5, symmetrically opposite from the projection onto DX-2 of the center of spot beam 701B. Spot beams along DX-3 can include 706B and 707B spaced apart by D5, center-to-center, which can be referred to collectively as "contribution 700B third row spot beams," and can be offset by one-half D5 relative to the contribution 700B second row spot beams, and therefore in AX alignment with the contribution 700B first row spot beams.

It will be understood that the above-described configuration and arrangement of the first pattern 700A can be extended or repeated. For example, a first pattern 700A fourth row of spot beams (not visible in FIG. 7A) can be positioned on an additional AX-parallel axis, extending under and spaced D6 in a downward AY direction from CX-3. The spot beams on such implementation of a contribution 700A fourth row can be arranged, for example, relative to the centers of the first pattern 700A third row, in a manner identical to the above-described spatial relation of the FIG. 7A contribution 700A second row spot beams" to the contribution 700A first row spot beams. In a similar manner, each of the above-described contribution 700A first, second, and third row spot beams can be extended, for example, in a rightward direction (relative to the FIG. 7A borders) by successive spot beams spaced apart by D5. In addition, the above-described example extensions and repeated row configurations can be combined to form, for example, a first pattern similar to a concatenation in the AX direction of two or more duplicates of the FIG. 7A visible first pattern 700A, standing alone or combined with another concatenation, in the AY direction, of another two or more duplicates of the FIG. 7A visible first pattern 700A, or of the above example AX concatenation.

Figure 7C:
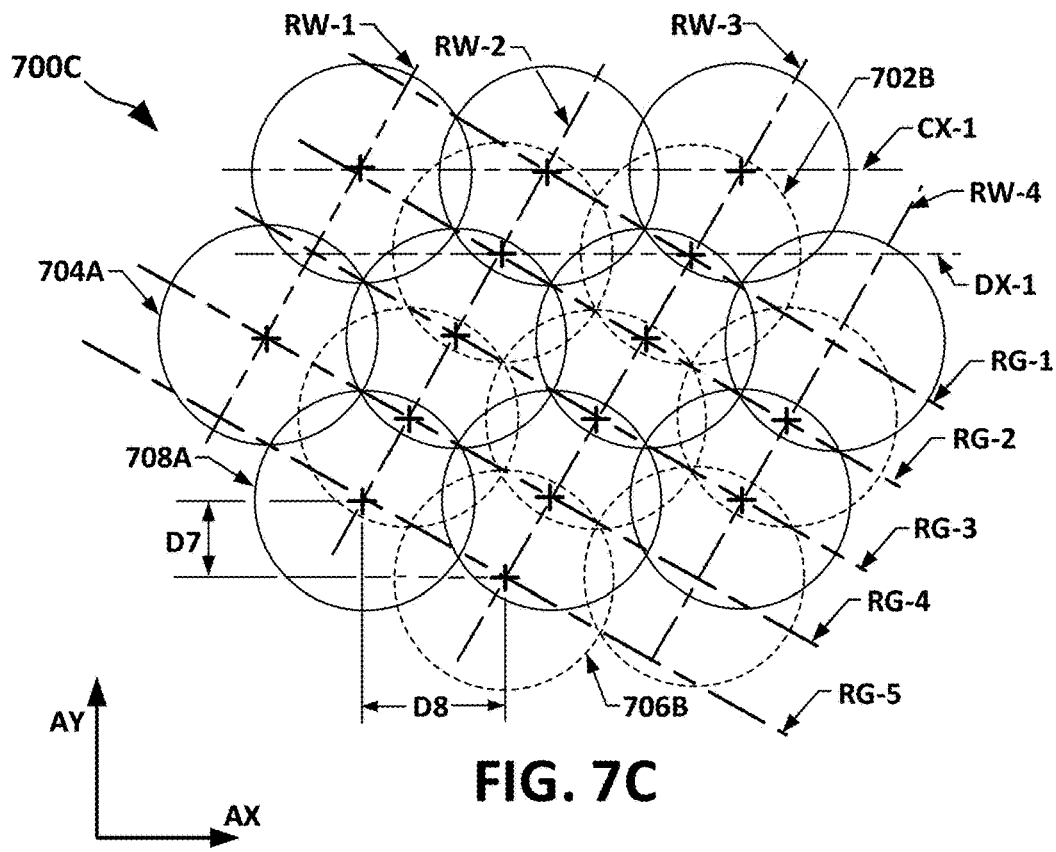
FIG. 7C is a diagram of an exemplary offset composite RCC spot beam pattern, the pattern having a combination of the FIG. 7A contribution and FIG. 7B contribution.

FIG. 7C is a diagram of an exemplary offset composite RCC spot beam pattern 700C, the pattern having a combination of the FIG. 7A first contribution pattern 700A and FIG. 7B second contribution pattern 700B. To avoid unnecessary density of graphics, FIG. 7C carries only a limited quantity of the FIGS. 7A and 7B item numbers in excess of a quantity and selection adequate to fully and unambiguously define all relative positions and orientations, within the FIG. 7C combination, of the FIG. 7A first contribution pattern 700A and FIG. 7B second contribution pattern 700B. For example, referring to FIG. 7C, the visible DX-1 and DX-2 axes, in combination with visible item numbers on the first contribution pattern 700A spot beams 704A and 708A and the second contribution pattern 700B spot beams 702B and 706B, in further combination with the AX-AY offset distances labelled "D7" and "D8," fully define the respective positions and orientation, within 700C, of the first contribution pattern 700A and second contribution pattern 700B.

In an implementation, D7 can be one-half the FIG. 7A spacing D6, and D8 can be D5 scaled by cos(30 degrees). In one such implementation D5 can be, as described above in reference to FIG. 7A:

$$D5=2*R3*\cos(300)\approx1.732*R3 \qquad \text{Equation (3)}$$

Accordingly, D8 can be:

$$D8=2*R3*\cos^2(300)=2*R3*0.75=1.5*R3 \qquad \text{Equation (4)}$$

Referring to FIG. 7C, for purposes of description a plurality of offset row axes, RW-1, RW-2, . . . , RW-4 (collectively "offset row axes RW") can be applied. RW-1, or "first offset row axis RW-1" aligns with the centers of 700A spot beams 701A and 704A; "second offset row axis"

RW-2 aligns with the centers of 700A spot beams 702A, 705A, and 708A; "third offset row axis" RW-3 aligns with the centers of 700A spot beams 703A, 706A, and 709A; and "fourth offset row axis" RW-4 aligns with the centers of 700A spot beams 707A and 710A. In an aspect, which is visible in the FIG. 7C example, the centers of second contribution pattern 700B spot beams 702B, 704B, and 706B can also aligned on the third offset row axis RW-3, interleaved with pattern 700A spot beams 703A, 706A, and 709A. Accordingly, the spacing between centers of adjacent spot beams on RW-3 can be as described above for the spacing of spot beams on RW-2, i.e., one-half of D5. Similarly, the centers of pattern 700B spot beams 705B and 707B can be on the fourth offset row axis RW-4, interleaved with pattern 700A spot beams 707A and 710A. The spacing between spot beams adjacent on RW-4 can therefore be one-half of D5.

For purposes of description, as visible in FIG. 7C, a plurality of reference lines, RG-1, RG-2, . . . , RG-5, (collectively, "longitudinal reference lines RG") can be applied, in a configuration extending parallel to one another, perpendicular to the offset row axes RW, and through centers of particular spot beams in the offset composite RCC spot beam pattern 700C. The lines RG are termed "longitudinal" because, as further described in reference to FIG. 7D, rectangular cell regions associated with pattern 700C can have a width and a length, and the length can extend in the RG direction. The longitudinal reference lines RG can include RG-1, extending through first contribution pattern 700A spot beams 707A and 702A; RG-2, extending through first contribution pattern 700A spot beams 706A and 701A; RG-3, extending through first contribution pattern 700A spot beams 705A and 710A; and RG-4, extending through first contribution pattern 700A spot beams 704A and 709A.

In an implementation, second contribution pattern 700B spot beam 702B can be centered along RG-1, with the above-described first contribution pattern 700A spot beams 702A and 707A. Similarly, second contribution pattern 700B spot beams 701B and 705B can be centered along RG-2, with the above-described pattern 700A spot beams 701A and 706A; second pattern 700B spot beam 704B can be on RG-3, with the above-described pattern 900A spot beams 705A and 710A; and second pattern 700B spot beams 703B and 707B can be centered along RG-4 with the above-described first pattern 700A spot beams 704A and 709A. Also, as visible in FIG. 7C, longitudinal reference line RG-5 can extend through the respective centers of FIG. 7A spot beam 708A and FIG. 7B spot beam 706B.

Figure 7D:
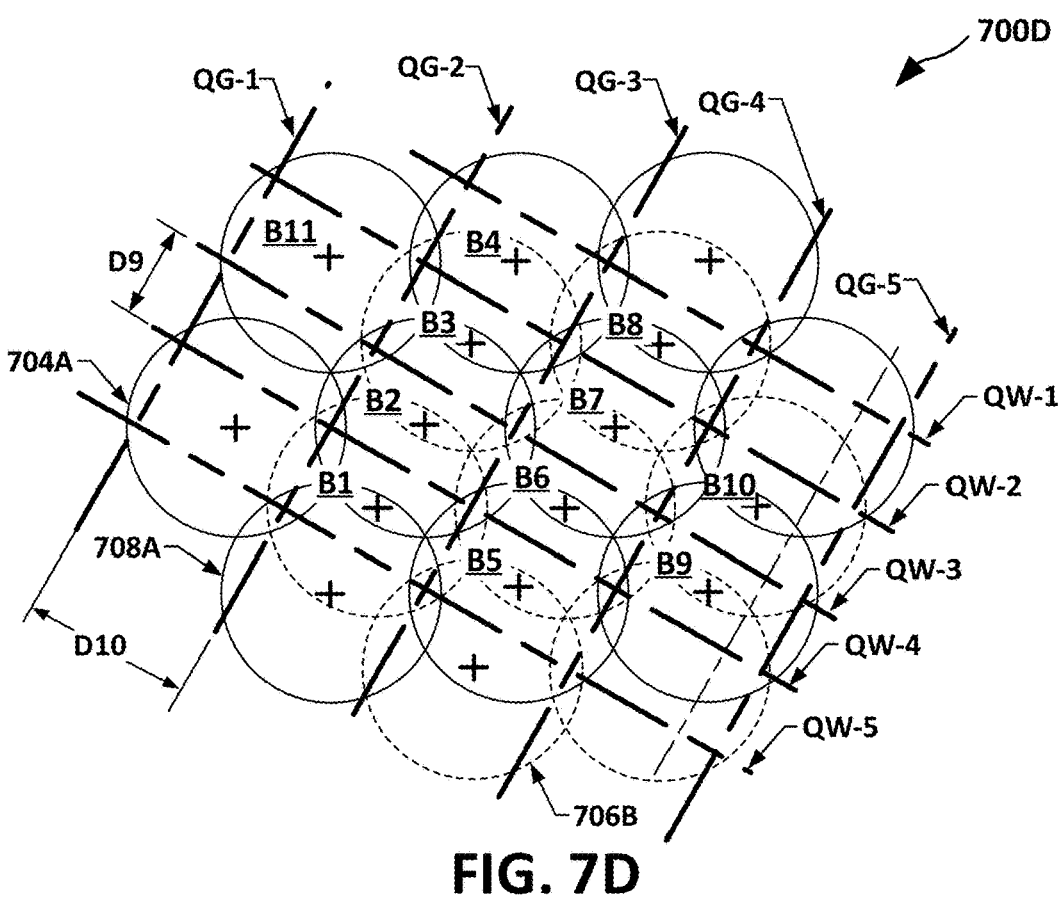
FIG. 7D is a diagram of a row-column tessellation of rectangular cell regions provided by the FIG. 7C offset composite RCC spot beam pattern, in one or more implementations of systems and methods for multiple beam signal distribution via PE tolerant reuse, according to various aspects of this disclosure.

Purposes of the above-described the offset row axes RW and longitudinal reference lines RG can include definition of lines of equidistance between adjacent spot beams of the offset composite RCC spot beam pattern 700C, as described in greater detail in reference to FIG. 7D.

FIG. 7D shows a graphically annotated diagram of a tessellation 700D of RCC regions, including RCC regions B1, B2, . . . , B11 (collectively "RCC regions BX"). The RCC regions BX can be defined according to equidistance reference lines QG-1, QG-2, . . . , QG-5 (collectively "longitudinal equidistance lines QG"), and equidistance reference lines QW-1, QW-2, . . . , QW-5 (collectively "lateral equidistance lines QW"). The term "lateral," in this context, refers to extending perpendicular (in the projection plane of FIG. 7D) to offset row axes QW, and "longitudinal," in this context, refers to extending parallel to the offset row axes RW. For purposes of description, the lateral equidistance lines QW-1, QW-2, . . . , QW-5 will be individually referred to according to the index numeral appended to "QW," for example, "first" lateral equidistance line QW-1, "second" lateral equidistance line QW-2, . . . , "fifth" lateral equidistance line QW-5. Similarly, the longitudinal reference lines QG-1, QG-2, . . . , QQ-4 will be individually referred to according to their appended numerals, for example, as "first" longitudinal line QG-1, "second" longitudinal line QG-2, . . . , "fourth" longitudinal reference line QG-4.

Each of the lateral equidistance lines QW extends either parallel to and spaced equidistant between two of the longitudinal reference lines RG, or adjacent to and parallel to a first or last longitudinal reference line RG, at a spacing equal to the equidistance. One example of parallel to and spaced equidistant between two longitudinal reference lines RG can be the second lateral equidistance line QW-2, as QW-2 extends parallel to and equidistant (in terms of spacing perpendicular to RG) between first longitudinal reference line RG-1 and second longitudinal reference line RG-2. One example of adjacent to and parallel to a first or last longitudinal reference line RG can be the first lateral equidistance line QW-1, as QW-1 extends parallel to and adjacent from the first longitudinal reference line RG-1, at a spacing equal to the equidistance by which second lateral equidistance line QW-2 is spaced from RG-1 and RG-2.

Each of the longitudinal equidistance lines QG extends either parallel to and spaced equidistant between two of the offset row axes RW, or adjacent to and parallel to a first or last offset row axis RG, at a spacing equal to the equidistance. One example of parallel to and spaced equidistant between two offset row axes RW can be the second longitudinal equidistance line QG-2, which extends parallel to and equidistant (in terms of spacing parallel to RG) between first offset row axis RW-1 and second offset row axis RW-2. One example of adjacent to and parallel to a first or last offset row axis RW can be the first longitudinal equidistance line QG-1, which extends parallel to and adjacent the first offset row axis RW-1, at a spacing equal to the equidistance of second longitudinal equidistance line QG-2 from RW-2 and RW-3.

Referring to FIG. 7D, each of the five longitudinal equidistance lines QG-1, QG-2, . . . , QG-5 intersects with each of the five lateral equidistance lines QW-1, QW-2, . . . , QW-5, forming twenty-five (integer 25) intersections (visible but not separately numbered). The 25 intersections can operate as 25 vertices. In the FIG. 7D example, the 25 vertices can form an RQ-RW grid of such vertices that, in turn, can fully define the tessellation of sixteen rectangular regions RCC-BX. For example, the intersections of longitudinal first equidistance line QG-1 with second lateral equidistance line QW2 and with third lateral equidistance line QW-3 establishes two vertices of RCC B10, namely, QG-1/QW-2 and QG-1/QW-3. The intersections of longitudinal equidistance line QG-2 with second lateral equidistance line QW2 and third lateral equidistance line QW-3 establishes the other two vertices of RCC B10, namely, QG-2/QW-2 and QG-2.

Figure 7E:
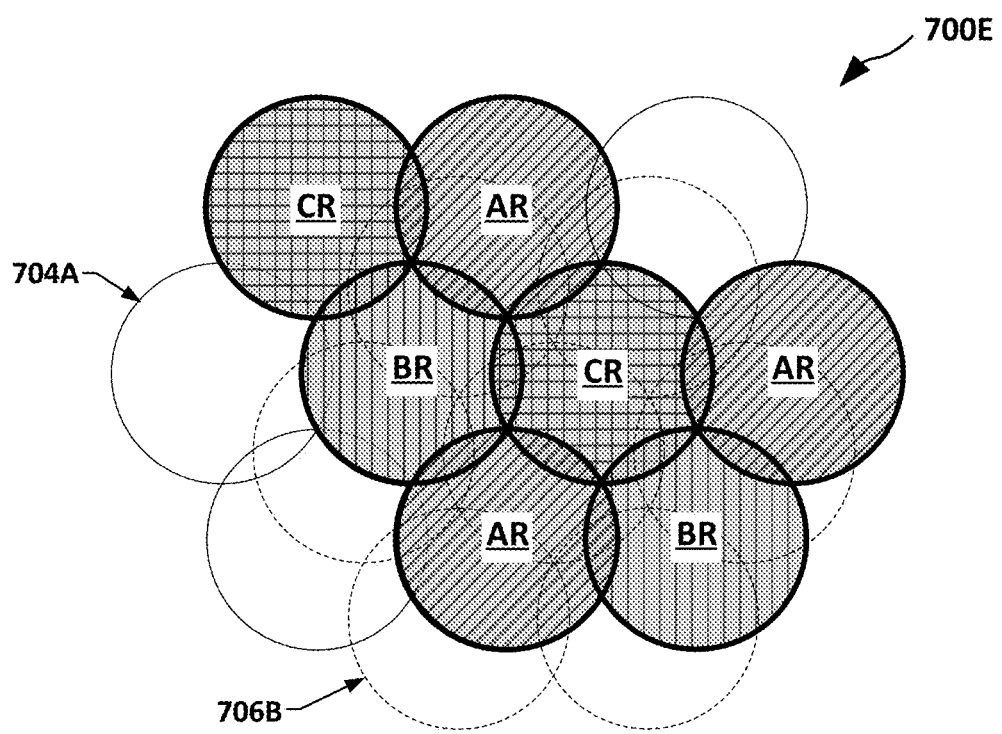
FIG. 7E is a diagram of an exemplary color assignment, to certain of the FIG. 7C offset composite pattern RCC spot beams, using 3 colors from an example 6-color reuse pattern.

FIG. 7E is a diagram of an exemplary color assignment 700E, to certain of the FIG. 7C offset composite pattern RCC spot beams, using 3 colors from an example 6-color reuse pattern. In an aspect, the FIG. 7E 3-color reuse can be associated with a 6-color reuse, which is described in greater detail in reference to FIGS. 7F-7H. As will be appreciated by person of ordinary skill upon reading this disclosure, the 3-color reuse can provide technical benefit over conventional techniques in the Ka-band, in which uniform bandwidth 3-color reuse requires at least one of the cells be dual polarization, i.e., served by both RHCP and LHCP colors. As shown in FIG. 7E, and FIGS. 7F-7H that follow, the 6-color approach can provide the equivalent, using one polarization per beam.

Figure 7F:
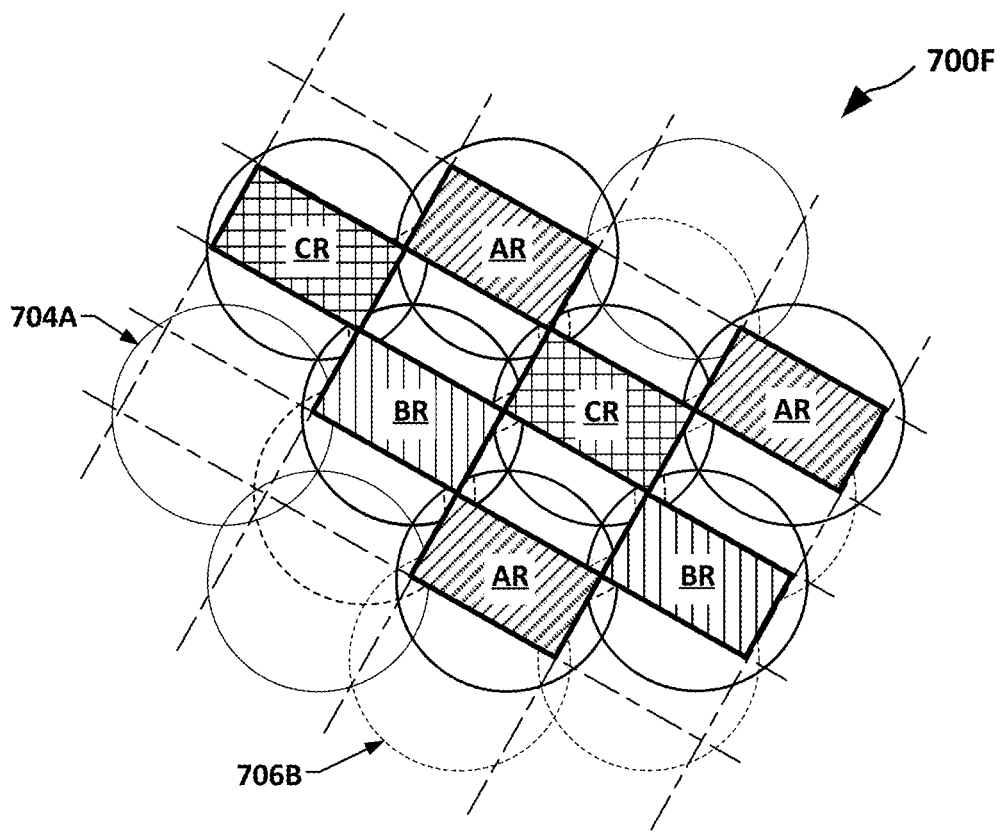
FIG. 7F is a diagram of an exemplary color assignment to certain of the rectangular cell regions in the FIG. 7D tessellation, corresponding to the FIG. 7E spot beam assignment.

FIG. 7F is a diagram of an exemplary color assignment 700F to certain of the rectangular cell regions in the FIG. 7D tessellation, corresponding to the FIG. 7E spot beam color assignment.

Figure 7G:
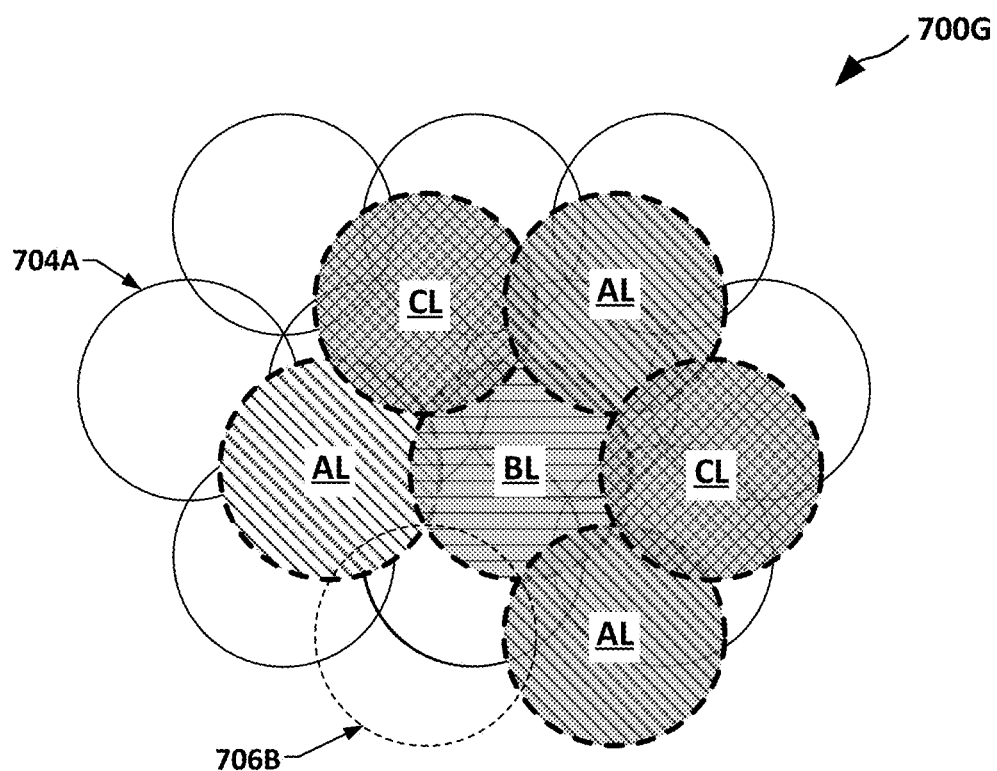
FIG. 7G is a diagram of an exemplary color assignment, to other of the FIG. 7C offset composite pattern RCC spot beams, using the remaining 3 colors of the 6-color reuse pattern.

FIG. 7G is a diagram of an exemplary color assignment 700G, to other of the FIG. 7D offset composite pattern RCC spot beams, using a remaining 3 colors of the 6-color reuse pattern.

Figure 7H:
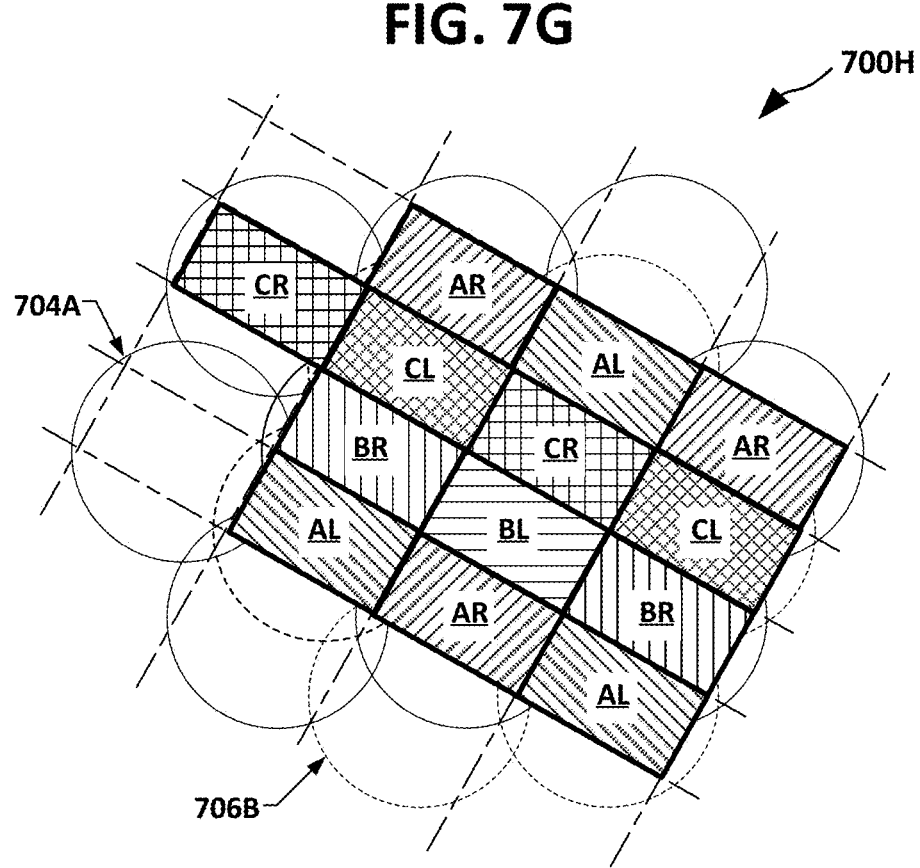
FIG. 7H is a diagram of an exemplary color assignment to rectangular cell regions in the FIG. 7D tessellation, corresponding to an overlay of the FIG. 7E and FIG. 7G assignments.

FIG. 7H is a diagram 700H of an exemplary color assignment to rectangular cell regions in the FIG. 7D tessellation, corresponding to an overlay of the FIG. 7E and FIG. 7G assignments.

Figure 8A:
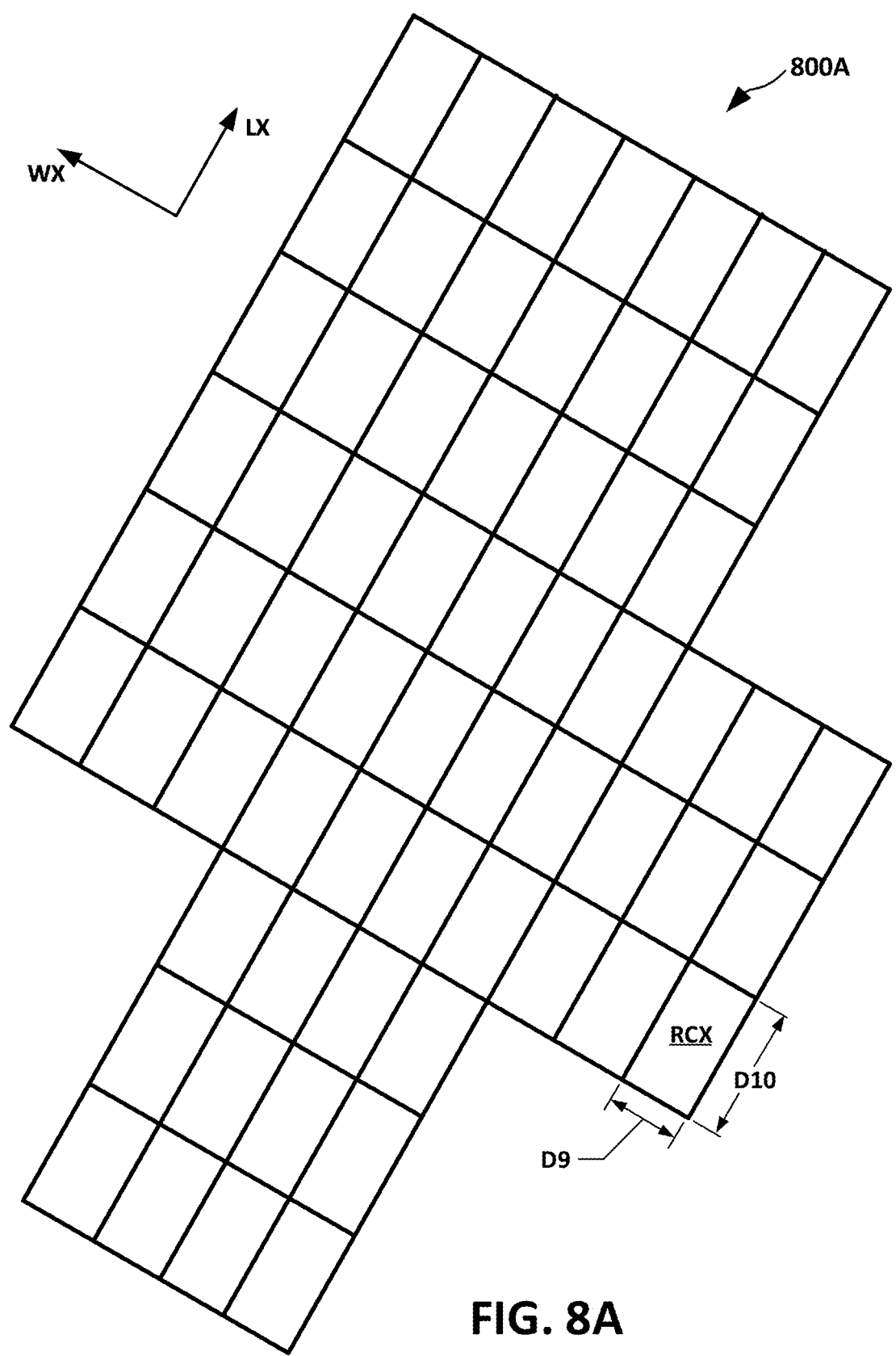
FIG. 8A is a diagram of a given row-column tessellation of rectangular cells of a service area, superposed on exemplary offset composite, RCC spot beam pattern according to various aspects of this disclosure.

FIG. 8A is a diagram of a given row-column tessellation 800A of rectangular cells, of which a representative one is labeled "RCX," all assumed as having a common width dimension D9 and a common length dimension D10. A frame of reference LX-WX appears on the upper left of the figure. The length D10 can align with LX and the width D9 can align with WX. For purposes of description, the LX-WX frame of reference can be approximated as a two-dimensional plane, but in actual implementations can have a spherical curvature corresponding, for example, to the curvature of the earth. Persons of ordinary skill in the pertinent arts, when facing a given application and having possession of the present disclosure, can readily determine when to use a planar approximation, and can determine when and how to accommodate for curvature of the earth and, therefore, further detailed description of such determination, and of accommodation for same, is omitted. The units of D9 and D10 can be, for example meters, kilometers, miles, or any other scalar length value.

Figure 8B:
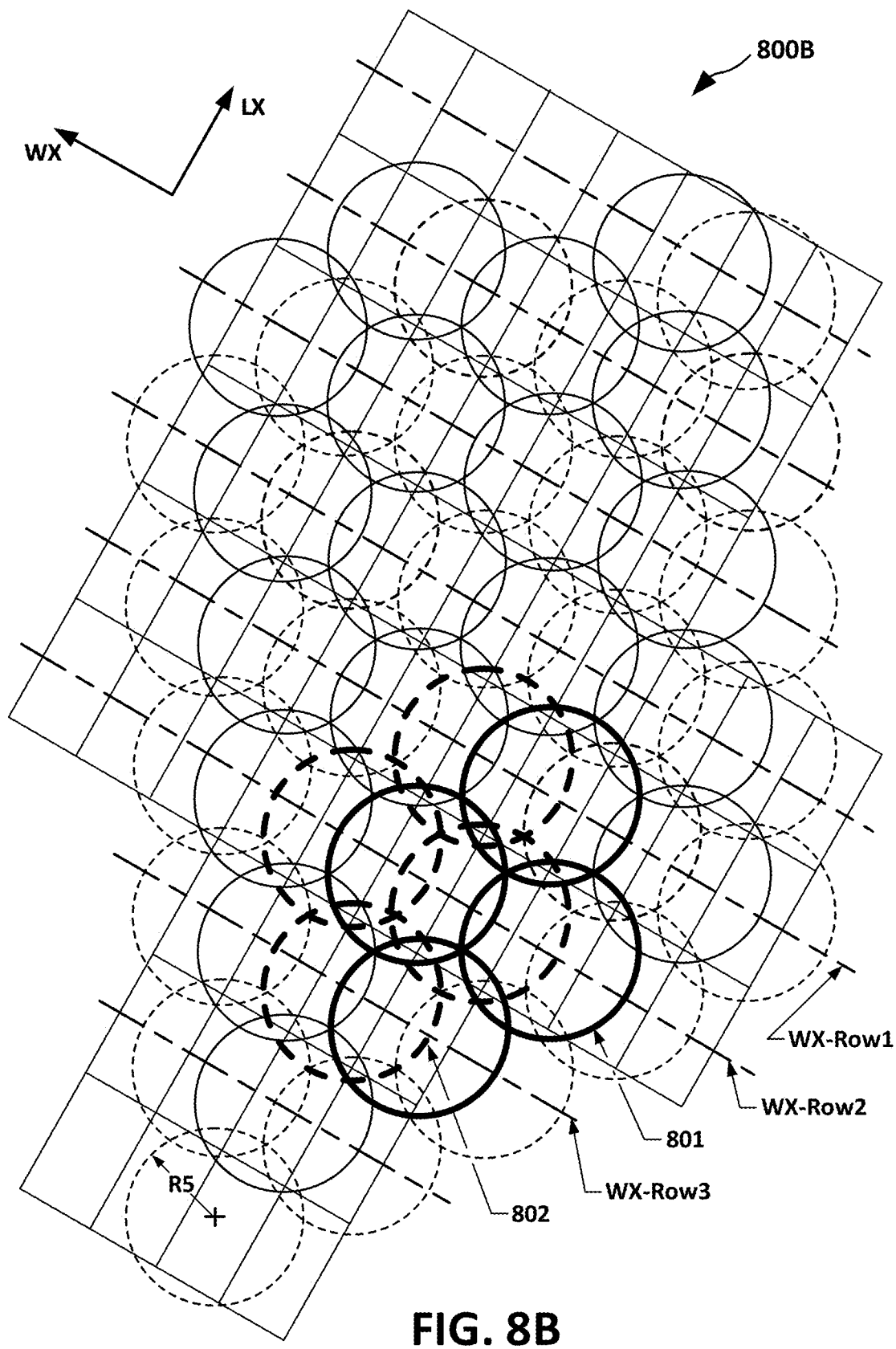
FIG. 8B is a diagram of an exemplary offset composite RCC spot beam pattern, configured to produce the FIG. 8A tessellation of rectangular coverage regions, for exemplary implementations of multiple beam signal distribution via PE tolerant reuse, according to various aspects of this disclosure

FIG. 8B is a diagram of an exemplary offset composite RCC spot beam pattern 800B ("pattern 800B"), configured to produce the FIG. 8A tessellation of rectangular coverage regions. All of the spot beams can be assumed as having a common radius R5, which appears as a dimension label on a representative spot beam at the lower region of the figure. The pattern 800B is visible as a composite of a solid line pattern and a dotted line pattern. A representative portion 801 ("first pattern 801") of the solid line pattern is highlighted in bold line. A representative portion 802 ("second pattern 802") of the dotted line pattern is likewise highlighted in bold line. As visible on FIG. 8B, the four spot beams forming first pattern 801 and the four spot beams forming second pattern 802 have respective alignments on WX-oriented row axes labeled "WX-Row1," "WX-Row2," and "WX-Row3." The respective alignments are such that the second pattern 802 is a replica of the first pattern 801, offset from 801 in the WX direction.

Referring to FIG. 8B and FIG. 4, it can be seen that the spatial relation of the first pattern 801 and second pattern 802, as aligned to the LX-WX frame of reference, can be comparable to the spatial relation of the FIG. 4 first pattern (spot beams 301A, 301B, 302A, 302B) to the FIG. 4 second pattern (spot beams 303, 401, 402A, 402B) as aligned to the AX-AY frame of reference. As described above, the edge of cell directivity typically varies from −3 dB to −6 dB relative to peak directivity. Those well versed in the art recognize that this is parameter that can be optimized for particular system needs. Since the rectangular cells provide additional immunity to interference and pointing error, it may change the nature of the trade space allowing additional system performance optimization.

Referring to FIGS. 3A-3C, 4, 8A, and 8B, it can be seen that given a geographic width and length of a rectangular cell, such as the FIG. 8A dimensions D9 and D10 of RBX, together with a given desired PE tolerance, a required spot beam radius, and spot beams spacing to meet such specifications can be determined. One exemplary methodology can proceed by reversing the FIGS. 3A-3C, and 4 description of the width and length of RCV1 (and RCV2) as a function of their respective spot beam spacings and edge of cell directivity. In an aspect, such methodology can be iterative, by including a cost/feasibility estimation of determined beam spacing and edge of cell directivity, followed by a conditional adjustment of the given specifications, e.g., rectangular cell width/length, or PE tolerance, or both, followed by another iteration of determining required spot beam spacing and edge of cell directivity.

Figure 8C:
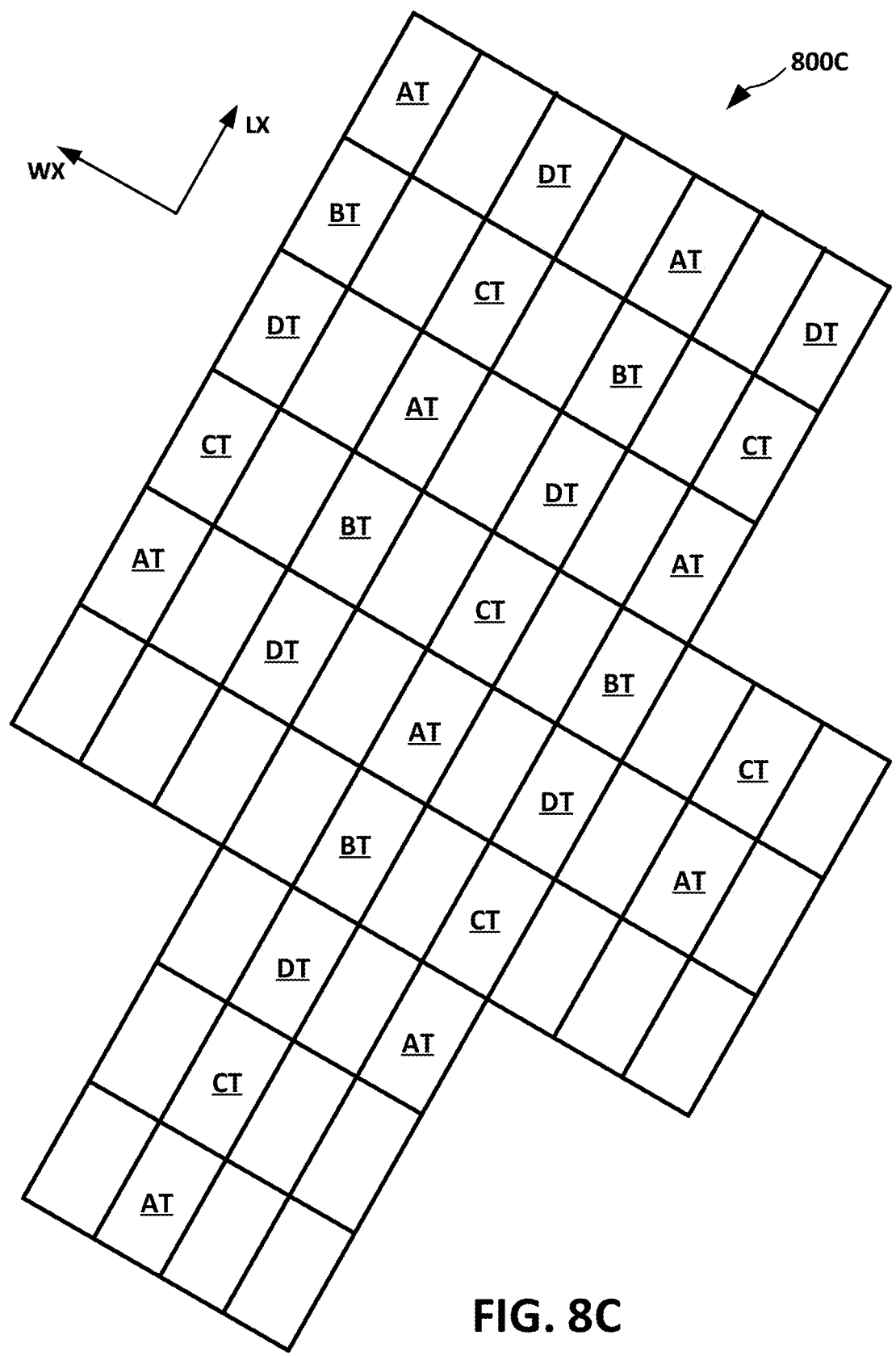
FIG. 8C is a diagram of a 4-color reuse pattern, using only right hand circular polarization (RHCP) to certain cells of the FIG. 8A tessellation of rectangular cells.

FIG. 8C is a diagram of a 4-color reuse pattern 800C, using only RHCP to certain cells of the FIG. 8A tessellation of rectangular cells. Colors AT, BT, CT and DT represent different frequency bands on a single polarization, for example RHCP. In one example of a specific implementation, a satellite can be configured to transmit in the 40-42 GHz fixed satellite service downlink band; AT can be 40.0-40.5 GHz, RHCP; BT can be 40.5-41.0 GHz, RHCP; CT can be 41.0-41.5 GHz, RHCP; and DT can be 41.5-42.0 GHz, RHCP. One of the 4 colors can be assigned to each of the rectangular cells in the tessellation 800A. It will be understood that these are only example frequency bands, and polarizations, not intended as a limitation on practices in accordance with this disclosure.

Figure 8D:
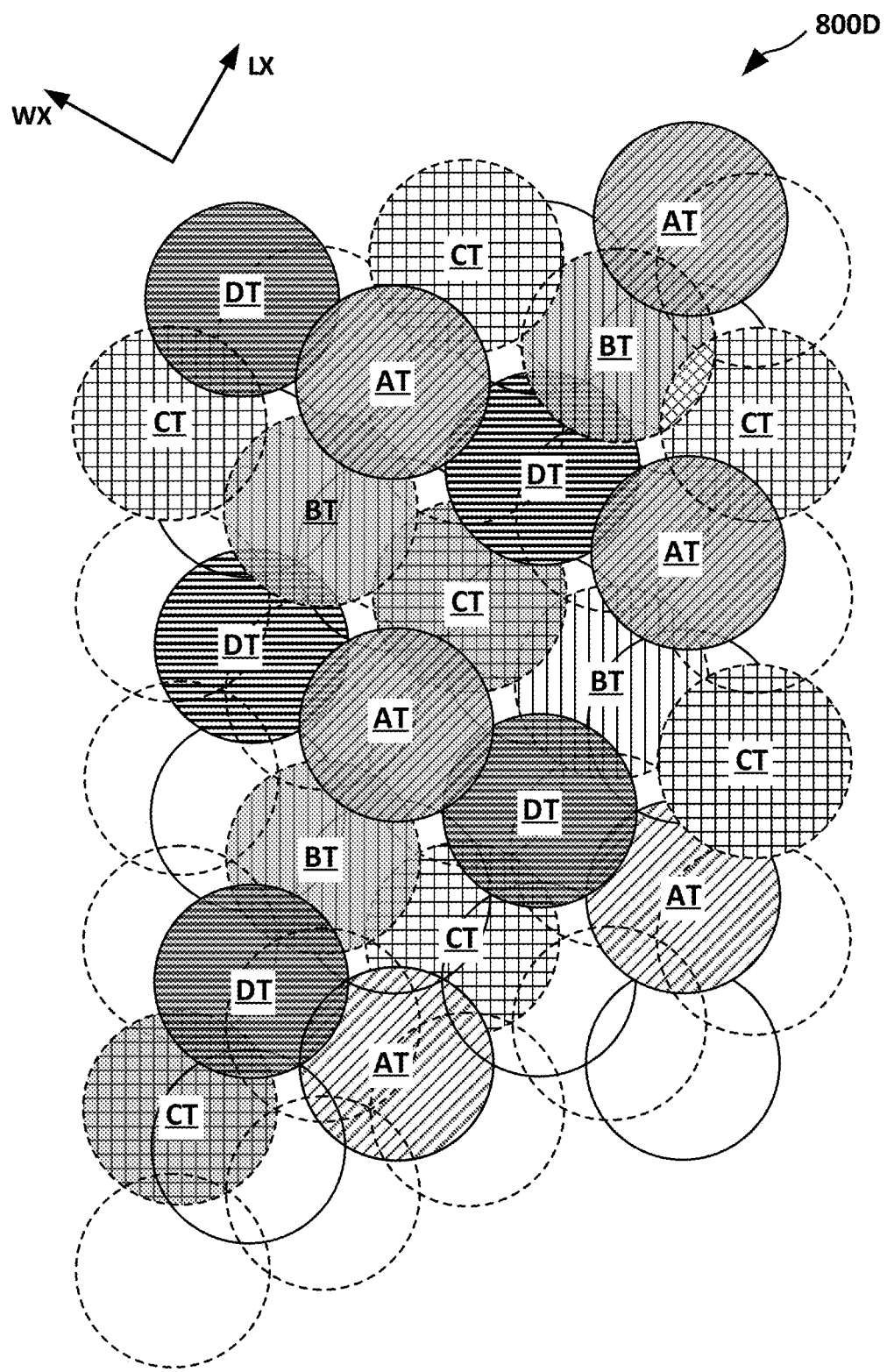
FIG. 8D is a diagram of the FIG. 8C 4-color reuse pattern, applied to the FIG. 8A superposed offset composite RCC spot beam pattern.

FIG. 8D is a diagram of the FIG. 8C 4-color reuse pattern 800D, applied to the FIG. 8A superposed offset composite RCC spot beam pattern.

Figure 8E:
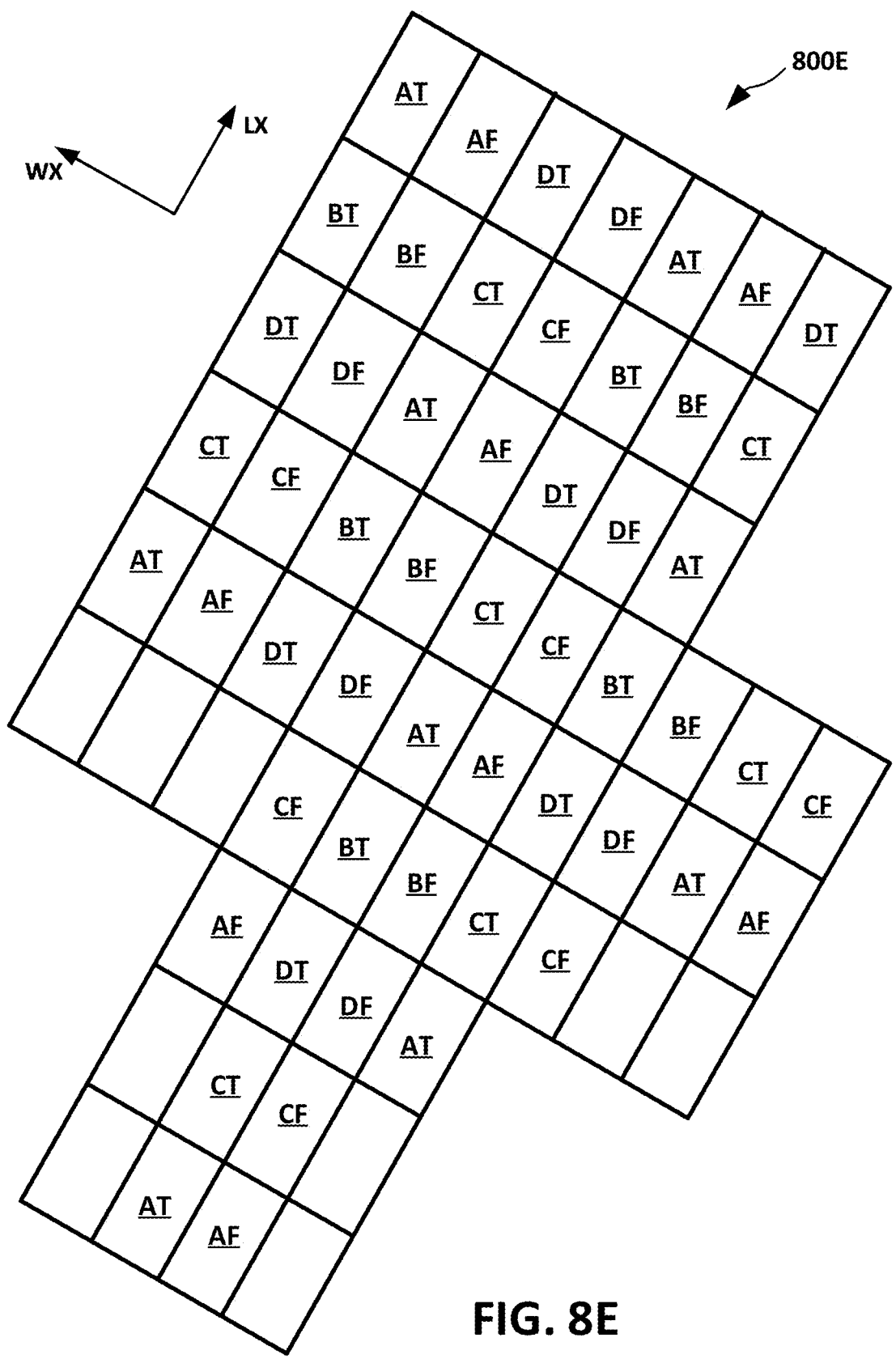
FIG. 8E is a diagram of an 8-color reuse pattern, assigning left hand circular polarization (LHCP) to certain other cells of the FIG. 8A tessellation of rectangular cells, for a service providing multiple beam signal distribution via PE tolerant reuse, according to various aspects of this disclosure.

FIG. 8E is a diagram of an 8-color reuse pattern 800E, formed by adding four colors to the FIG. 8B reuse, by assigning LHCP to certain other cells of the FIG. 8A tessellation of rectangular cells. This can implement, accordingly, service providing multiple beam signal distribution via PE tolerant reuse, according to various aspects of this disclosure.

Figure 8F:
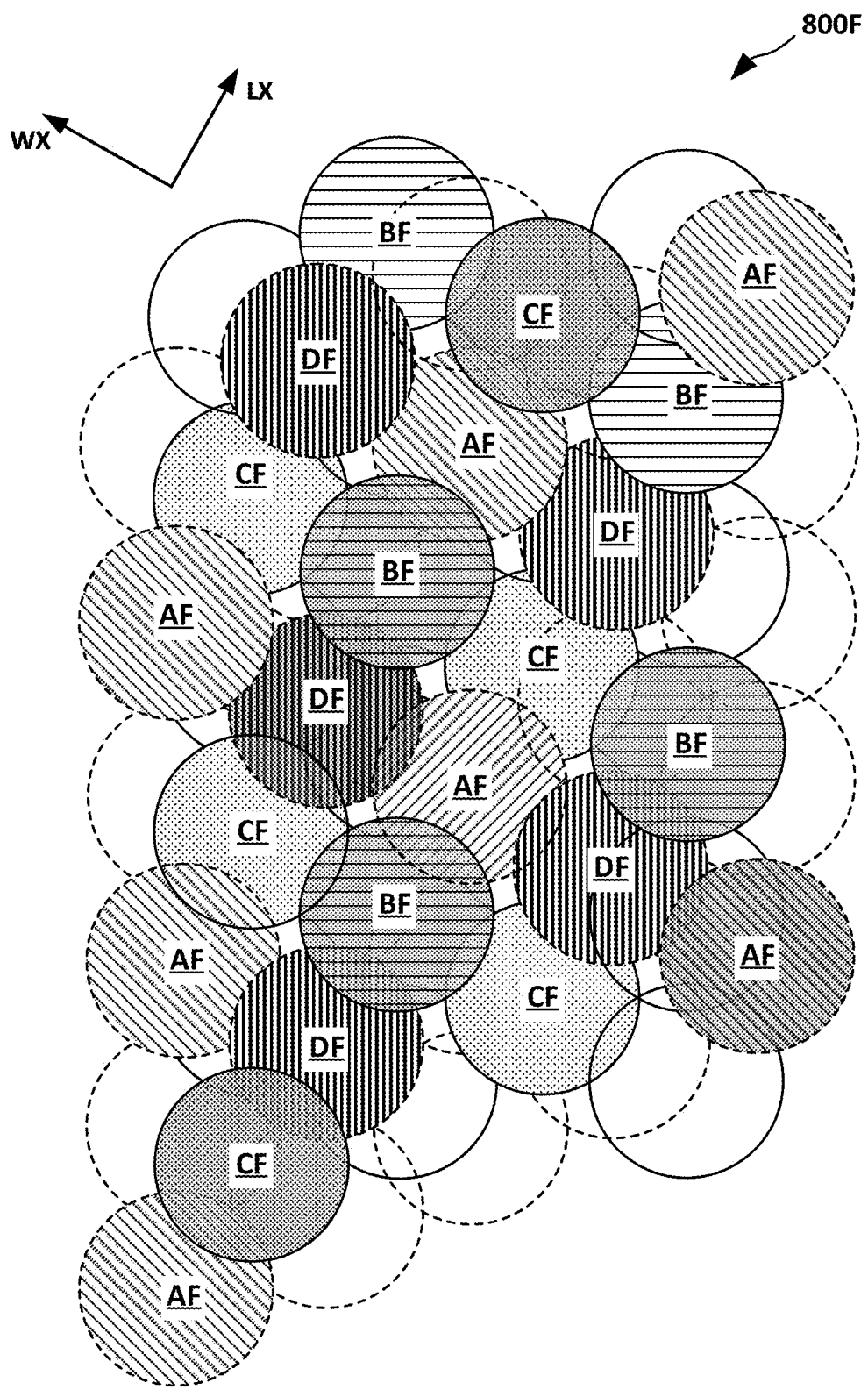
FIG. 8F is a diagram of the LHCP assignments in the FIG. 8E 8-color reuse, applied to the FIG. 8A superposed offset composite RCC spot beam pattern.

FIG. 8F is a diagram of the LHCP assignments 800F in the FIG. 8E 8-color reuse, applied to the FIG. 8A superposed offset composite RCC spot beam pattern. The net effect is to create the same amount of frequency reuse over a given service area using an 8-color reuse as a system using 4-colors and hexagon of radius R5, but with improved PE resistance and higher carrier-to-interference ratios.

Figure 9A:
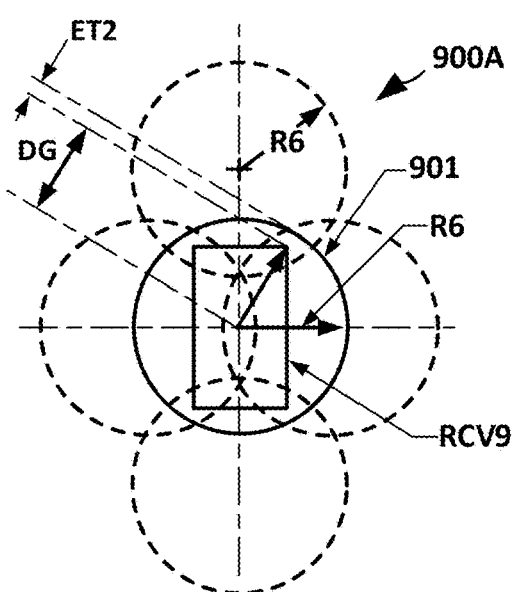
FIG. 9A is a diagram of a given rectangular cell within a spot beam, with graphic ratio of cell area to spot beam area corresponding to a cross-over at a first attenuation level.

FIG. 9A is a diagram of a model 900A of a rectangular cell RCV9 within a spot beam 901, having radius R6. The radius R6, and corresponding graphic ratio of cell area (of RCV9) to spot beam area, correspond to a cross-over at a first attenuation level. As visible in FIG. 9A, difference between the distance DG from the center of RCV9 to its corners and the radius R6 provides worst care direction error tolerance ET2.

Figure 9B:
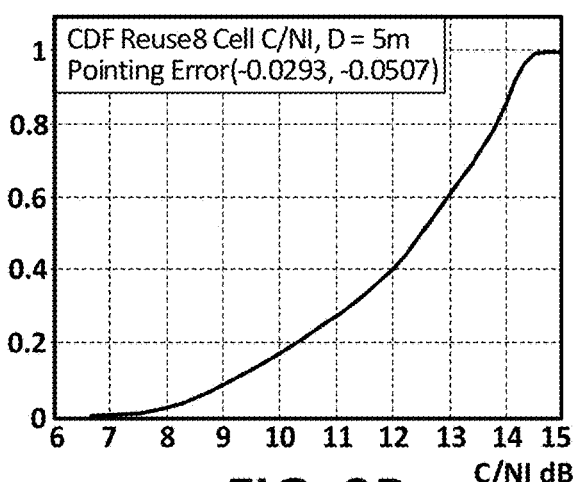
FIG. 9B is a graphical presentation of simulations of cumulative distribution of carrier-to-noise-plus-interference (C/NI), at a given pointing error, assuming the first attenuation level, with a reuse 8 color scheme.

FIG. 9B is a graphical presentation 900B of simulations of cumulative distribution of carrier-to-noise-plus-interference (C/NI), at a given pointing error, assuming the first attenuation level, configured with a color 8 reuse, setting the simulated antenna diameter at 5 meters.

Figure 10A:
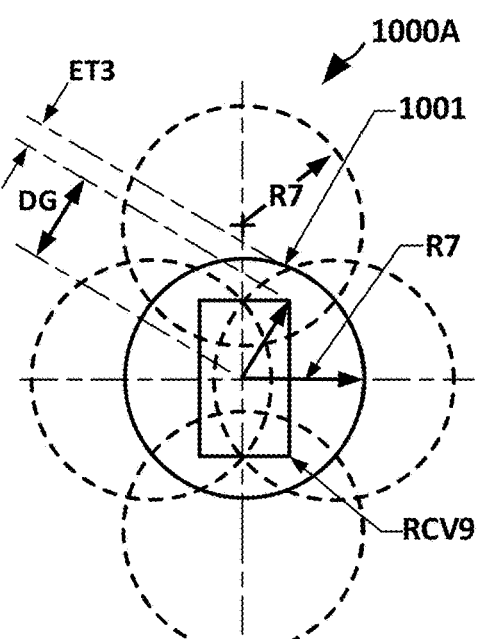
FIG. 10A is a diagram of the given rectangular cell within a spot beam, including diagrammed ratio of cell area graphic to spot beam area corresponding to a cross-over at a second attenuation level, lower than the FIG. 9A first level.

FIG. 10A is a diagram of a model 1000A of rectangular cell RCV9 within a spot beam 1001 having radius R7. The larger radius R7, and diagrammed ratio of cell area graphic to spot beam area, correspond to a cross-over at a second attenuation level, higher than the FIG. 9A first level. This might be implemented by reducing the antenna diameter thereby reducing antenna directivity so that the beam broadens. As visible in FIG. 10A, difference between the distance DG from the center of RCV9 to its corners and the radius R7 provides a larger worst care direction error tolerance, labeled ET3.

Figure 10B:
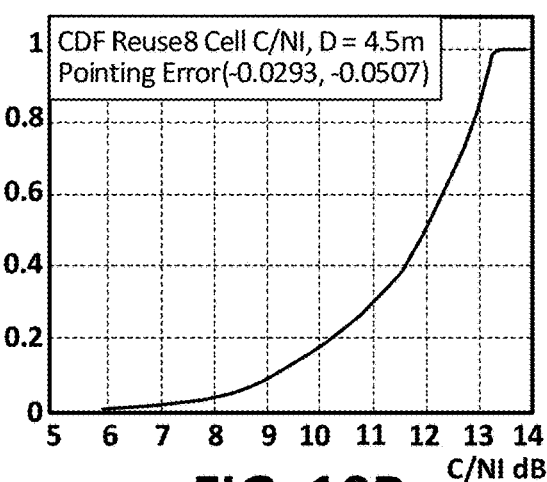
FIG. 10B is a graphical presentation of simulations of cumulative distribution of C/NI, assuming the same pointing error as used for FIG. 9B and a reuse 8 color scheme, with a larger antenna, and with the FIG. 10A second attenuation level cross-over.

FIG. 10B is a graphical presentation 1000B of simulations of cumulative distribution of C/NI, assuming the same pointing error as used for FIG. 9B, with the FIG. 10A second attenuation level cross-over, and using a smaller antenna. The specific example simulated antenna diameter is 4.5 meters. A comparison of FIG. 9B and FIG. 10B show that the FIG. 9A configuration, with its smaller antenna diameter, may be preferable over the FIG. 10A configuration, at least in some applications.

Figure 10C:
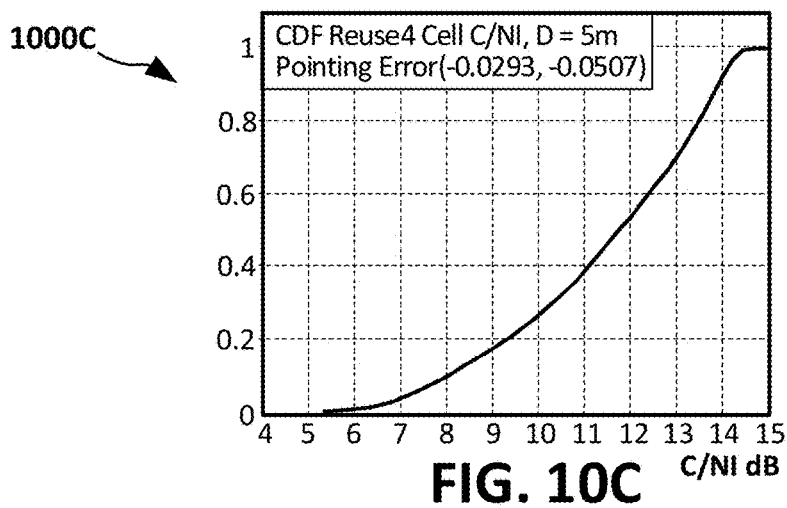
FIG. 10C is a graphical presentation of simulations of cumulative distribution of C/NI, assuming the same antenna size and cross-over as used for the FIG. 10B simulation, but using a reuse 4.

FIG. 10C is a graphical presentation 1000C showing the performance of a prior art 4-color reuse with the same antenna directivity as the beams in FIG. 9A. Comparing FIG. 10B with FIG. 10C, it can be seen that the smaller antenna with reuse 8 (FIG. 10B) can be comparable to, and in certain aspects can have performance advantages over, the larger antenna with reuse 4 (FIG. 10C). For example, the reuse 8 case only drops to 5 dB worst case C/NI, but the reuse 4 case drops to worst case 4 dB C/NI. Also, the 50% point shows the reuse 8 at about 12 dB C/NI, but the reuse 4 only at 11.5 dB C/NI. Accordingly, as shown by the simulation results, the disclosed technique can provide better performance with a smaller antenna. For the specific case shown in FIG. 10C, this reduction in directivity was limited to the 0.82 dB gained by the rectangular cell by reducing the antenna diameter by $\Delta D=10\%$ ($20 \log(\Delta D)=0.82$) as discussed reference to FIG. 5. That decrease in antenna diameter creates roughly an 11% increase in beam width, which adds 0.11R6 to the original PE resistance of 0.134R6. This in turn allows the PE to be 0.244R6 plus whatever degradation the system could have originally accepted, while maintaining the original average C/NI.

Figure 11B:
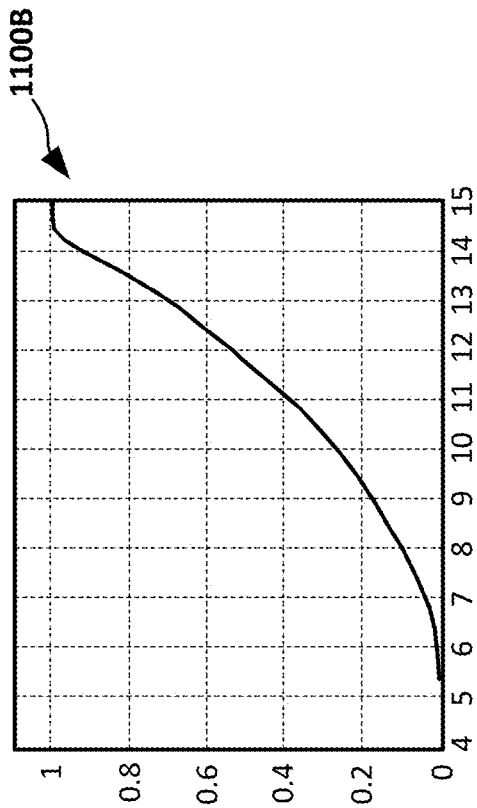
FIG. 11B is a graphical presentation of computer simulations on the FIG. 11a model, showing calculated cumulative distribution of C/NI, at a given pointing error, assuming the first attenuation level.
Figure 11A:
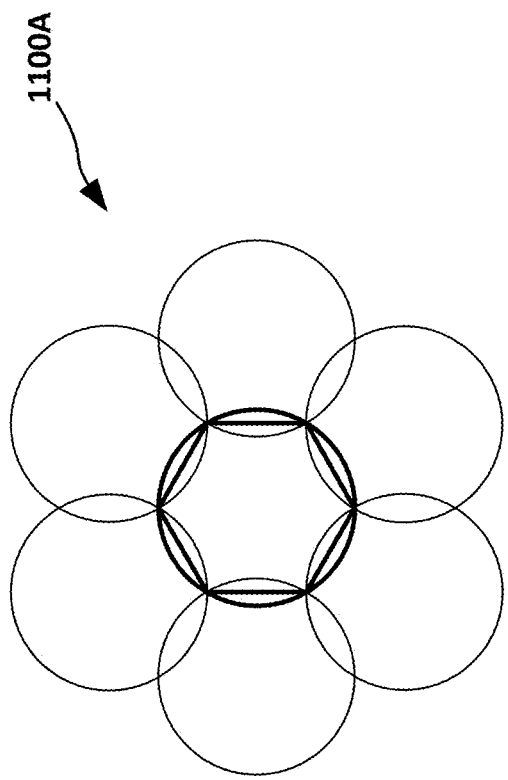
FIG. 11A is a diagram of a model of a hexagonal cell within a spot beam, with graphic ratio of cell area to spot beam area corresponding to a cross-over at a first attenuation level.

FIG. 11A is a diagram of a model 1100A of a hexagonal cell within a spot beam, and graphic ratio of cell area to spot beam area corresponds to cross-over at a first attenuation level.

FIG. 11B is a graphical presentation 1100B of computer simulations on the FIG. 11A model, showing calculated cumulative distribution of C/NI, at a given pointing error, assuming the cross-over at the first attenuation level.

Figure 12B:
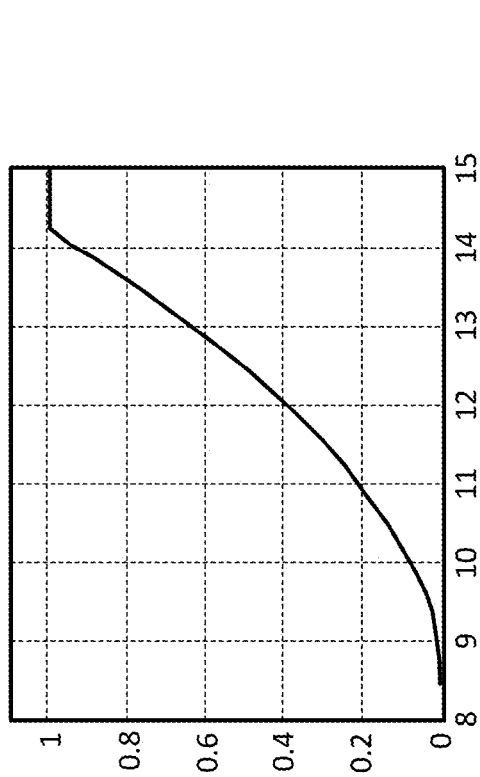
FIG. 12B is a graphical presentation of simulations of cumulative distribution of C/NI, assuming the same pointing error as used for FIG. 11A, with the FIG. 12A second attenuation level cross-over.
Figure 12A:
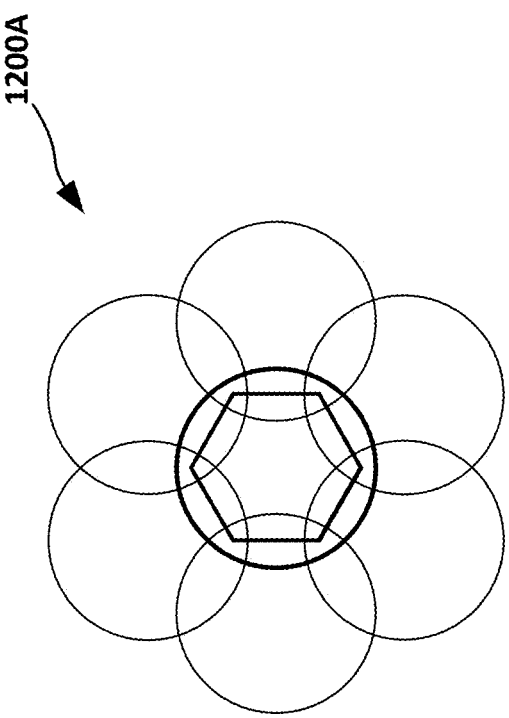
FIG. 12A is a diagram of the model of the hexagonal cell within a spot beam, including diagrammed ratio of cell area graphic to spot beam area corresponding to a cross-over at a second attenuation level, lower than the FIG. 11A first level.

FIG. 12A is a diagram of a modified model 1200A of the hexagonal cell within a spot beam, showing diagrammed ratio of cell area graphic to spot beam area corresponding to a cross-over at a second attenuation level, higher than the first level used in the FIG. 11A model 1100A. This was achieved by keeping the same antenna directivity, but moving the cell centers closer, as opposed to the approach of FIG. 10A in which the cells were not moved, but the beam directivity was decreased.

FIG. 12B is a graphical presentation 1200B of simulations of cumulative distribution of C/NI, assuming the same pointing error as used for the FIG. 11A model 1100A, applying the FIG. 12A second attenuation level cross-over. The improved performance of FIG. 12B over FIG. 11B incurs a corresponding requirement of more cells to cover the same geographic area.

Figure 13:
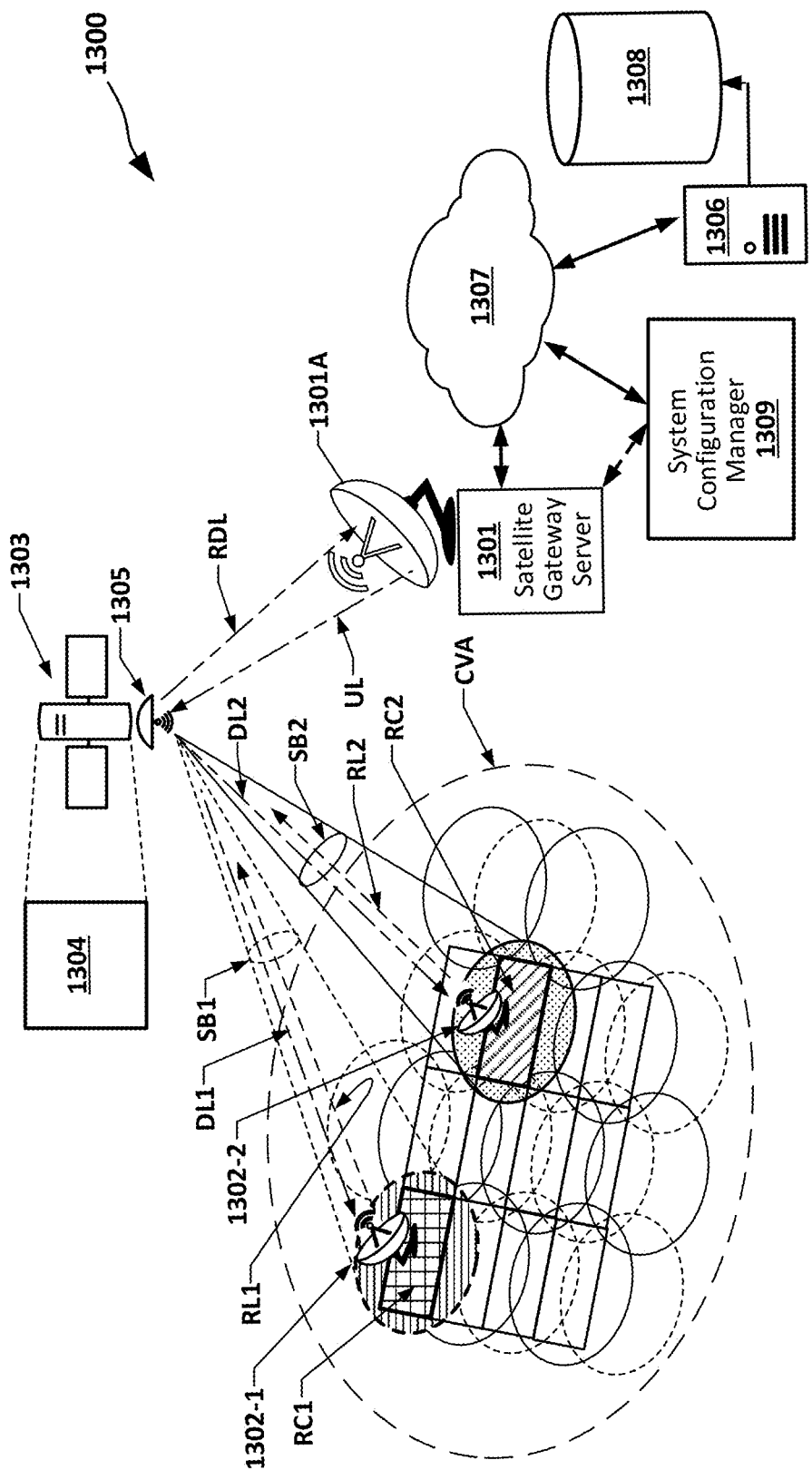
FIG. 13 is a high level schematic diagram of example implementation of a VSAT (very small aperture terminal) system, providing multiple beam, PE tolerant reuse, according to various aspects.

FIG. 13 is a high level schematic diagram of exemplary implementation of a VSAT system 1300 ("system 1300"), providing multiple beam, PE tolerant reuse, according to various aspects. The exemplary system 1300 includes a satellite gateway 1301, a first VSAT terminal 1302-1 within a first rectangular cell region RC1 and a second VSAT terminal 1302-2 within a second rectangular cell region RC2. The first VSAT terminal 1302-1, or the second VSAT terminal 1302-2, or both, can include a proxy server (not visible in FIG. 13), serving one or more terminal clients (not visible in FIG. 13).

Arranged between the gateway 1301 and the VSAT terminals 1302 can be a bent-pipe satellite link that can include a satellite 1303, or other elevated platform. The satellite 1303 can be implemented, for example, by a space-borne High Throughput Satellite (HTS). The satellite 1303 can include a reconfigurable beamforming unit 1304 having transmit and receive ports (not explicitly visible in FIG. 13) coupled to an antenna assembly 1305. Items 1304 and 1305 can be configured to form a plurality of spot beams such as the visible example, two of which are labeled, one as "SB1" and the other as "SB2." The system 1300 can include forward uplink feeder links UL, and forward downlink feeder links, such as the forward downlink feeder links DL1 and DL2 visible in FIG. 13. The system 1300 can include reverse uplinks (not visible in FIG. 13), such as example RU-1 from VSAT terminal 1302-1 to satellite 1303, and RU-2 from 1302-2 to 1303. Each of the VSAT terminals can include one or more terminal dishes (e.g., one for downlink reception, another for uplink transmission), and examples thereof are visible, but not separately numbered, for each of the first VSAT terminal 1302-1 and second VSAT terminal 1302-2. It will be understood that the satellite 1303 is only an exemplary implementation of the elevated platform, and is not intended as a limitation. Example alternative implementations can include, and are not limited to, a balloon, airship, or unmanned aircraft vehicle (UAV), supporting transponder equipment such as provided in an HTS.

The FIG. 13 gateway 1301 can connect to a content server 1306, for example, via a wide area network (WAN) 1307. The WAN 1307 can be implemented, in whole or in part, by the Internet. The content server 1306 can communicate with a content database 1308, for example, via the WAN 1307. The content database 1308 can represent multiple independent content databases, and these can include, without limitation, live streaming suppliers, and other multimedia content providers.

The system 1300 can also include a system configuration manager 1309, configured to perform processes including managing the reconfigurable beamformer 1304, and antenna structure 1306. The system configuration manager 1309 may perform processes for determining a coverage area CVA to be serviced by the satellite 1303. The system configuration manager 1309 may, for example, determine a set of rectangular cells within the coverage area CVA to be serviced by the satellite 1303. In system configuration manager 1309 may be configured to perform corresponding processes in determining an antenna configuration, namely a configuration of the beamformer 1304 that combined with the antenna assembly 1305 can provide acceptable bandwidth to user terminals, e.g., VSAT 1302-1 and 1302-2. Exemplary processes in determining an antenna configuration can include the number of antennas and the size of the antennas to maintain a specified directivity at the cell center and a beam width and the crossover ratio to maintain a specified directivity at the edge of the cell and the spacing of the cells. In some instances, the system configuration manager 1312 may include a control link to configure the satellite 1303, including its beamformer 1304 and antenna apparatus 1305, based on a new set of coverage area CVA and Quality of Service (QoS) parameters. Such configuration can employ or utilize, for example, a hybrid—color reuse plan (not explicitly visible in FIG. 13), new frequency assignments, new spot beam forming coefficients or new routing tables (none of which are explicitly visible in FIG. 13), or various combinations or sub-combinations thereof.

In one or more implementations, the system configuration manager 1309 may also service and/or maintain the satellite 1303. For example, the system configuration manager 1309 may transmit software updates while the satellite 1303 is operational, for example, in space. The system configuration manager 1309 may also instruct the satellite 1303 to move to a new geographical location. The system configuration manager 1312 may communicate with the platform 1302 via the gateway 1301 and/or a proprietary/private communication link. The platform 1302 can be configured to provide diagnostic and status information to the system configuration manager 1312 via the proprietary/private communication link and/or through the gateway 1301 multiplexed with communications traffic.

Figure 14:
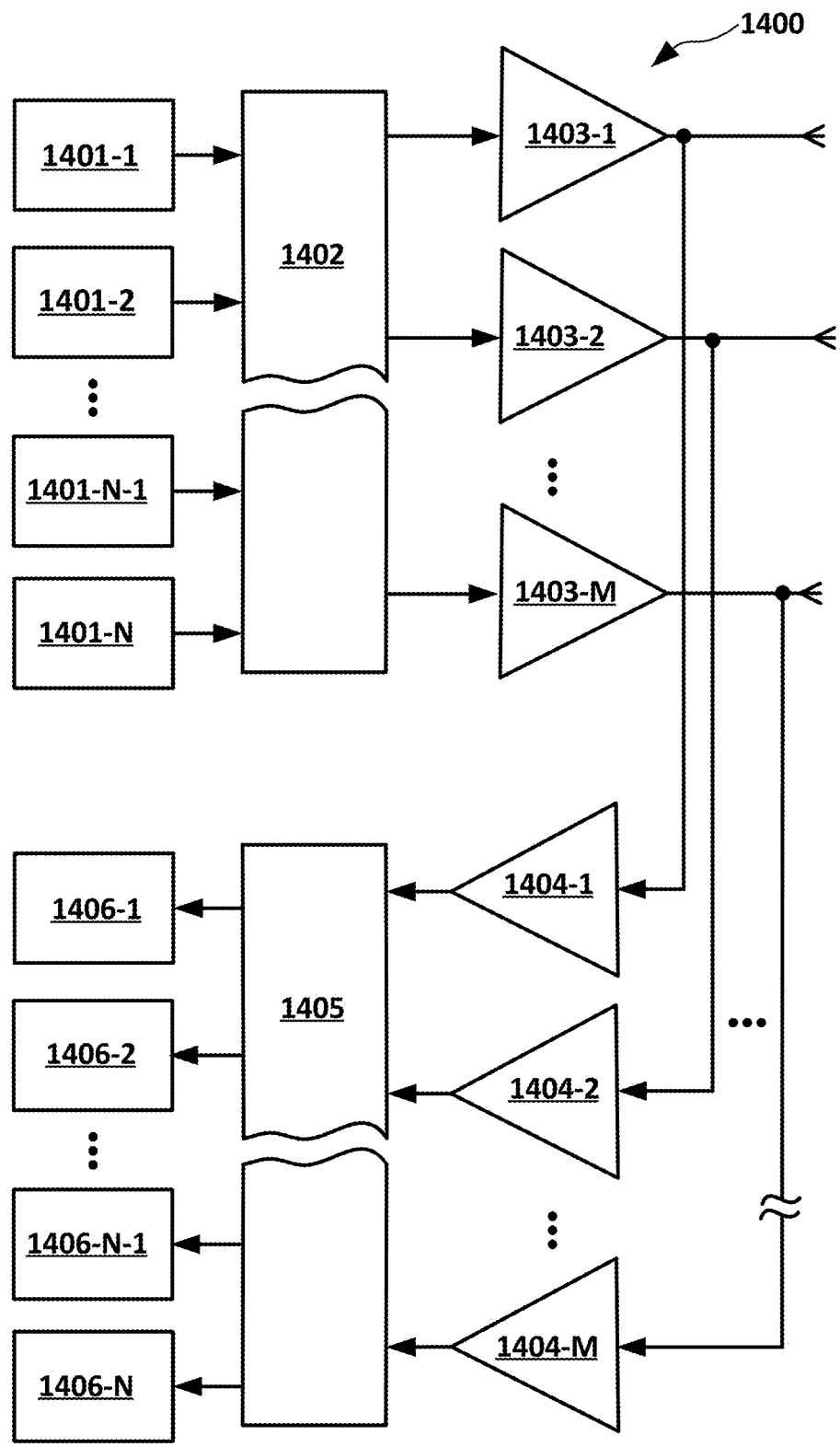
FIG. 14 is a simplified functional block diagram of aspects in one exemplary implementation of transmit/receive beamforming within a satellite shown in the FIG. 14 high level schematic diagram.

FIG. 14 is a simplified functional block diagram 1400 of aspects in one exemplary implementation of the transmit/receive beamformer 1304 within the satellite shown in the FIG. 13 high level schematic diagram. Each of the blocks 1401-1, 1401-2, . . . , 1402-N represents signals for a particular beam among N beams, which feed N radio frequency (RF) inputs of a transmit beamforming network 1402. Each of the M outputs (visible but not separately numbered) of the transmit beamforming network 1402 can feed a corresponding one of M solid-state power amplifiers 1403-1, 1203-2, . . . 1403-M, each feeding in turn a corresponding one of M antenna elements (visible but not separately numbered). Receive beamforming can be performed by each of the M antenna elements feeding a corresponding one of M low noise amplifiers 1404-1, 1404-2, . . . , 1404-M, that in turn feed an amplified, filtered signal to a corresponding one of M inputs to receive beamforming network 1405. The receive beamforming network 1405 can produce N outputs, one for each beam, as represented by blocks 1406-1, 1406-2, . . . , 1406-N. In an aspect, the transmit beamforming network 1402, M solid-state power amplifiers 1403-1, 1203-2, . . . 1403-M, as well as the M low noise amplifiers 1404-1, 1204-2, . . . 1404-M and the receive beamforming network 1405 can be controlled by a beamforming controller (not visible in FIG. 14), which can be configured to receive configuration data from the FIG. 13 system configuration manager 1309.

As described above, technical features of disclosed techniques include multiple beam signal distribution via composite RCC, PE tolerant reuse. The techniques do incur a doubling of the number of cells, but disclosed implementations can provide the doubling without incurring significant increase in actual complexity, compared to hexagonal cell techniques. For example, Table 1 below shows a comparison of estimated complexity aspects of a modeled system according to the present disclosure and a modeled system using conventional color reuse techniques. The Table 1 comparison assumes the user cells are transmit and receive. Feed ports are assumed both transmit and receive to fully count waveguides to the feeds. The Table 1 comparison assumes a satellite based beam former and channelizer such as item 1304 of the FIG. 13 system 1300, with features such as described in reference to FIG. 14. As can be seen in Table 1, the estimation shows the same solid state power amplifier (SSPA), bandwidth (BW), transmit (TX) and receive (RX) feeds, but a minor increase in hardware, due for example to increase in the number of filters, or in the number of ports on the satellite based beam former/channelizer.

TABLE 1

Comparison with Conventional Approach

| | Conventional | Offset |
|---|---|---|
| Antennas | 1 | 1 |
| Cells (Beam Ports) | M | 2M |
| Feeds (TX/RX elements) | N | N |
| Feed Ports (TX + RX) | 4N | 4N |
| SSPA | 2N | 2N |
| BW per SSPA (GHz at Q) | 2 | 2 |
| Transmit Beam Formers | 2 | 2 |
| TX Beam Former size | M(1 GHz) × N(2 GHz) | 2M(.5 GHz) × N(2 GHz) |

In an aspect, implementation can include two beamforming antennas. As seen from estimations shown in Table 2, it is estimated but not certain that application-specific tradeoffs between waveguide complexity and the number of antennas may be incurred. In Table 2, the single antennal solution is represented as Disclosure A and the two antenna solution is represented by Disclosure B.

TABLE 2

Comparison with Conventional Approach

| | Disclosure A | Disclosure B |
|---|---|---|
| Antennas | 1 | 2 |
| Cells (Beam Ports) | 2M | 2M |
| Feeds (TX/RX elements) | N | 2N |
| Ports per feed (TX + RX) | 4 | 2 |
| Polarization per Antenna | 2 | 1 |
| Feed Ports per Antenna | 4N | 2N |
| Feed Ports (TX + RX) | 4N | 4N |
| SSPA | 2N | 2N |
| BW per SSPA (GHz at Q) | 2 | 2 |
| Transmit Beam Former | 2 | 2 |
| TX Beam Former size | 2M(.5 GHz) × N(2 GHz) | 2M(.5 GHz) × N(2 GHz) |

FIG. 15A is a diagram 1500A of a computer simulation model of a spot beam 1501 overlaying a hexagonal cell cross-over boundary 1502 that is one-half the area of the spot beam.

FIGS. 15B and 15C show an alternative method of tessellation of the coverage area using half-area cells that are shaped as hexagons, in contrast to using half area cells that are shaped as rectangles discussed previously. An arbitrary one of the hexagons is labeled "HXC," for description of an aspect in reference to FIGS. 16A and 16B. Referring to FIG. 15B is a diagram 1500B of a tessellation of the FIG. 15A hexagonal cell cross-over boundaries, and a corresponding multi-beam pattern, and a graphically marked LHCP and RHCP aspect of a reuse scheme. FIG. 15C is an additionally marked FIG. 15B diagram, labelled 1500C, with a graphically marked example 3-color reuse scheme to the LHCP aspect. The FIG. 15C 3-color reuse scheme to the LHCP aspect is an alternative to the rectangular cells of FIG. 7H, both having the same reuse and beam size, and two cells per beam. The beam cross-over level for FIG. 15C, however, is higher than that of FIG. 7H in one direction and lower than that of FIG. 7H in the other direction.

Figure 16A:
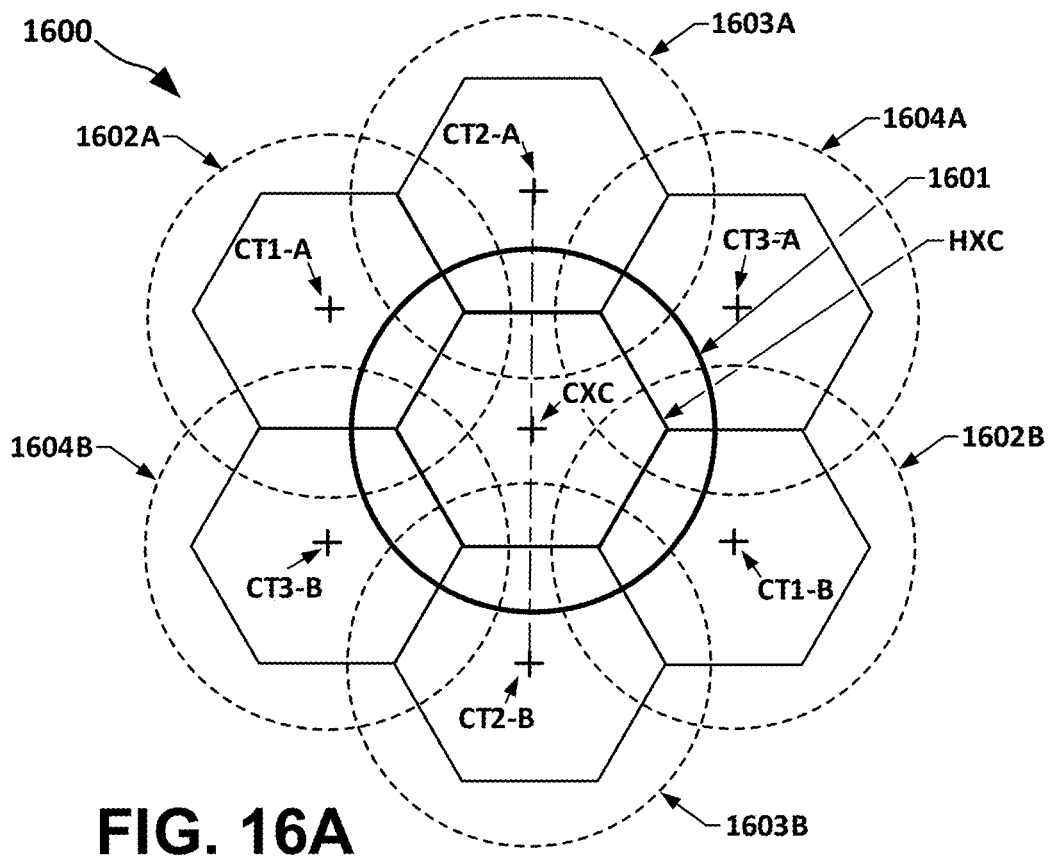
FIG. 16A is graphical diagram of a half-area hexagonal cell spot beam pattern, including cell spot beam centered on an arbitrarily selected hexagonal cell region of FIGS. 15B and 15C.
Figure 16B:
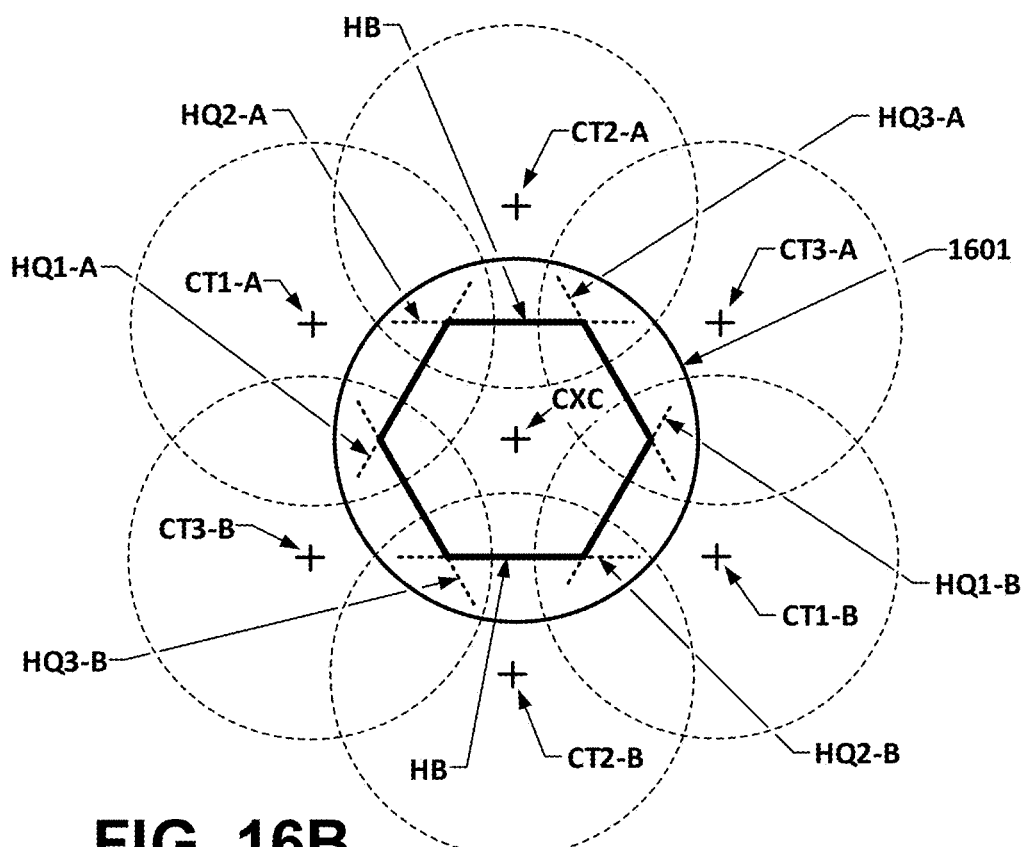
FIG. 16B is a modification FIG. 16A, showing equidistance reference lines and a corresponding definition of a half-area hexagonal cell region.

FIG. 16A is graphical diagram of a half-area hexagonal cell spot beam pattern 1600, which includes a cell spot beam 1601 centered on the center CXC of the hexagonal cell region HXC of FIGS. 15B and 15C. FIG. 16B is a modification FIG. 16A, showing equidistance reference lines and a corresponding definition of a half-area hexagonal cell region.

Referring to FIG. 16A, the half-area hexagonal cell spot beam pattern 1600 includes six adjacent spot beams, in an arrangement relative to the hexagonal cell region HXC such as visible in FIG. 16A for the exemplary adjacent spot beams 1602A, 1602B, 1603A, 1603B, 1604A, and 1604B. For purposes of description, adjacent spot beams 1602A and 1602B will be referenced collectively as "first pair of adjacent cell spot beams 1602," adjacent spot beams 1603A and 1603B will be referenced collectively as "second pair of adjacent cell spot beams 1603," and adjacent spot beams 1604A and 1604B will be referenced collectively as "third pair of adjacent cell spot beams 1604." Spot beams forming the first pair of adjacent cell spot beams 1602 are aligned on respective centers CT1-A (for 1602A) and CT1-B (for 1602B). Spot beams forming the second pair of adjacent cell spot beams 1602 are aligned on respective centers CT2-A (for 1603A) and CT2-B (for 1603B), and spot beams forming the third pair of adjacent cell spot beams 1604 are aligned on respective centers CT3-A (for 1604A) and CT2-B (for 1604B).

Referring to FIG. 16B, a first equidistance line "HQ1-A" is visible, tracing points equidistant between the center CXC of hexagonal cell region HXC and CT1-A, which is the center of 1602A, one of the hexagonal cell HXC first pair of adjacent cell spot beams 1602. A second equidistance line "HQ1-B" tracing points equidistant between CXC and CT1-B, the center of 1602B, the other of the first pair of adjacent cell spot beams 1602. HQ1-A and HQ1-B extend parallel to one another. In like manner, third equidistance line "HQ2-A" traces points equidistant between CXC and CT2-A, the center of 1603A, one of the second pair of adjacent cell spot beams 1603, and fourth equidistance line "HQ2-B" traces points equidistant between CXC and CT2-B, the center of 1603B, the other of the second pair of adjacent cell spot beams 1603. In addition, fifth equidistance line "HQ3-A" traces points equidistant between CXC and CT3-A, the center of 1604A, one of the third pair of adjacent cell spot beams 1602, and sixth equidistance line "HQ3-B" traces points equidistant between CXC and CT3-B, the center of 1604B, the other of the third pair of adjacent cell spot beams 1604. First and second equidistance lines HQ1-A and HQ1-B are parallel to one another, third and fourth equidistance lines HQ2-A and HQ2-B are mutually parallel, and fifth and sixth equidistance lines HQ3-A and HQ3-B are parallel to one another.

The first equidistance line HQ1-A intersects third equidistance line HQ2-A at an intersection (visible in FIG. 16B but not separately numbered) that is interior to the cell spot beam 1602. The intersection will be referred to, for purposes of description, as "first intersection HQ1-A/HQ2-A." Second equidistance line HQ1-B intersects fourth equidistance line HQ2-B at an intersection (not separately numbered), interior to the cell spot beam 1602, that will be referred to as "second intersection HQ1-B/HQ2-B." Third and fifth equidistance lines, HQ2-A and HQ3-A intersect at an intersection (not separately numbered) that interior to the cell spot beam 1602, which will be referred to as "third intersection HQ2-A/HQ3-A." In like manner, fourth and sixth equidistance lines, HQ2-B and HQ3-B, form "fourth intersection HQ2-B/HQ3-B," first and sixth equidistance lines, HQ1-A and HQ3-B, form "fifth intersection HQ1-A/HQ3-B," and second and fifth equidistance lines, HQ1-B and HQ3-A, form "sixth intersection HQ1-B/HQ3-A."

As is visible in FIG. 16B, the respective line segments of first equidistance line HQ1-A, second equidistance line HQ1-B, . . . , and sixth equidistance line HQ2-B that extend between the above-described first intersection HQ1-A/HQ2-A, second intersection HQ1-B/HQ2-B, . . . , and sixth intersection HQ2-B/HQ3-B form a hexagonal perimeter HB that is aligned with the hexagonal cell region HXC. Each of the first intersection HQ1-A/HQ2-A, second intersection HQ1-B/HQ2-B, . . . , and sixth intersection HQ2-B/HQ3-B forms a vertex of the HXC.

FIGS. 17 A, 17B and 17C show another alternative method of tessellation of the coverage area using one third area cells that are shaped as hexagons, in contrast to using half area cells that are shaped as rectangles or hexagons discussed previously. As the area of the cell decreases relative to the size of the beam, the beam crossover moves higher resulting in more PE immunity.

FIG. 17A is a diagram of a tessellation 1700A of hexagonal cell cross-over boundaries, overlaid with a pattern of spot beams, with the boundary the cell cross-over level forming each hexagonal cell boundary to have one-third of the area of its spot beam.

FIG. 17B is a diagram of an extension 1700B of the FIG. 17A tessellation of one-third area hexagonal cell cross-over boundaries, and graphically marked aspects of a reuse scheme.

FIG. 17C is an additionally marked FIG. 17B diagram, 1700C, with graphical marking of additional aspects of the reuse scheme.

Figure 18:
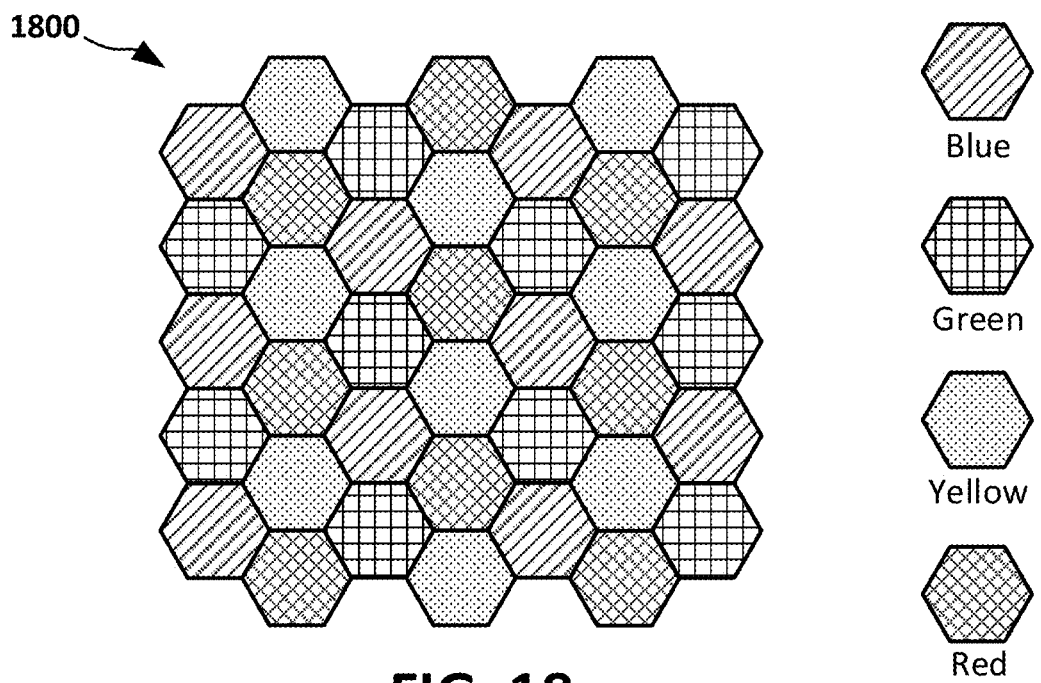
FIG. 18 is a graphical representation of a 4-color reuse, overlaid on a modelled tessellation of hexagonal cells, for computer simulation of a hexagonal cell performance.

FIG. 18 is a graphical representation of a 4-color reuse 1800, shown as an overlay on a modelled tessellation of hexagonal cells, for computer simulation of a hexagonal cell performance.

Figure 19:
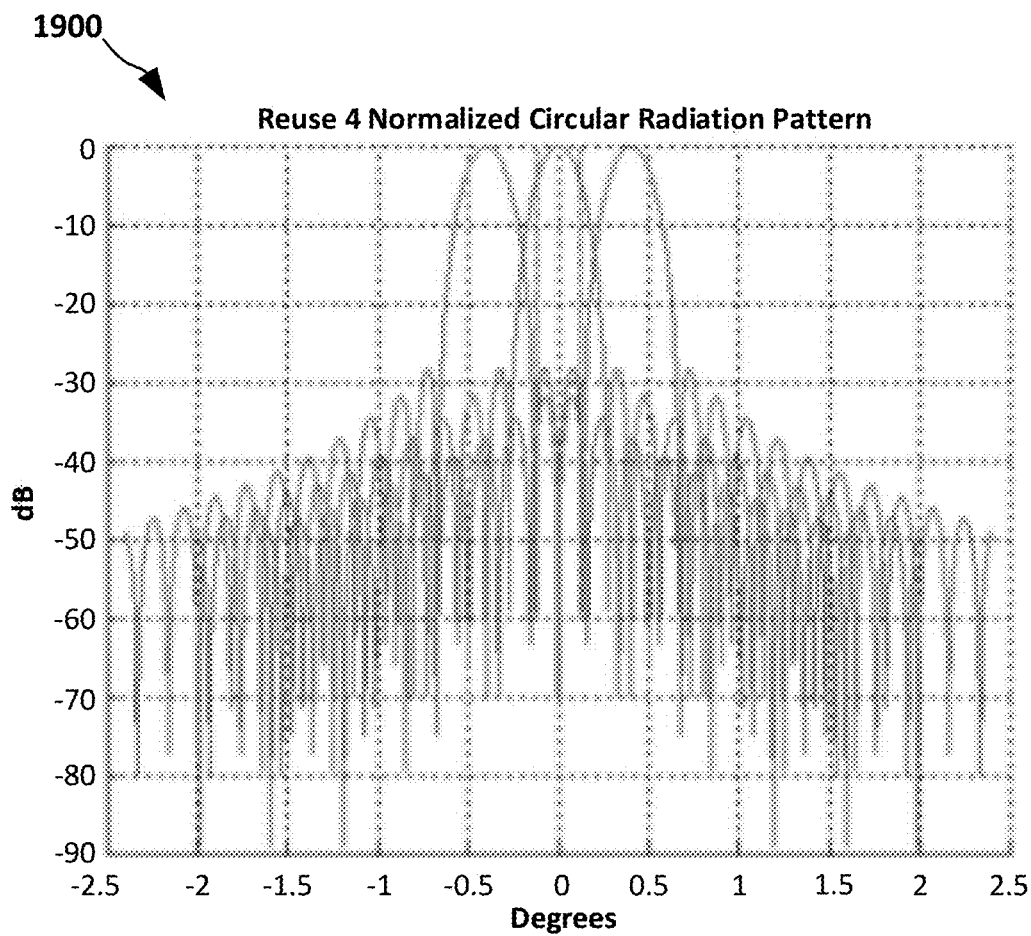
FIG. 19 is a graphical a presentation of a circular radiation pattern for model configuration in computer simulations.

FIG. 19 is a graphical form of 1900 of a circular radiation pattern for model configuration in computer simulations.

Figure 20A:
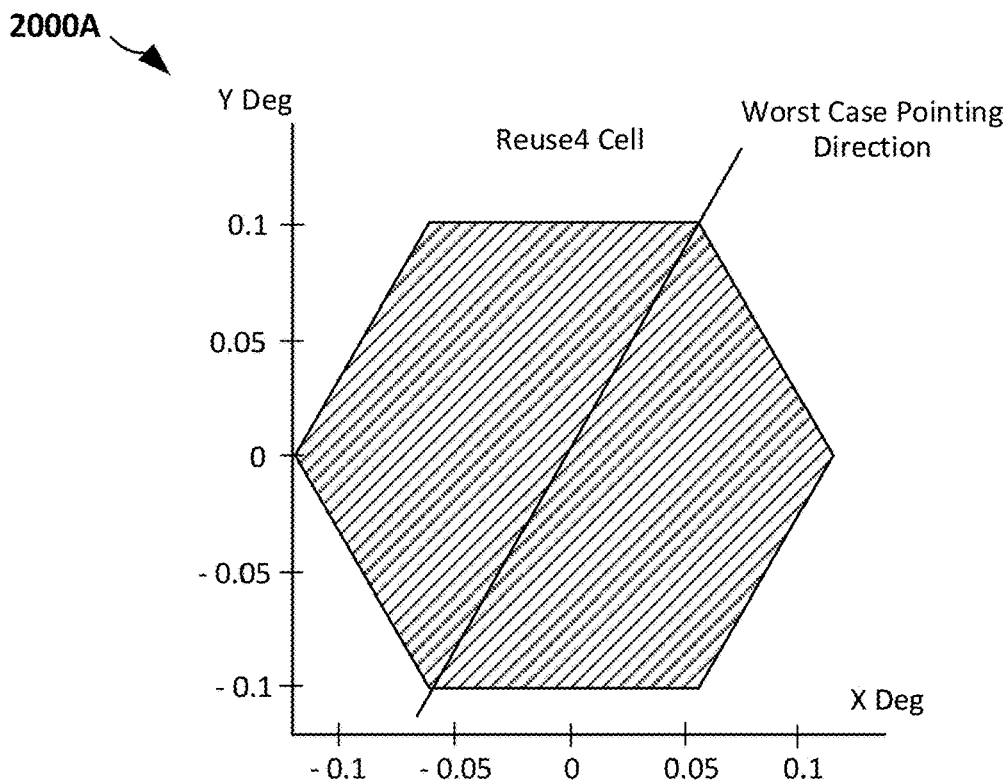
FIG. 20A is a graphical form of a simulation model of X-Y direction of pointing error in relation to a modelled hexagonal cell.

FIG. 20A is a graphical form of a simulation model 2000A of X-Y direction of pointing error in relation to a modelled hexagonal cell.

Figure 20B:
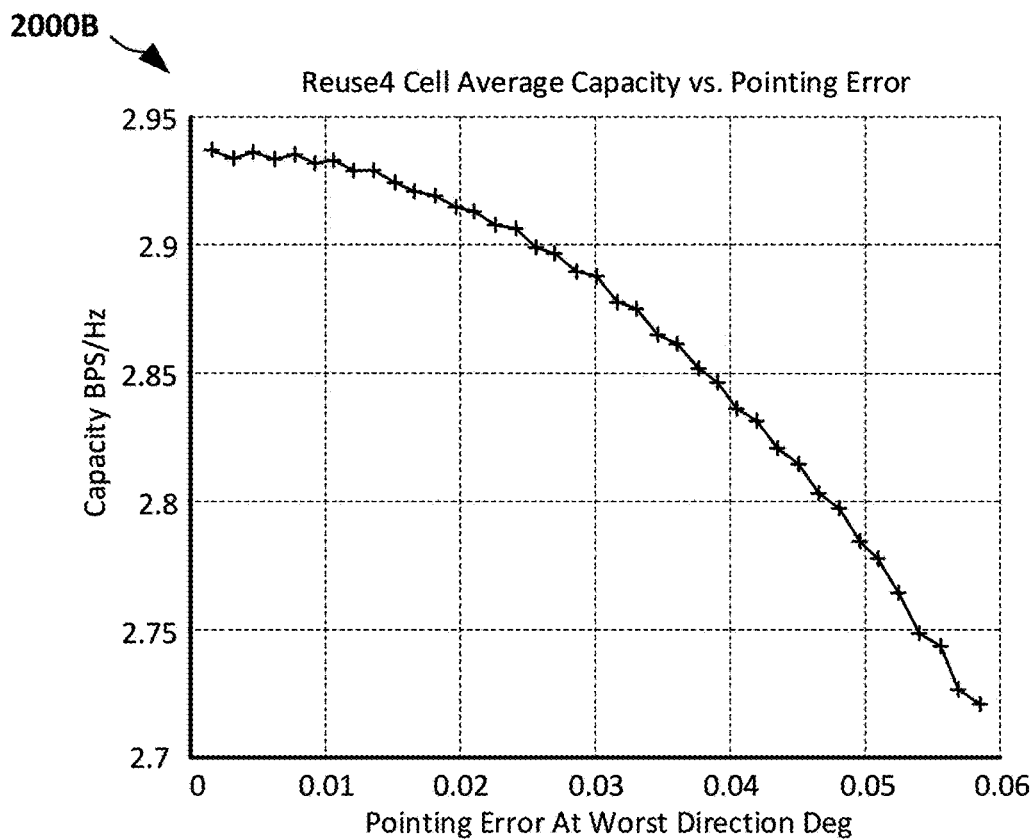
FIG. 20B is a graphical presentation of simulation results of FIG. 20A pointing error versus average bit capacity per cell, the model using FIG. 18 4-color reuse and FIG. 19 circular radiation.

FIG. 20B is a graphical presentation of simulation results 2000B, of FIG. 20A pointing error versus average bit capacity per cell, BPS/Hz, the model using FIG. 18 4-color reuse and FIG. 19 circular radiation.

Figure 21:
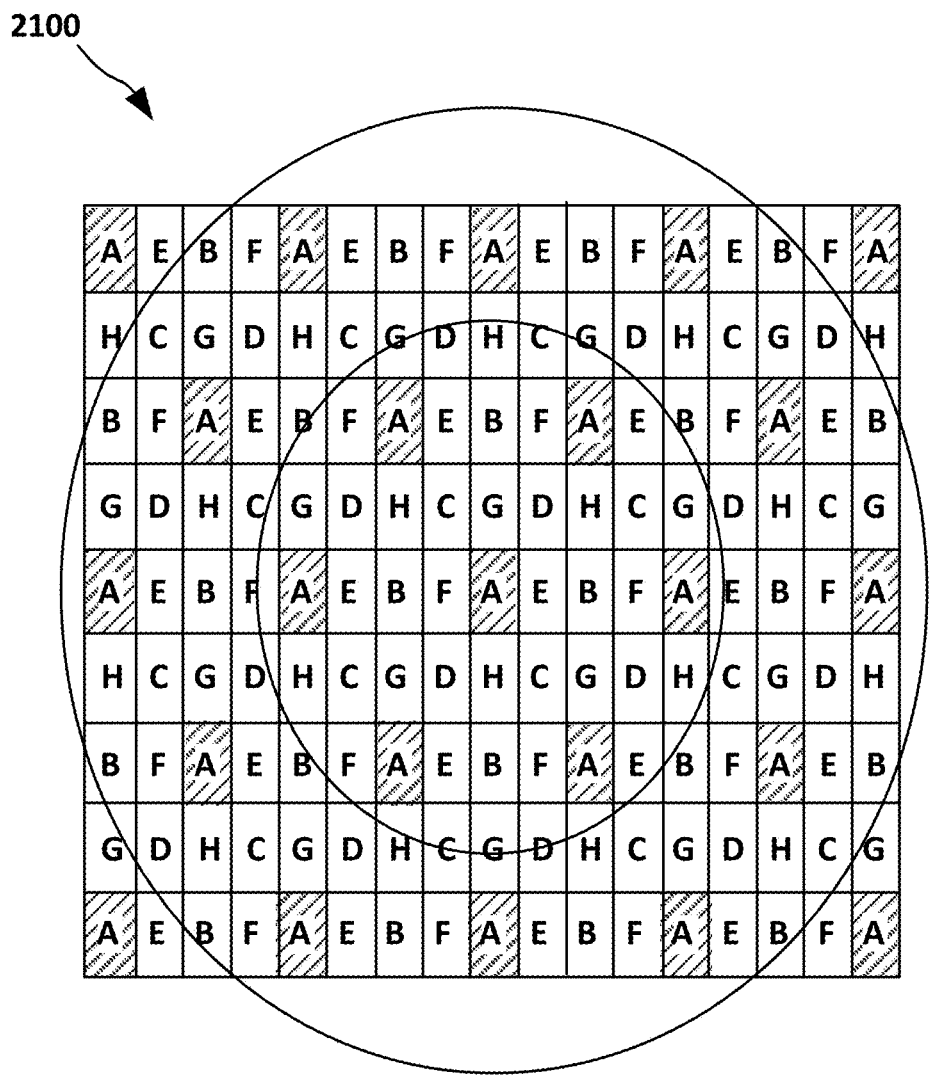
FIG. 21 is a graphical representation of an 8-color reuse assigned to a modelled tessellation of rectangular cells in accordance with the present disclosure, for computer simulation of PE effects.

FIG. 21 is a graphical representation of an 8-color reuse 2100 assigned to a modelled tessellation of rectangular cells in accordance with the present disclosure, for computer simulation of PE effects.

Figure 22A:
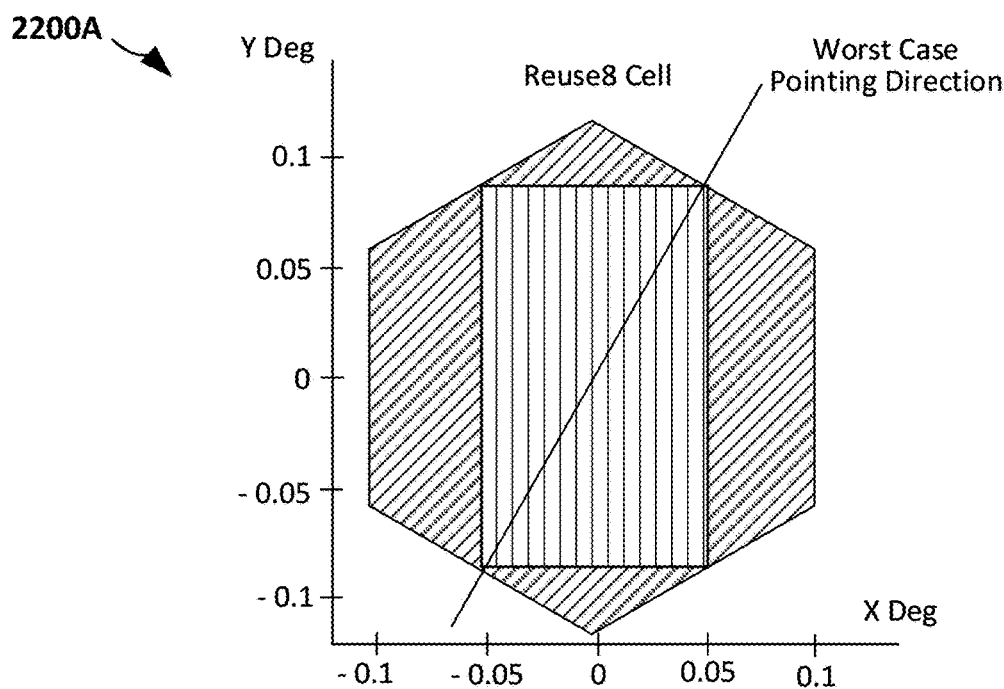
FIG. 22A is a graphical form of a computer simulation model of X-Y direction of pointing error in relation to a modelled rectangular cell in accordance with the present disclosure.

FIG. 22A is a graphical form of a computer simulation model 2200A of X-Y direction of pointing error in relation to a modelled rectangular cell in accordance with the present disclosure.

Figure 22B:
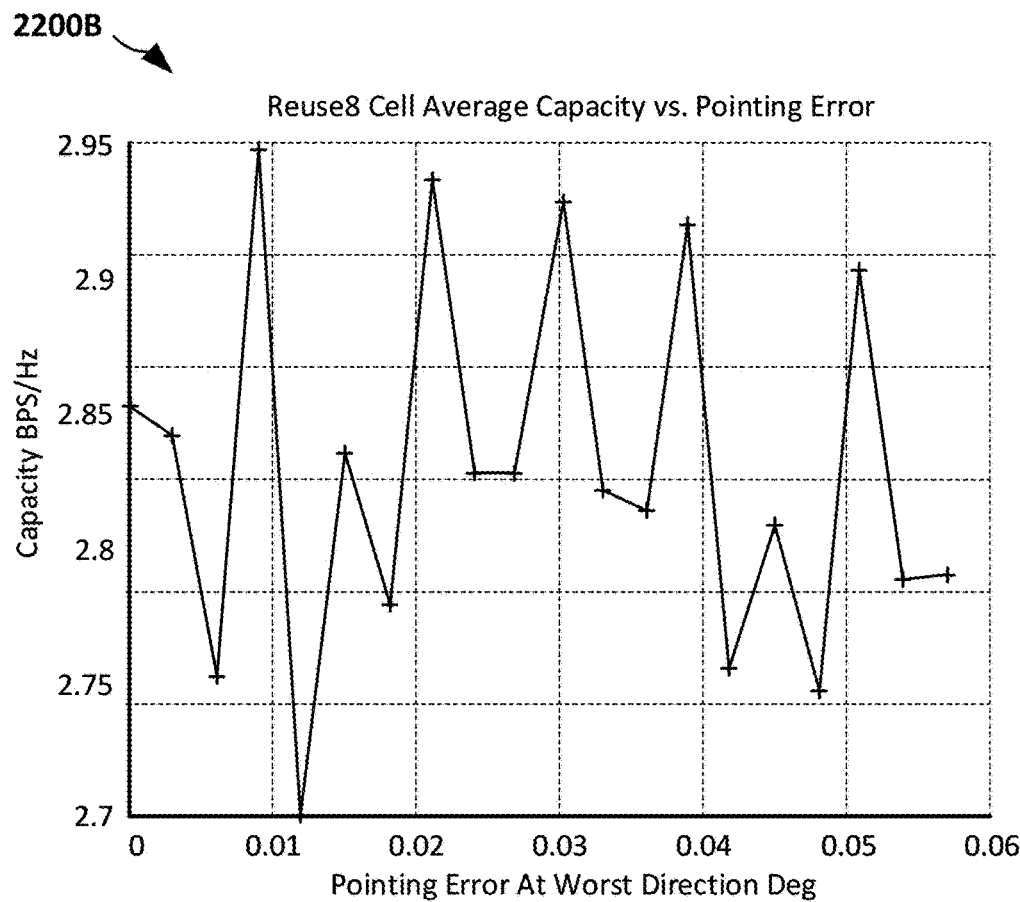
FIG. 22B is a graphical presentation of computer simulation results of FIG. 22A pointing error versus average bit capacity per cell, the model being configured according to the FIG. 21 8-color reuse and FIG. 19 circular radiation.

FIG. 22B is a graphical presentation of computer simulation results 2200B of FIG. 21A pointing error versus average bit capacity per cell, BPS/Hz, the model being configured according to the FIG. 21 8-color reuse 2100 and FIG. 19 circular radiation 1900.

Figure 23:
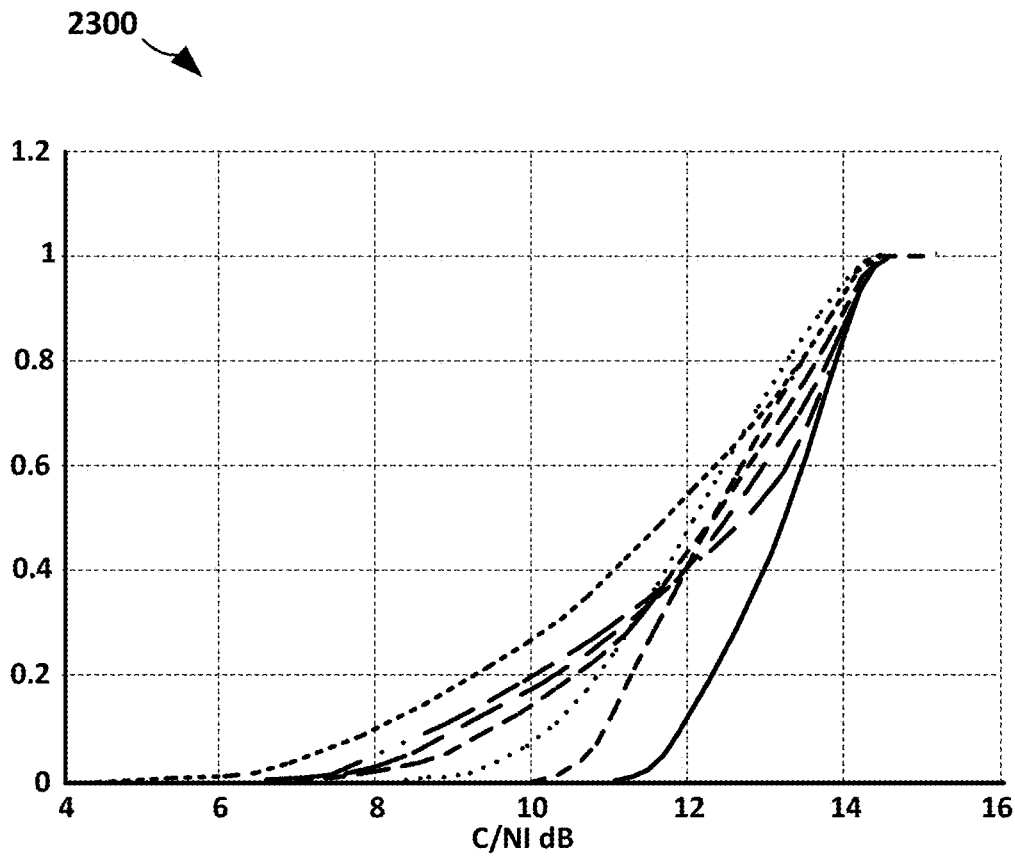
FIG. 23 a graphical presentation of computer simulation results comparing cumulative distribution of carrier to noise-plus-interference ratios at various pointing errors, calculated for modelled for multiple beam, rectangular cell PE tolerant reuse, according to various aspects of this disclosure, against results calculated for modelled hexagonal cells.

FIG. 23 is a graphical presentation of computer simulation results 2300 comparing cumulative distribution of C/NI at various pointing errors, calculated for a modelled system of multiple beam, rectangular cell PE tolerant reuse, according to various aspects of this disclosure, against results calculated for modelled hexagonal cells. The FIG. 18 4-color scheme 1800 was used in simulations of per-cell reception quality by hexagonal cells, and the FIG. 21 exemplary 8-color scheme 2100 used in simulations of per-cell reception quality by rectangular cells in the modelled system of multiple beam, rectangular cell PE tolerant reuse. All simulations used the FIG. 19 beam radiation pattern 1900.

Referring to FIG. 23, each of graph plot lines 2301, 2302, 2303, 2304, and 2305 shows simulated C/NI of signal reception by rectangular cells of the modelled system of multiple beam, RCC PE tolerant reuse, at a respective PE among a selected plurality of PE values. Each of graph plot lines 2306 and 2307 shows simulated C/NI of signal reception per cell by modelled hexagonal cells. The following Table 3 sets forth the PE value for each of the visible graph plot lines.

TABLE 3

FIG. 23 Graph Definition

| | Pointing Error |
|---|---|
| Rectangle Reuse 8 Simulation Plot Lines | |
| 2301 | No Pointing Error |
| 2302 | (−0.0293/−0.0507) degrees |
| 2303 | (−0.0000/−0.0585) degrees |
| 2304 | (−0.0414/−0.0414) degrees |
| 2305 | (−0.0585/−0.0000) degrees |
| Hexagon Reuse 4 Simulation Plot Lines | |
| 2306 | No Pointing Error |
| 2307 | (−0.0293/−0.0507) degrees |

The FIG. 23 simulation results show multiple beam rectangular cell PE tolerant reuse in accordance with this disclosure can provide significant improvement in C/NI distribution compared to hexagonal cell systems. Comparing plot line 2302 to 2307 it is seen that substantial improvement is provided when there is no pointing error shows at no zero pointing. Comparing plot line 2301 to plot line 2306, it is seen that improvement can be provided when there is no pointing error.

Figure 24:
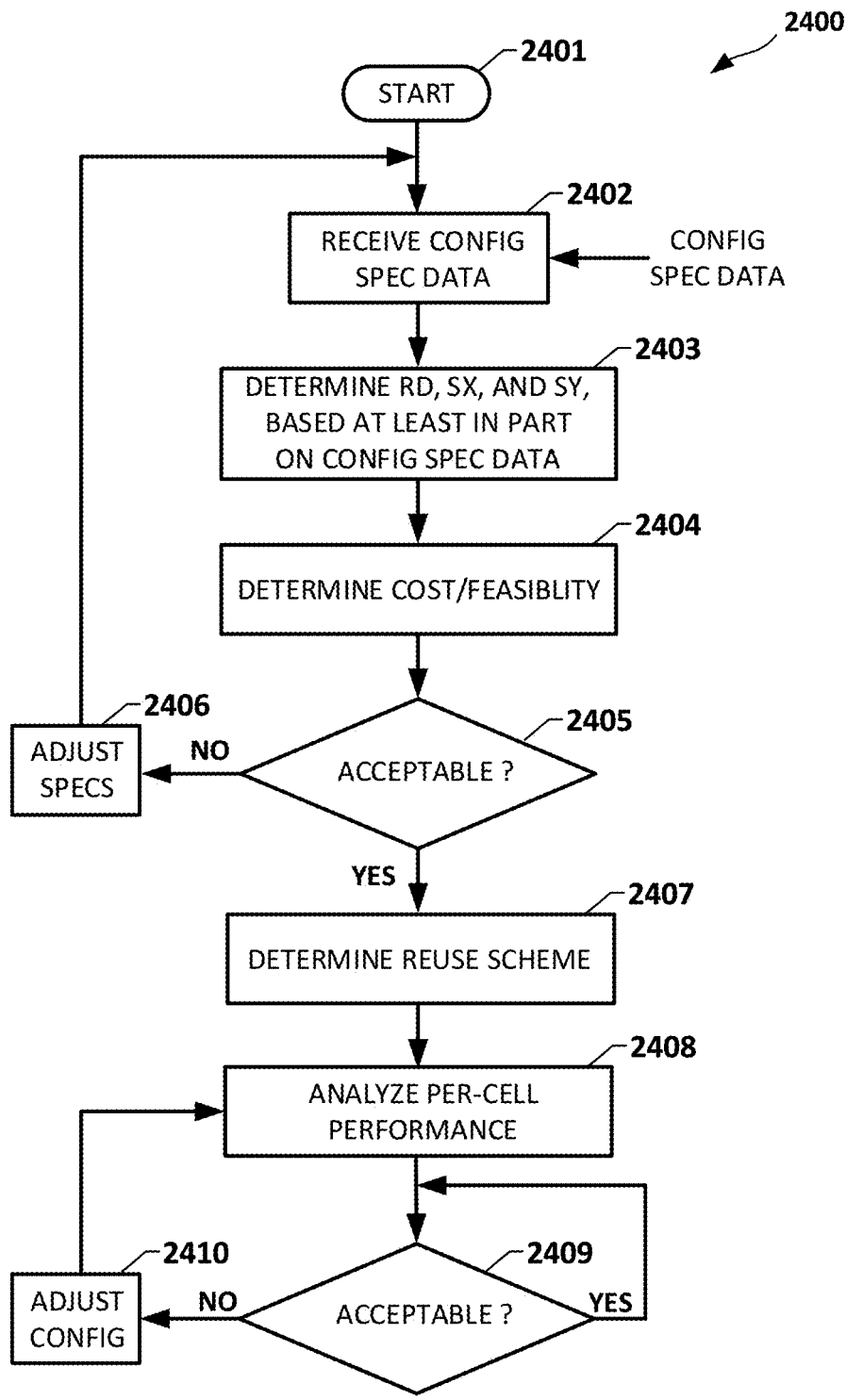
FIG. 24 is a logic flow chart for exemplary operations in processes in configuring and managing offset composite, RCC spot beam patterning and color assignment, in one or more implementations of systems and methods for multiple beam signal distribution PE tolerant reuse, according to various aspects of this disclosure.

FIG. 24 is a logic flow chart for exemplary operations 2400 ("flow 2400") in processes in configuring and managing offset composite, RCC spot beam patterning and color assignment, in one or more implementations of multiple beam signal distribution PE tolerant reuse, according to various aspects of this disclosure. For purposes of reader convenience, example instances and applications according to the flow 2400 will be described in reference to the FIG. 13 system 1300. It will be assumed that the satellite 1303 is in orbit, and that the specifications, and configurability capability of the beamformer 1304 and antenna apparatus 1305 are known to the flow 2400. It will be understood that the assumption of the satellite 1303 being extant in orbit is to avoid obfuscating concepts with details not necessarily specific to this disclosure, and that a person of ordinary skill in the pertinent arts, having possession of the present disclosure and facing an application where the satellite 1303 has not yet been specified, can readily adapt the flow 2400 to include configuration of the satellite.

Referring to FIG. 24, an exemplary instance can proceed from a start state 2401 that assumes the FIG. 13 system has not been configured with respect to cell dimension, or reuse scheme. In an exemplary instance, the flow 2400 can proceed from 2401 to 2402 where a configuration specification data, labeled "CONFIG SPEC DATA" can be received. The CONFIG SPEC DATA can include a desired floorplan of the rectangular cells, e.g., the FIG. 8A grid 800A, along with rectangular cell dimensions, e.g., FIG. 8A dimensions D9 and D10, desired signal quality (e.g., in S/NI), and desired PE tolerance. The rectangular cell dimensions can be provided implicitly, e.g., by specifying the service area and the grid pattern.

An exemplary instance of the flow 2400 can proceed from 2402 to 2403, where based at least in part on the given PE tolerance, and given rectangular cell length and width received at 2402, a first iteration of spot beam radius, RD, and spot beam spacings, SX and SY, can be determined. The spacing SX can be in the width direction e.g., along the AX axis of FIGS. 3A-3C, 4, 6A-6C, and 7A-7H, or the WX axis of FIGS. 8A-8F. The spacing SY can be in the length direction e.g., along the AY axis of FIGS. 3A-3C, 4, 6A-6C, and 7A-7H, or the LX axis of FIGS. 8A-8F.

The flow 2400 can then proceed to 2404, where operations can be applied to determine the cost/feasibility of RD, SX and SY. If the determination is negative, for example, based on an excess estimated cost or other criterion, the flow 2400 can proceed from the "NO" outbranch of conditional flow block to 2405 and to 2406 and apply a specification adjustment, and then return to 2403 and repeat determination of RD, or SX and SY, or both, based on the adjusted specifications. If the determination at 2404 is positive, the flow can proceed from the "YES" outbranch of block 2405 to 2407 and determine a reuse scheme. In an alternative implementation, the reuse scheme can be specified at 2402 as a given, and in such an implementation 2406 can be omitted.

In an implementation, the flow 2400 can include a maintenance/monitoring block at 2408 that can receive system performance measurements, e.g., per-cell C/NI, and based at least in part on one or more of the measurements failing a given performance criterion, can proceed from the "NO" outbranch of conditional flow block 2409 to 2410, apply an update or adjustment to the system configuration, for example to the spot beam radius RD, or the spacings SX and SY, or both, and then return to 2408.

Figure 25:
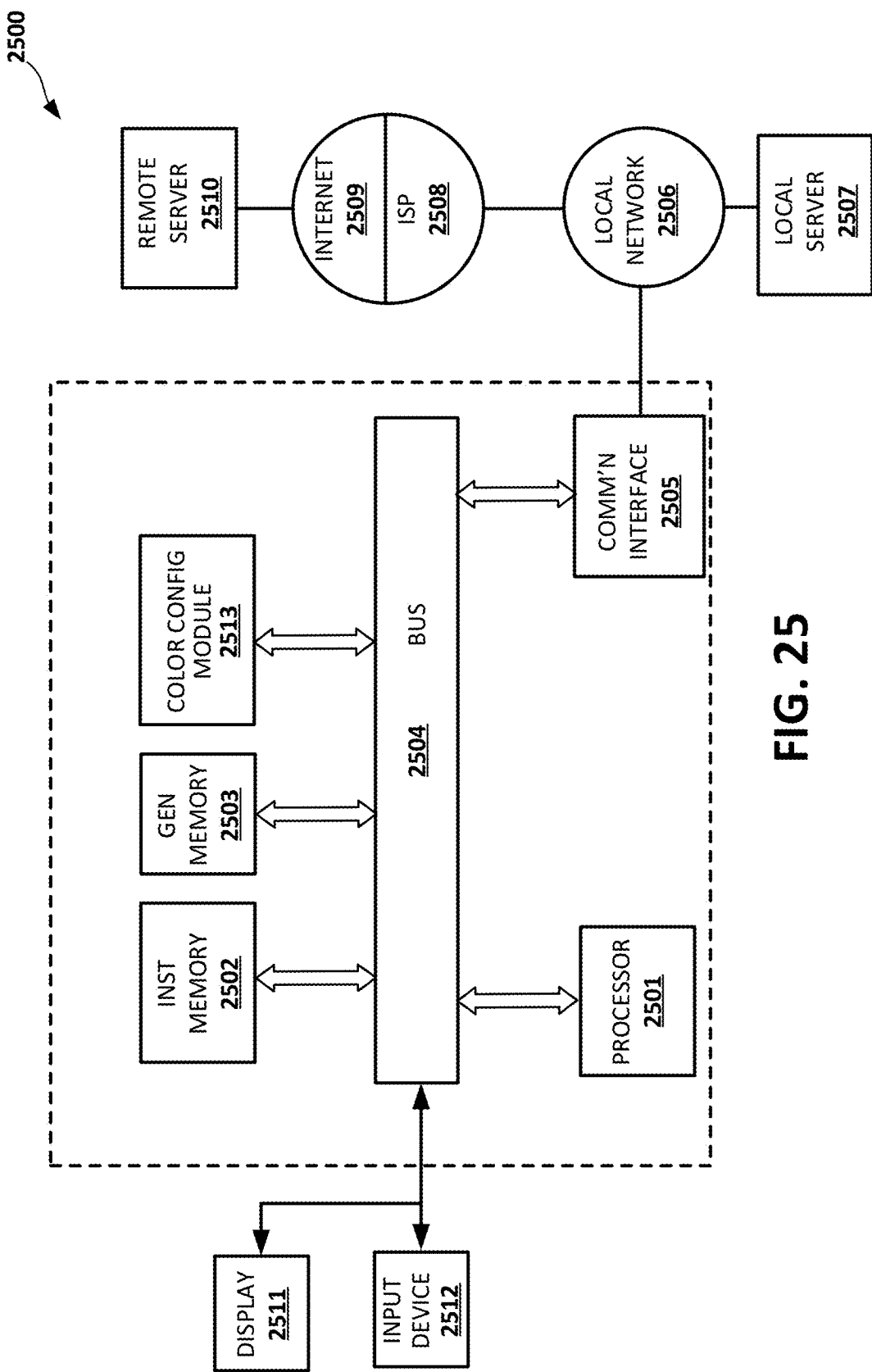
FIG. 25 is a functional block diagram of an example computer system upon which aspects of this disclosure may be implemented.

FIG. 25 is a block diagram illustrating a computer system 2500 upon which aspects of this disclosure may be implemented, such as, but not limited to, particular function blocks and processes described in reference to FIG. 13 or FIG. 24, or both. It will be understood that logic blocks illustrated in FIG. 25 represent functions, and do not necessarily correspond to particular hardware on a one-to-one basis.

The computer system 2500 can include a data processor 2501, instruction memory 2502, and a general purpose memory 2503, coupled by a bus 2504. The instruction memory 2502 can include a tangible medium retrievably storing computer-readable instructions, labeled as configuration manager module" 2513, that when executed by the data processor 2501 cause the processor to perform functions, processes, and operations such as the described above as provided by the FIG. 13 system configuration manager 1309.

The computer system 2500 can include a communications interface 2505, configured to interface with a local network 2506 for accessing a local server 2507, and to communicate through an Internet service provider (ISP) 2508 to the Internet 2509, and access a remote server 2510. The computer system 2500 can also include a display 2511 and a user interface 2512, either as separate devices or combined, for example, as a touchscreen display.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH- EPROM, any other memory chip or cartridge, a carrier wave as described hereinafter, or any other medium from which a computer can read.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirements of Sections 101, 102, or 103 of the Patent Act, nor should they be interpreted in such a way. Any unintended embracing of such subject matter is hereby disclaimed.

Except as expressly stated above, no statement herein is intended or should be interpreted to cause a dedication of any component, step, feature, object, benefit, advantage, or equivalent thereof to the public, regardless of whether it is or is not recited in the claims.

It will be understood that terms and expressions used herein have the ordinary meaning accorded to such terms and expressions in their respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, or apparatus comprising the element.

The Abstract of the Disclosure is provided to allow the reader to quickly identify aspects of the disclosed subject matter. In the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system comprising:
a controller, configured to store a cell boundary data associated with cell boundaries, and to generate a spot beam pattern data based at least in part on the cell boundary data; and
a multiple beam transceiver, coupled to the controller, wherein the multiple beam transceiver comprises:
an antenna, and
an antenna feed array, coupled to the antenna, and configured to receive the spot beam pattern data and to receive a plurality of downlink feed signals and, in response, to feed the antenna a beamformed downlink antenna feed signal, the beamformed downlink antenna feed signal being configured to radiate from the antenna as a plurality of spot beams in accordance with a spot beam pattern that corresponds to the spot beam pattern data,
wherein:
the spot beam pattern includes a cell spot beam centered on a cell center, and includes a plurality of adjacent spot beams, each partially overlapping the cell spot beam, the cell spot beam and the adjacent spot beams each including a corresponding portion of the downlink feed signals,
a first pair of the adjacent spot beams are aligned along a first axis that passes through the cell center, are oppositely spaced from the cell center, symmetrically, by a first distance, and overlap one another within the cell spot beam, and
a second pair of the adjacent spot beams are aligned along a second axis that passes through the cell center, perpendicular to the first axis, are oppositely spaced from the cell center, symmetrically, by a second distance, and the second pair are separated from one another by a region within the cell spot beam.

2. The system of claim 1, wherein the antenna feed array includes an antenna receive array, the antenna receive array being configured to:
receive uplink signals from the antenna, each of the uplink signals being transmitted from within a cell boundary among the plurality of cell boundaries, and
apply a receive beamforming to uplink signals received from the antenna, the receive beamforming being configured according to the spot beam pattern.

3. The system of claim 1, wherein:
a first equidistance reference line tracing points equidistant between the cell center and the center of one spot beam of the first pair of adjacent spot beams extends parallel to a second equidistance reference line tracing points equidistant between the cell center and the center of the other of the first pair of adjacent spot beams,
a third equidistance reference line tracing points equidistant between the cell center and the center of one spot beam of the second pair of adjacent spot beams extends parallel to a fourth equidistance reference line tracing points equidistant between the cell center and the center of the other of the second pair of the adjacent spot beams, and
the first and second equidistance reference lines intersect with the third and fourth equidistance reference lines in a configuration that defines a rectangular cell that is centered on the cell center.

4. The system of claim 3, wherein:
the rectangular cell has four vertices, each defined by an intersection of one among the first and second equidistance reference lines with one among the third and fourth equidistance reference lines, the cell spot beam and each of the adjacent spot beams has a radius R, and each of the vertices is a third distance from the cell center, the third distance being less than R.

5. The system of claim 4, wherein the third distance is approximately 0.866R.

6. The system of claim 3, wherein:

the spot beam pattern is a first cell coverage portion of a composite spot beam pattern, the first pair of adjacent spot beams is a first cell first pair of adjacent spot beams, and the second pair of adjacent spot beams is a first cell second pair of adjacent spot beams, one spot beam in the first cell second pair of adjacent spot beams is within a first pattern first row of spot beams, arranged along a first row axis, equally spaced from one another by twice the first distance, and overlapping one another by said overlap, the cell spot beam is a first cell spot beam, and is within a second pattern second row of spot beams, arranged along the second row axis, equally spaced from one another by twice the first distance, and offset from the first pattern second row of spot beams by said first distance, the first cell first pair of adjacent spot beams are within a first pattern second row of spot beams, arranged along a second row axis, equally spaced from one another by twice the first distance, and overlapping one another by said overlap, and the other spot beam in the first cell second pair of adjacent spot beams is within a first pattern third row of spot beams, arranged along a third row axis, equally spaced from one another by twice the first distance, overlapping one another by said overlap, and offset on the third row axis from the first pattern first row of spot beams by the first distance.

7. The system of claim 6, wherein the composite spot beam pattern includes a second cell coverage portion, wherein the second cell coverage portion uses one spot beam within the first cell first pair of adjacent spot beams as a second cell spot beam, and includes a second cell first pair of adjacent spot beams and a second cell second pair of adjacent spot beams, each being adjacent to and overlapping the second cell spot beam, and wherein:

one of the second cell first pair of adjacent spot beams is the first cell spot beam, the other spot beam of the second cell first pair of adjacent spot beams is another spot beam within the second pattern second row of spot beams one of the second cell second pair of adjacent spot beams is a spot beam within a second pattern first row of spot beams, arranged along the first row axis, equally spaced from one another by twice the first distance, overlapping one another by said overlap, and offset on the first row axis from the first pattern first row of spot beams by the first distance, the other of the second cell second pair of adjacent spot beams is a spot beam within a second pattern third row of spot beams, arranged along the third row axis, equally spaced from one another by twice the first distance, overlapping one another by said overlap, and offset on the third row axis from the first pattern first row of spot beams by the distance DX.

8. The system of claim 7, wherein:

a second cell first equidistance reference line traces points equidistant between the second cell center and the center of one spot beam of the second cell first pair of adjacent spot beams, and extends parallel to a second cell second equidistance reference line tracing points equidistant between the second cell center and the center of the other of the second cell first pair of adjacent spot beams, a second third equidistance reference line traces points equidistant between the second cell center and the center of one spot beam of the second cell second pair of adjacent spot beams, and extends parallel to a second cell fourth equidistance reference line tracing points equidistant between the second cell center and the center of the other of the second cell second pair of adjacent spot beams, and the second cell first and second equidistance reference lines intersect with the second cell third and fourth equidistance reference lines in a configuration that defines a second rectangular cell, centered on the second cell center.

9. The system of claim 8, wherein:

the first rectangular cell and the second rectangular cell form a two-cell tessellation.

10. The system of claim 3, wherein:

the spot beam pattern is a cell coverage portion among a plurality of cell coverage portions of a composite spot beam pattern, and the cell spot beam is a cell coverage spot beam corresponding to a coverage cell among a plurality of coverage cells, and the spot beam pattern includes, for each of the cell coverage portions,
 a plurality of cell coverage portion adjacent spot beams, each partially overlapping the cell coverage spot beam,
 a cell coverage portion first pair of adjacent spot beams, aligned on the first axis, oppositely spaced from the cell coverage portion cell center, symmetrically, by the first distance, and overlapping one another within the cell coverage spot beam, and
 a cell coverage portion second pair of adjacent spot beams, aligned along an axis parallel the second axis, and oppositely spaced from the cell coverage portion cell center, symmetrically, by the second distance, the cell coverage portion second pair of adjacent spot beams being separated from one another by a region within the cell coverage spot beam.

11. The system of claim 10, wherein:

each of the cell coverage portions includes a corresponding first equidistance reference line tracing points equidistant between the cell coverage cell center and the center of one spot beam of the cell coverage portion first pair of adjacent spot beams, and which extends parallel to a cell coverage portion second equidistance reference line tracing points equidistant between the cell coverage cell center and the center of the other of the cell coverage portion first pair of adjacent spot beams, each of the cell coverage portions further includes a corresponding cell coverage portion third equidistance reference line tracing points equidistant between the cell coverage portion cell center and the center of one spot beam of the second pair of adjacent spot beams, and which extends parallel to a cell coverage portion fourth equidistance reference line tracing points equidistant between the cell coverage portion cell center and the center of the other of the cell coverage portion second pair adjacent spot beams, and each of the cell coverage portion first and second equidistance reference lines intersects with the cell coverage portion third and fourth equidistance reference lines in a configuration that defines a cell coverage portion rectangular cell, centered on the cell coverage portion center.

12. The system of claim 11, wherein:
a plurality of cell coverage portion rectangular cells are defined by the respective cell coverage portion first and second equidistance reference lines intersecting with the cell coverage portion third and fourth equidistance reference lines, and the plurality of cell coverage portion rectangular cells are arranged as a tessellation.

13. The system of claim 12, wherein the tessellation includes at least eight cells, and wherein the multiple beam transceiver is configured to transmit a spot beam to each of the at least eight cells, using an 8-color reuse that includes assigning each of the at least 8 colors to at least one of the spot beams.

14. A method, comprising:
receiving a configuration specification data, including a cell floorplan data, the cell floorplan data identifying a plurality of rectangular cells, and indicating a cell width and a cell length of the rectangular cells; and determining, based at least in part on the configuration specification data, a spot beam pattern, the spot beam pattern including a spot beam first axis spacing and a spot beam second axis spacing, the second axis being perpendicular to the first axis, wherein the spot beam pattern provides a plurality of rectangular cell coverage regions, having a length and a width corresponding to the cell length and cell width.

15. The method of claim 14, wherein: the configuration specification data further includes a pointing error tolerance data, and determining the spot beam pattern is further based, at least in part, on the pointing error tolerance data.

16. The method of claim 14, wherein:
the plurality of rectangular cell coverage regions include a tessellation of at least eight rectangular cells, and the configuration specification data includes an 8-color reuse, and an assignment of each of the at least 8 colors to at least one of the rectangular cells among the tessellation of at least eight rectangular cells.

17. The method of claim 14, wherein the method further includes:
estimating a cost/feasibility of an implementation according to the determined spot beam pattern; and
based at least in part on a result of the estimating,
updating at least a portion of the configuration specification data to generate an updated configuration specification data,
setting the configuration specification data according to the updated configuration specification data,
repeating the determining the spot beam pattern.

18. A method for transmitting and receiving multiple spot beams, comprising:
feeding a beamformed antenna feed signal to an antenna, the beamformed antenna feed signal including a cell signal and a plurality of adjacent cell signals, the beamformed antenna feed signal being configured such that the antenna transmits, in response, a pattern of spot beams that includes a cell spot beam centered on a cell center and carrying the cell signal, and a plurality of adjacent cell spot beams carrying the plurality of adjacent cell signals, each adjacent cell spot beam partially overlapping the cell spot beam;

receiving uplink signals from the antenna, each of the uplink signals being transmitted from within a cell boundary among the plurality of cell boundaries; and applying a beamforming to the received uplink signals corresponding to the pattern of spot beams, wherein a first pair of the adjacent cell spot beams are aligned along a first axis that passes through the cell center, and are oppositely spaced from the cell center, symmetrically, by a distance wherein the first pair of adjacent cell spot have a mutual overlap within the cell spot beam, and a second pair of the adjacent cell spot beams are aligned along a second axis that passes through the cell center and is perpendicular to the first axis, and are oppositely spaced from the cell center, symmetrically, by a distance wherein the second pair of the adjacent cell spot beams are separated.

19. The method for transmitting and receiving multiple spot beams of claim 18, wherein:
a first equidistance reference line traces points equidistant between the cell center and the center of one spot beam of the first pair of adjacent spot beams, and extends parallel to a second equidistance reference line tracing points equidistant between the cell center and the center of the other of the first pair of adjacent spot beams, a third equidistance reference line traces points equidistant between the cell center and the center of one spot beam of the second pair of adjacent spot beams, and extends parallel to a fourth equidistance reference line that tracing points equidistant between the cell center and the center of the other of the second pair of adjacent spot beams, and the first and second equidistance reference lines intersect with the third and fourth equidistance reference lines in a configuration that defines a rectangular cell, centered on the second cell center.

20. A system comprising:
a controller, configured to store a cell boundary data associated with cell boundaries, and to generate a spot beam pattern data based at least in part on the cell boundary data; and a multiple beam transceiver, coupled to the controller, and including:
an antenna, and
an antenna feed array, coupled to the antenna, and configured to receive the spot beam pattern data and to receive a plurality of downlink feed signals and, in response, to feed the antenna a beamformed downlink antenna feed signal, the beamformed downlink antenna feed signal being configured to radiate from the antenna as a spot beam pattern, of spot beams with radius R, that corresponds to the spot beam pattern data, wherein:
the spot beam pattern includes a cell spot beam centered on a cell center, and a corresponding six adjacent spot beams, each partially overlapping the cell spot beam, each aligned on a respective center, the six adjacent spot beams include a first pair of adjacent spot beams, a second pair of adjacent spot beams, and a third pair of adjacent spot beams, relative positions of the cell spot beam and the corresponding six adjacent spot beams define a hexagonal cell coverage region that has an area approximately one-half an area of the cell spot beam, including:

a first equidistance reference line, tracing points equidistant between the cell center and a center of one spot beam of the first pair of adjacent cell spot beams, is an alignment for a first side of the hexagonal cell coverage region, a second equidistance line, parallel the first equidistance reference line, traces points equidistant between the cell center and a center of the other spot beam of the first pair of adjacent cell spot beams, and is an alignment for a second side of the hexagonal cell coverage region, the second side being opposite from and parallel to the first side, a third equidistance reference line, tracing points equidistant between the cell center and a center of one spot beam of the second pair of adjacent cell spot beams, is an alignment for a third side of the hexagonal cell coverage region, a fourth equidistance line, parallel the third equidistance reference line, traces points equidistant between the cell center and a center of the other spot beam of the second pair of adjacent cell spot beams, and is an alignment for a fourth side of the hexagonal cell coverage region, the fourth side being opposite from and parallel to the third side, a fifth equidistance reference line, tracing points equidistant between the cell center and a center of one spot beam of the third pair of adjacent cell spot beams, is an alignment for a fifth side of the hexagonal cell coverage region, and a sixth equidistance line, parallel the fifth equidistance reference line, traces points equidistant between the cell center and a center of the other spot beam of the third pair of adjacent cell spot beams, and is an alignment for a sixth side of the hexagonal cell coverage region, the sixth side being opposite from and parallel to the fifth side.

* * * * *

UNITED STATES PATENT AND TRADEMARK OFFICE
CERTIFICATE OF CORRECTION

PATENT NO. : 10,588,029 B1
APPLICATION NO. : 16/194338
DATED : March 10, 2020
INVENTOR(S) : Stanley Edward Kay et al.

It is certified that error appears in the above-identified patent and that said Letters Patent is hereby corrected as shown below:

On the Title Page

Item (73), "Hughes Networks Systems, LLC." should be -- Hughes Network Systems, LLC. --.

Signed and Sealed this
Ninth Day of June, 2020

Andrei Iancu
*Director of the United States Patent and Trademark Office*